(12) United States Patent
Kim et al.

(10) Patent No.: US 7,079,514 B2
(45) Date of Patent: Jul. 18, 2006

(54) MOBILE COMMUNICATION APPARATUS WITH ANTENNA ARRAY AND MOBILE COMMUNICATION METHOD THEREOF

(75) Inventors: Sung-jin Kim, Suwon (KR); Ju-ho Lee, Suwon (KR); Jong-hyeuk Lee, Incheon (KR); Yong-suk Lee, Yongin (KR); Ki-ho Kim, Seoul (KR); Hyeon-woo Lee, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 954 days.

(21) Appl. No.: 10/146,462

(22) Filed: May 16, 2002

(65) Prior Publication Data

US 2003/0068983 A1   Apr. 10, 2003

(30) Foreign Application Priority Data

May 17, 2001 (KR) .................. 10-2001-0027082
May 25, 2001 (KR) .................. 10-2001-0029007

(51) Int. Cl.
   *H04B 7/216*   (2006.01)
(52) U.S. Cl. .................. 370/335; 370/342; 455/67.16
(58) Field of Classification Search .............. 370/335, 370/336, 337, 342, 345; 455/63.1, 68–70, 455/570, 126, 67.16
   See application file for complete search history.

(56) References Cited

U.S. PATENT DOCUMENTS

| | | | | |
|---|---|---|---|---|
| 6,754,286 B1 * | 6/2004 | Hottinen et al. | ............ | 375/299 |
| 6,952,455 B1 * | 10/2005 | Banister | ............ | 375/267 |
| 2002/0128026 A1 * | 9/2002 | Derryberry et al. | ......... | 455/504 |
| 2004/0180627 A1 * | 9/2004 | Dabak et al. | ............ | 455/67.16 |

OTHER PUBLICATIONS

Siemens *3GPP TSGR1#19 R1-01-0203, Feb. 27, 2001, pp. 1-9, XP002224882.
* Entitled: "Description of the eigenbeamformer concept (update) and performance evaluation".
Siemens ** 3GPP TSGR1#14(00)0853, Jul. 4, 2000, XP00216992, Oulu, Finland.
** Entitled: "Advanced closed loop TX diversity concept".
Samsung & Seoul Natl. University *** TSGR1#14(00)-0882, Jul. 4, 2000, XP002197993, Oulu, Finland.

(Continued)

*Primary Examiner*—Hassan Kizou
*Assistant Examiner*—Salman Ahmed
(74) *Attorney, Agent, or Firm*—Lee & Morse, P.C.

(57) ABSTRACT

A mobile communication apparatus with an antenna array and a mobile communication method therefore, wherein the apparatus includes a base station with an antenna array and a mobile station, wherein the mobile station determines a channel downlink characteristic for each antenna, determines long-term information and short-term information, converts the determined long-term information and short-term information to a feedback signal, and transmits the feedback signal to the base station. The base station receives the feedback signal, extracts a plurality of weights from the long-term information and short-term information, multiplies a multiplexed dedicated physical channel signal by the respective weights, adds respective pilot channel signals to the products, and transmits the results of the additions through the antenna array to the mobile station. The present invention allows more users to use the same bandwidth through efficient feedback bandwidth utilization and maximized diversity and beamforming effects.

70 Claims, 31 Drawing Sheets

OTHER PUBLICATIONS

\*\*\* Entitled: "Preliminary Version of Algorithm and Simulation Results for Tx Diversity with . . . ".

Nagaraj, et al. \*\*\*\* ICPWC 2000, Dec. 17, 2000, pp. 14-18, XP010534004, chapter I, 1st paragraph.

\*\*\*\* Entitled: "Downlink transmit diversity: feedback, efficiency and robustness".

Matrix Computation, G. Golub and C. Van Loan, Johns Hopkins Univ. Press, London, 1996.

Digital Communication, $3^{rd}$ Edition, pp. 175, John G. Proakis, The McGraw Hill Book Co., Inc. Singapore, 1995.

Efficient One-Two-and Multidimensional High Resolution Array Signal Processing M. Haardt, Shaker Publication Co. Aachen (Germany) 1996, ISBN: 3-8265-2220-6.

Smart Antenna for Wireless Communications: IS-95 and Third Generation CDMA Applications, J.C. Liberti, Jr., &. Theodore S. Rappaport, The Prentice Hallo Co., 1999, ISBN: 0-13-719287-8.

\* cited by examiner

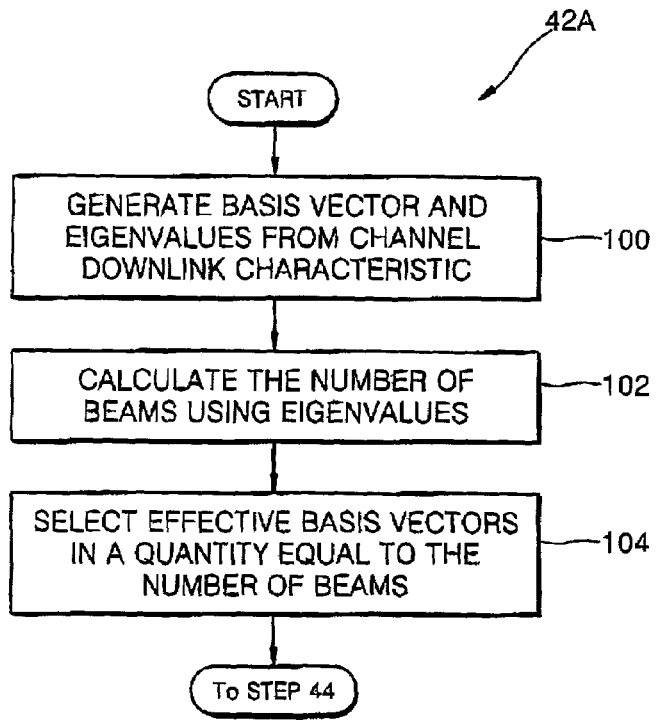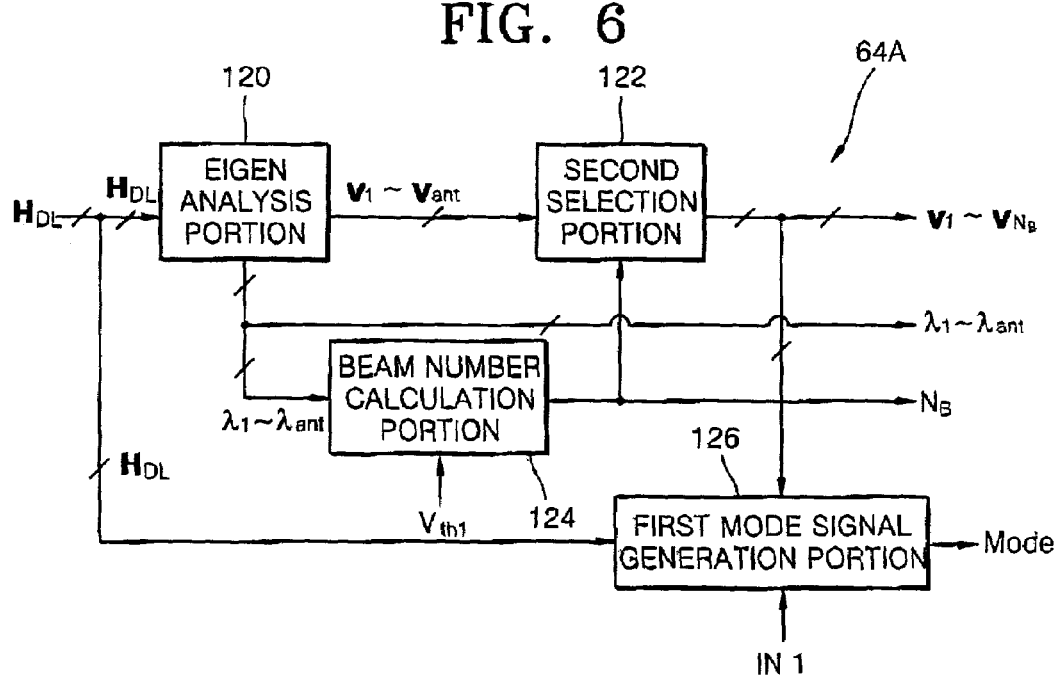

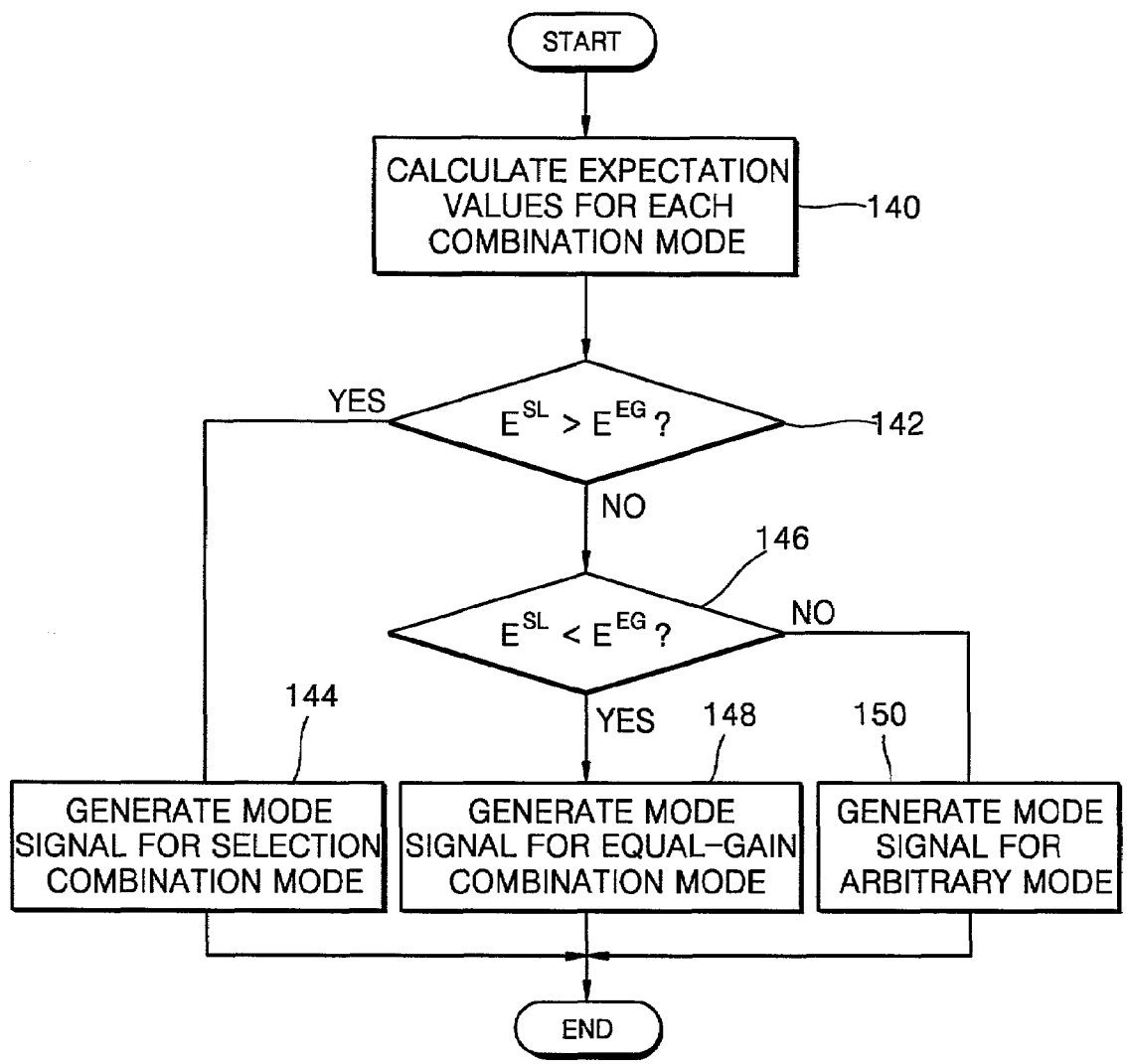

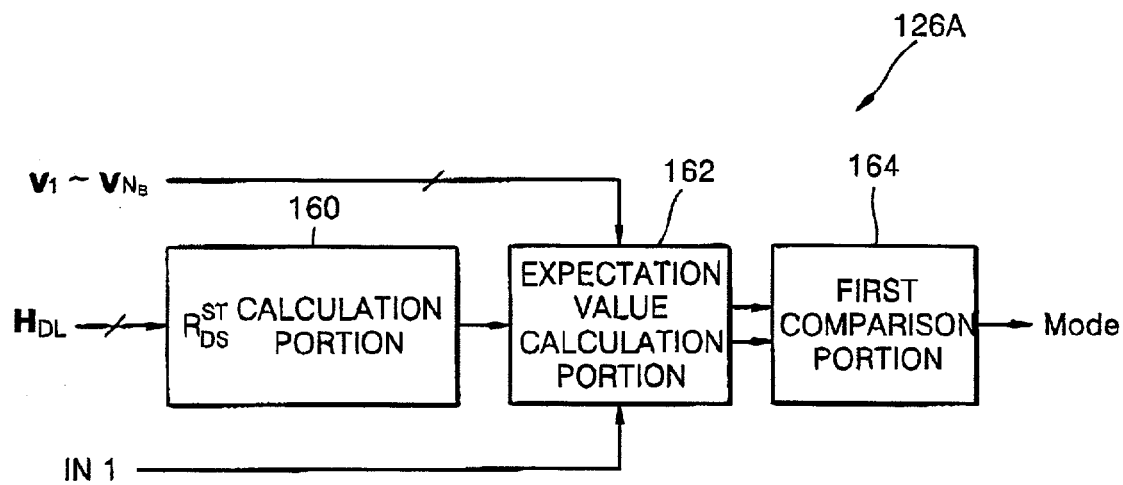
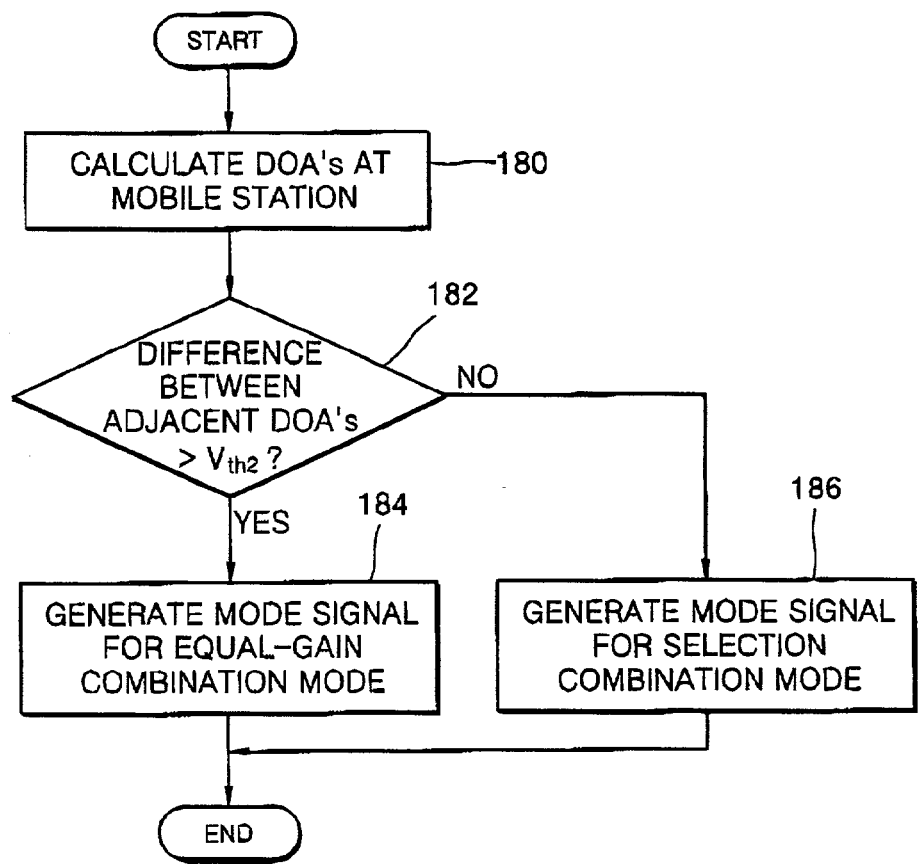

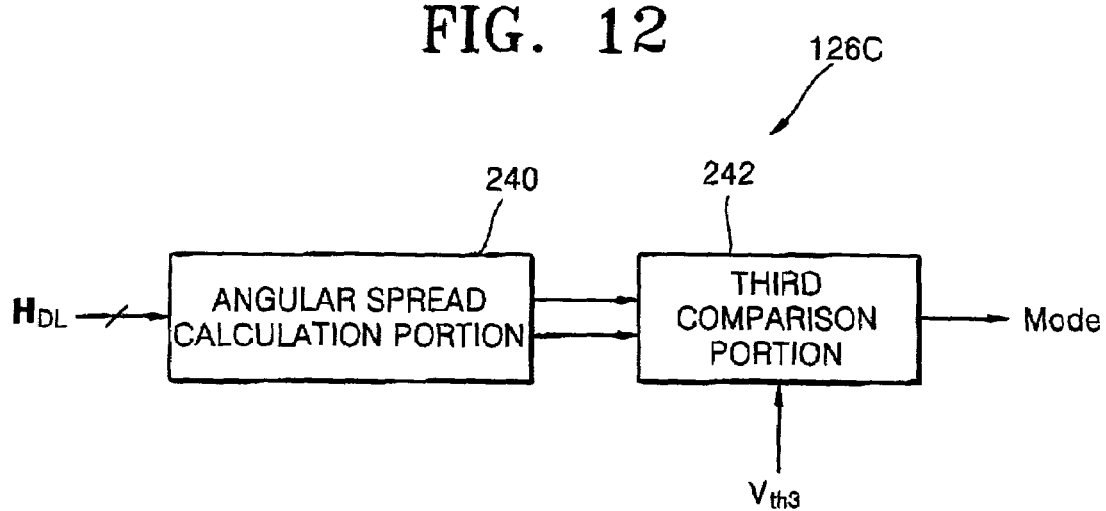
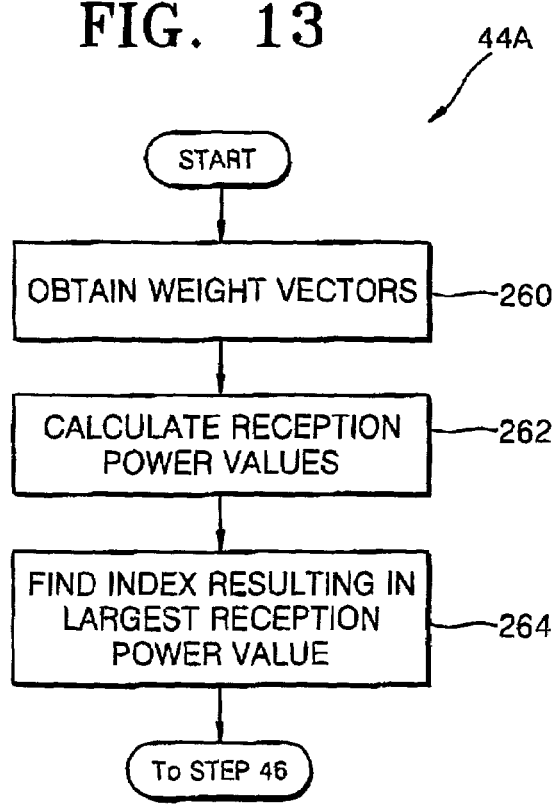

MOBILE COMMUNICATION APPARATUS WITH ANTENNA ARRAY AND MOBILE COMMUNICATION METHOD THEREOF

BACKGROUND OF THE INVENTION

1 Field of the Invention

The present invention relates to mobile communications. More particularly, the present invention relates to a mobile communication apparatus with an antenna array and a mobile communication method therefor, which is able to minimize the effects of fading, interference, and noise.

2. Description of the Related Art

Next-generation mobile communication systems require high-speed data transmission, faster than the mobile communication systems for personal communication service. As a wireless communication standard, Europe and Japan have adopted the wideband code division multiple access (W-CDMA) scheme, and North America has adopted the CDMA-2000 scheme.

A mobile communication system is commonly constructed of a base station and a plurality of mobile stations communicating with each other via the base station. High-speed data transmission in a mobile communication system can be achieved by minimizing user co-interference and signal loss, such as fading, affected by channel characteristics. Diversity techniques have been applied to prevent unstable communications due to fading. One such technique, a space diversity technique, uses multiple antennas.

Use of multiple antennas is considered necessary for future mobile communication systems as it can minimize user co-interference. A transmission multiple antenna system used to increase the capacity of a transmitter, which employs a diversity technique using multiple antennas to counteract signal fading, requires a wide bandwidth for transmission due to a feature of next generation mobile communications.

For high-speed data transmission, it is essential to solve the problem of signal fading, which is the most significant channel characteristic affecting the performance of common mobile communication systems. This is because fading may reduce the amplitude of a received signal to tens of dB or even a few dB. Many kinds of diversity techniques are applied to overcome fading. A common CDMA technique utilizes a Rake receiver, which receives multiple path signals using the delay spread of a channel and corresponds to a reception diversity technique. However, this reception diversity technique is not effective when the delay spread is small.

Doppler spread channels require a time diversity technique using interleaving and coding techniques. However, the time diversity technique cannot be applied to a low-speed Doppler channel. An interior channel with a small delay spread and a pedestrian channel, which is a typical example of a low-speed Doppler channel, require a space diversity technique to counteract fading. The space diversity technique uses two or more antennas to overcome signal attenuation due to fading during transmission by switching antennas. Space diversity is classified into reception antenna diversity requiring reception antennas and transmission antenna diversity requiring transmission antennas. It is impractical in terms of cost and space utilization to adopt reception antenna diversity at individual mobile stations; instead, transmission antenna diversity is adopted at the base station.

Transmission antenna diversity is categorized into closed-loop transmission diversity where mobile stations feed downlink channel information back to the base station and open-loop transmission diversity where no feedback occurs from mobile stations to the base station. According to a transmission diversity approach, a mobile station determines the phase and magnitude on each channel to find optimal weight values. For this determination of the phase and amplitude on the channel, the base station transmits a pilot signal through each antenna to the mobile station. Then, the mobile station determines the magnitude and phase on the channel from each pilot signal and finds optimal weight values based on the magnitude and phase on the channel.

In transmission antenna diversity, diversity effects and signal-to-noise ratio improve as the number of antennas increases. However, the improvement of diversity efficiency decreases as the number of antennas (or signal transmission paths) used at the base station, i.e., the degree of diversity, increases. Therefore, continuing to increase the number of antennas beyond a certain point merely to achieve an extremely high diversity effect would be costly and impractical, i.e., the law of diminishing returns comes into effect. However, increasing the number of antennas used in the base station to minimize the power of interference signals and to maximize the internal signal-to-noise ratio is an effective and quite practical technique.

A transmission adaptive antenna array system that provides diversity effects as well as beamforming effects to protect an internal signal from interference and noise is called a "downlink beamforming system." Particularly, a system that utilizes feedback information as in transmission diversity is called a "closed loop downlink beamforming system." Closed downlink beamforming systems that use information fed back from mobile stations to the base station require a sufficiently wide feedback channel bandwidth. If the feedback channel bandwidth is not sufficiently wide, communication performance degrades due to poor adaptability to channel information variations.

The European IMT-2000 standardization association has adopted transmission antenna array (TXAA) modes 1 and 2, which are closed loop transmission diversity schemes for two antennas, in the 3 GPP (Generation Partnership Project) R (Release) 99 version. TxAA mode 1, suggested by Nokia, feeds back only a phase variation between two antennas, whereas TxAA mode 2, suggested by Motorola, feeds back the gains as well as phases of two antennas. TxAA modes 1 and 2 are disclosed in the specification for the UMTS (Universal Mobile Telecommunications System) by the 3 GPP.

TxAA mode 1 or 2 for closed loop transmission diversity uses an adaptive antenna array and applies different complex number weights to each antenna of the adaptive transmission antenna array. The weights applied to the adaptive antenna array are associated with transmission channels and thus are expressed as, for example, w=h*. Here, w is a transmission antenna array weight vector and h is a transmission array channel vector. Hereinafter, bold symbols indicate vectors and non-bold symbols indicate scalars.

In general, in a mobile communications system using a frequency division duplex (FDD) technique, transmission and reception channels have different characteristics, so there is need to feed back transmission channel information to identify the characteristic of a transmission channel h by the base station. According to TxAA mode 1 or 2, a mobile station calculates weight information w to be obtained from the channel information h and feeds the calculated weigh information back to the base station.

TxAA mode 1 quantizes only the phase component of the weight information w, $\theta_2-\theta_1$, into two bits and feeds back the result of the quantization. The weight information w is expressed as $w=[|w_1|\exp(j\theta_1), |w_2|\exp(j\theta_2)]$, where $w_1$ and $w_2$ are scalars. Here, the phase accuracy is B/2 and the maximum quantization error is B/4. A refined mode of updating only one of two bits at every time point is applied to increase feedback efficiency. As an example, possible combinations of two bits include {b(2k), b(2k−1)} and {b(2k), b(2k+1)}, where b indicates a bit fed back during every consecutive time slot.

TxAA mode 2 feeds back both the constituents, phase and gain, of the weight information. The phase of the weight information is fed back as 3 bits, and the gain of the weight information is fed back as 1 bit. Therefore, the phase accuracy is B/4 and the maximum quantization error is B/8. A progressive refined mode of updating only one of four bits at every time point is applied to increase feedback efficiency. This progressive refine mode provides no prescription, unlike the refine mode having the prescription that each bit should be an orthogonal basis value.

The above-described TxAA modes 1 and 2 have the following problems when the number of antennas and space-time channel characteristics vary.

First, when the number of antennas increases, the quantity of weights for each antenna that should be fed back also increases and thus communication performance may degrade depending on the migration speed of a mobile station. With increasing migration speed of a mobile station, space-time channel variations become serious on a common fading channel. In this case, the feedback speed of channel information should be increased. For this reason, if the feedback speed of channel information is limited, communication performance may degrade due to an increase in the amount of feedback information with an increase in the number of antennas.

Second, when antennas are not spaced sufficiently far apart, the correlation between channels for each antenna increases. This increased channel-to-channel correlation reduces the quantity of information carried in a channel matrix. Use of an effective feedback scheme can prevent communication performance degradation occurring with a mobile station migrating at a rapid speed, even with the increasing number of antennas. However, because TxAA modes 1 and 2 are defined under the assumption that two space-time channels for each antenna are independent, efficiency is not ensured when the number of antennas and space-time channel characteristics vary. In addition, TxAA modes 1 and 2 have not been applied for circumferences using more than two antennas.

SUMMARY OF THE INVENTION

In an effort to solve the above-described problems, it is a first feature of an embodiment of the present invention to provide a mobile communication apparatus with an antenna array, in which information reflecting time-space channel characteristics for each base station antenna is fed back to minimize the effects from fading, interference and noise.

It is a second feature of an embodiment of the present invention to provide a mobile communication method for the mobile communication apparatus with the antenna array.

To provide the first feature of the present invention, there is provided a mobile communication apparatus including a base station with an antenna array and a mobile station, wherein the mobile station determines a channel downlink characteristic for each antenna using a signal transmitted from the base station, determines long-term information and short-term information based on the correlation of characteristics between channels for each antenna using the channel downlink characteristic, converts the determined long-term information and short-term information to a feedback signal, and transmits the feedback signal to the base station, and the base station receives the feedback signal, extracts a plurality of weights from the long-term information and short-term information restored from the received feedback signal, multiplies a multiplexed dedicated physical channel signal by the respective weights, adds respective pilot channel signals to the products, and transmits the results of the additions through the antenna array to the mobile station.

The present invention also provides a mobile communication apparatus including a base station with an antenna array and a mobile station, wherein the mobile station determines a channel downlink characteristic for each antenna using a signal transmitted from the base station, determines short-term information based on the correlation of characteristics between channels for each antenna using the channel downlink characteristic, converts the determined short-term information to a feedback signal, and transmits the feedback signal to the base station; and wherein the base station determines a channel uplink characteristic for each antenna from a signal transmitted from the mobile station, extracts a plurality of weights based on long-term information determined using the channel uplink characteristic and the short-term information restored from the received feedback signal, multiplies a multiplexed dedicated physical channel signal by the respective weights, adds respective basis pilot signals, which are obtained using at least one pilot channel signal and the long-term information, to the products, and transmits the results of the additions through the antenna array to the mobile station.

To provide the second feature of the present invention, there is provided a mobile communication method using an antenna array for a mobile communication apparatus including a base station with the antenna array and a mobile station, the method comprising: (a) determining a channel downlink characteristic for each antenna using a signal transmitted from the base station, determining long-term information and short-term information based on the correlation of characteristics between channels for each antenna, using the channel downlink characteristic, converting the determined long-term information and short-term information to a feedback signal, and transmitting the feedback signal to the base station; and (b) receiving the feedback signal, extracting a plurality of weights from the long-term information and short-term information restored from the received feedback signal, multiplying a multiplexed dedicated physical channel signal by the respective weights, adding respective pilot signals to the products, and transmitting the results of the additions through the antenna array to the mobile station.

The present invention also provides a mobile communication method using an antenna array in a mobile communication apparatus including a base station with the antenna array and a mobile station, the method comprising: (a) determining a channel downlink characteristic for each antenna using a signal transmitted from the base station, determining short-term information based on the correlation of characteristics between channels for each antenna, using the channel downlink characteristic, converting the determined short-term information to a feedback signal, and transmitting the feedback signal to the base station; and (b) determining the channel uplink characteristic for each antenna from a signal transmitted from the mobile station, extracting a plurality of weights based on long-term information, which is determined using the channel uplink characteristic and the short-term information restored from the received feedback signal, multiplying a multiplexed dedicated physical channel signal by the respective weights, adding respective basis pilot signals, which are obtained using at least one pilot channel signal and the long-term information, to the products, and transmitting the results of the additions through the antenna array to the mobile station.

BRIEF DESCRIPTION OF THE DRAWINGS

The above features and advantages of the present invention will become more apparent by describing in detail preferred embodiments thereof with reference to the attached drawings in which:

FIG. 5 shows a flowchart illustrating a preferred embodiment for Step 42 of FIG. 3 according to the present invention, which involves obtaining the number of beams and effective basis vectors;

FIG. 6 shows a block diagram of a preferred embodiment for a mobile station (MS) long-term information determination unit of FIG. 4 according to the present invention, FIG. 7 shows a flowchart illustrating another preferred embodiment for Step 42 of FIG. 3 for generating a mode signal according to the present invention;

FIG. 8 shows a block diagram of a preferred embodiment of a first mode signal generation portion of FIG. 6 according to the present invention;

FIG. 9 shows a flowchart illustrating another embodiment for Step 42 of FIG. 3 for generating a mode signal according to the present invention;

FIG. 12 shows a block diagram of still another embodiment of the first mode signal generation portion of FIG. 6 according to the present invention;

FIG. 13 shows a flowchart illustrating an embodiment for Step 44 of FIG. 3 according to the present invention;

DETAILED DESCRIPTION OF THE INVENTION

Korean Patent Application Nos. 2001-27082 and 2001-29007, filed on May 17, 2001 and May 25, 2001, respectively, are incorporated by reference herein in their entireties.

The structure and operation of, and a mobile communication method for, each embodiment of a mobile communication apparatus with an antenna array according to the present invention will be described hereinafter with reference to the appended drawings.

Figure 1:
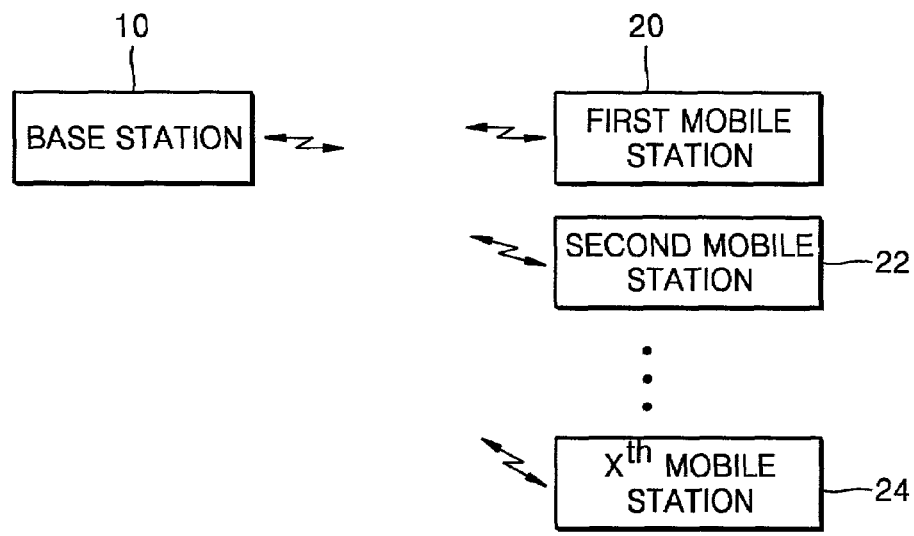
FIG. 1 shows a view of a mobile communication apparatus with an antenna array according to a preferred embodiment of the present invention.

Referring to FIG. 1, which is a schematic view of a mobile communication apparatus with an antenna array according to the present invention, the mobile communication apparatus includes a base station 10, a first mobile station 20, a second mobile station 22, ..., and an $X^{th}$ mobile station 24.

Figure 2:
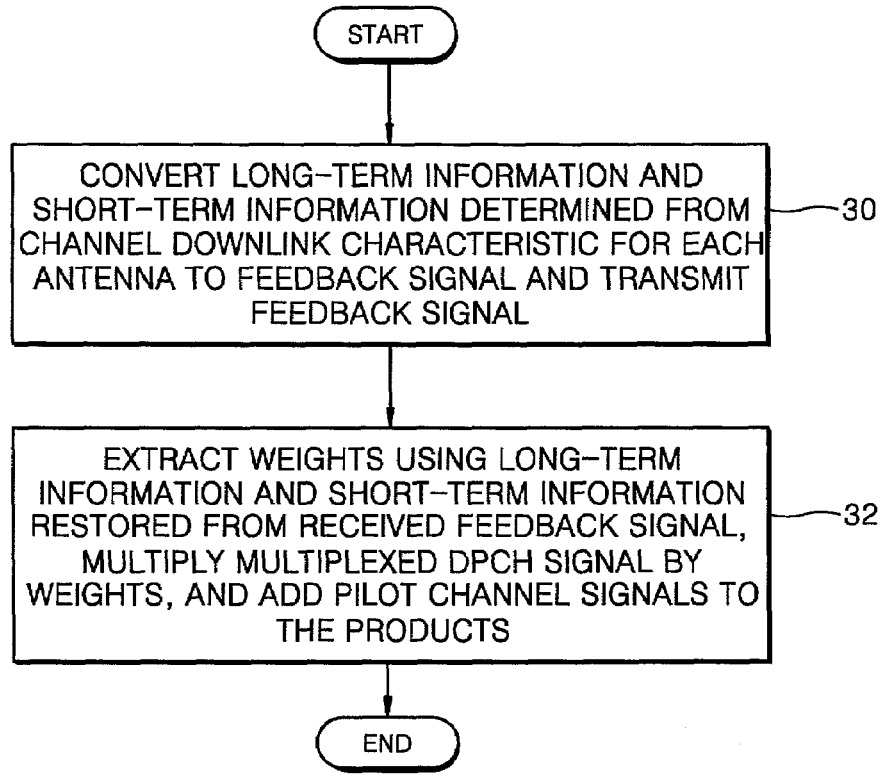
FIG. 2 shows a flowchart illustrating a preferred embodiment of a mobile communication method according to the present invention for the mobile communication apparatus of FIG. 1.

FIG. 2 shows a flowchart illustrating a preferred embodiment of a mobile communication method according to the present invention performed in the mobile communication apparatus shown in FIG. 1. The mobile communication method illustrated in FIG. 2 involves obtaining a feedback signal (Step 30) and extracting weights from the feedback signal (Step 32).

Each of the first through $X^{th}$ mobile stations 20 through 24 illustrated in FIG. 1 perform the same function and may be implemented with a terminal. Each mobile station 20, 22, ..., and 24 determines the channel downlink characteristic $H_{DL}$ for each antenna of an antenna array installed at the base station 10 (also, "base station antenna array") from a signal transmitted from the base station, determines long-term information and short-term information reflecting the correlation of the characteristics between channels for each antenna from the determined channel downlink characteristic $H_{DL}$, converts the determined long-term information and short-term information to a feedback signal, and transmits the feedback signal to the base station 10 (Step 30).

Embodiments of Step 30 and the mobile stations 20, 22, ..., or 24 according to the present invention will be described below with reference to the appended drawings.

Figure 3:
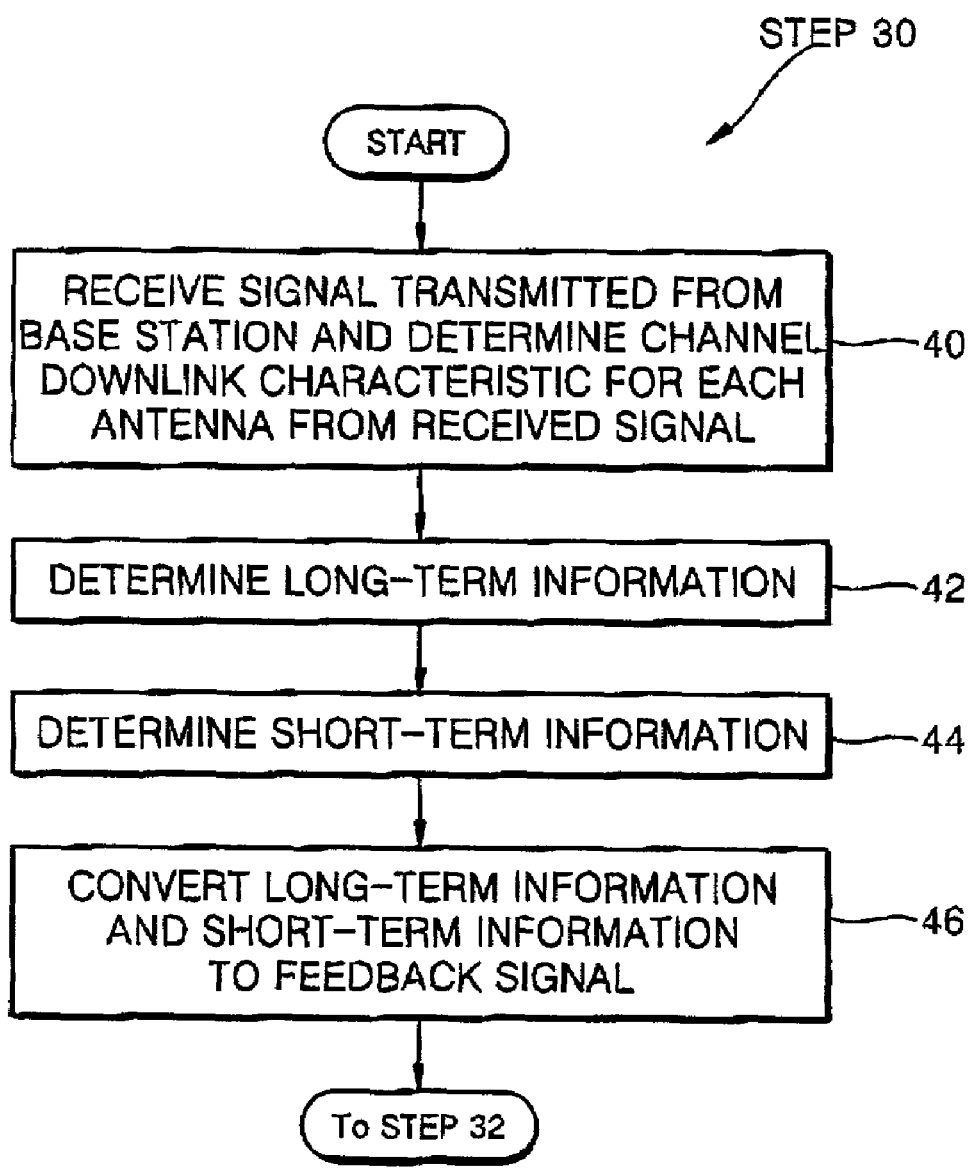
FIG. 3 shows a flowchart illustrating a preferred embodiment of Step 30 in the mobile communication method illustrated in FIG. 2.

FIG. 3 shows a flowchart illustrating a preferred embodiment of Step 30 in the mobile communication method illustrated in FIG. 2. This preferred embodiment involves determining the channel downlink characteristic $H_{DL}$ (Step 40), determining the long-term information and short-term information of the channel from the determined channel downlink characteristic $H_{DL}$ (Steps 42 and 44), and converting the determined long-term information and short-term information to the feedback signal (Step 46).

Figure 4:
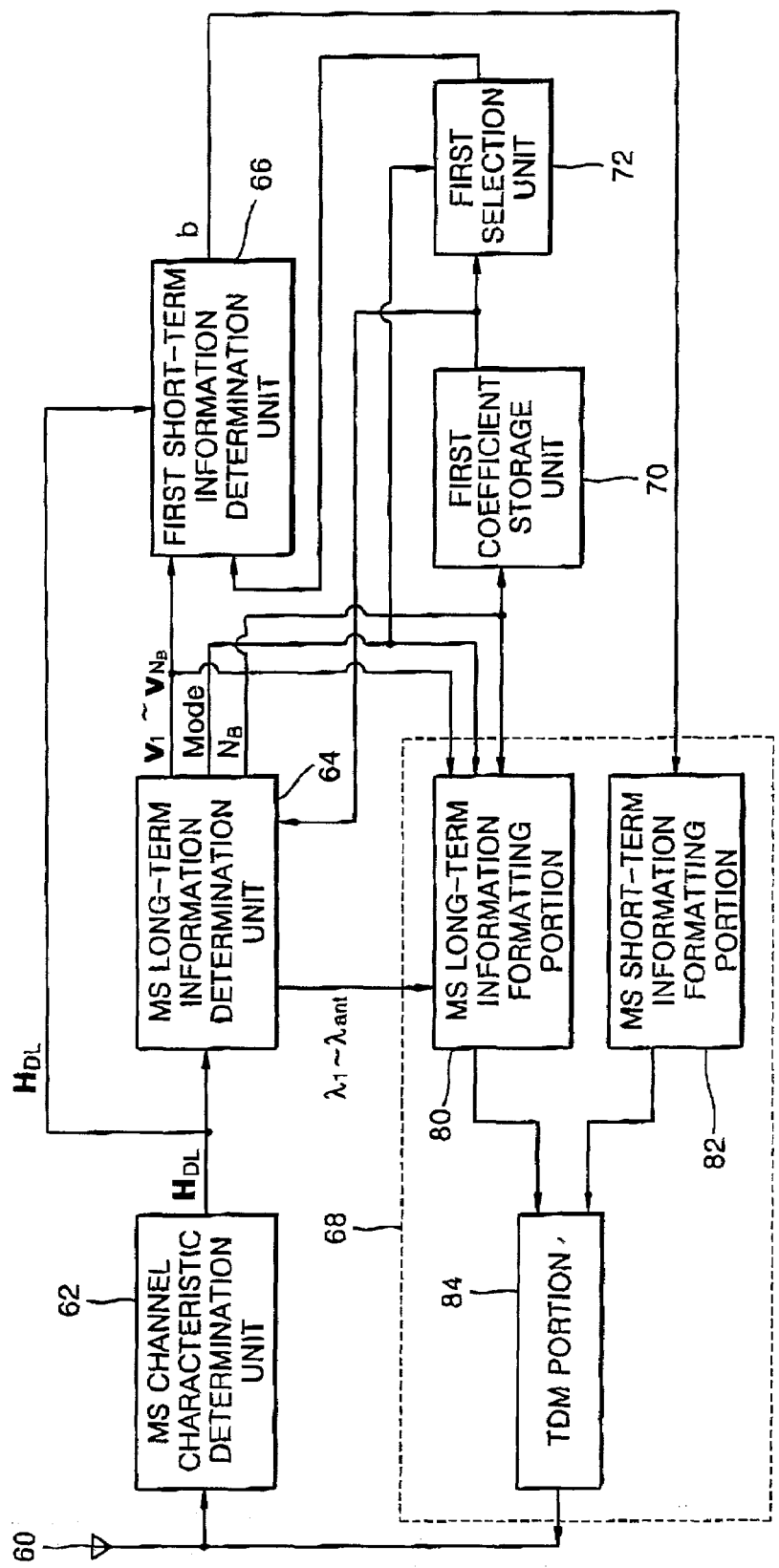
FIG. 4 shows a block diagram of a preferred embodiment of a first mobile station, second mobile station, or $X^{th}$ mobile station shown in FIG. 1.

FIG. 4 shows a block diagram of a preferred embodiment of the first mobile station 20, the second mobile station 22, ..., or the $X^{th}$ mobile station 24 shown in FIG. 1. The mobile station shown in FIG. 4 includes an antenna 60, a mobile station (MS) channel characteristic determination unit 62, an MS long-term information determination unit 64, a first short-term information determination unit 66, an MS signal conversion unit 68, a first coefficient storage unit 70, and a first selection unit 72.

The MS channel characteristic determination unit 62 shown in FIG. 4 receives a signal transmitted from the base station 10 of FIG. 1 through the antenna 60, determines the channel downlink characteristic $H_{DL}$ for each antenna from the received signal, and outputs the determined channel downlink characteristic $H_{DL}$ to the MS long-term information determination unit 64 and the first short-term information determination unit 66 (Step 40 of FIG. 3). Here, the channel downlink characteristic $H_{DL}$ means the phase and amplitude, or gain, of a signal transmitted from the base station 10 through a channel to the mobile station 20, 22, ..., or 24.

After Step 40, the MS long-term information determination unit 64 generates basis vectors and eigenvalues from the channel downlink characteristic $H_{DL}$, which is a space-time matrix determined by the MS channel characteristic determination unit 62 (Step 42 of FIG. 3). Also, in Step 42, the MS long-term information determination unit 64 calculates the number of beams $N_B$, which is equal to the number of effective basis vectors and is no greater than the number of antennas constituting the antenna array of the base station 10, from the eigenvalues. Furthermore, in Step 42, the MS long-term information determination unit 64 generates a mode signal Mode representing a combination mode of the effective basis vectors from the channel downlink characteristic $H_{DL}$. Also, in Step 42, the MS long-term information determination unit 64 determines and outputs the effective basis vectors $v_1 \sim v_{N_B}$, the number of beams $N_B$ and the mode signal Mode as the long-term information (Step 42 of FIG. 3). Here, the channel downlink characteristic $H_{DL}$ is a matrix with spatial column components and temporal row components.

Hereinafter, embodiments of Step 42 of FIG. 3 and the MS long-term information determination unit 64 of FIG. 4 will be described with reference to the appended drawings.

FIG. 5 shows a flowchart illustrating a preferred embodiment 42A for Step 42 of FIG. 3 according to the present invention for determining the number of beams $N_B$ and the effective basis vectors $v_1 \sim v_{N_B}$. The preferred embodiment 42A involves generating the basis vectors $v_1 \sim v_{ant}$ and the eigenvalues $\lambda_1 \sim \lambda_{ant}$ (Step 100), calculating the number of beams $N_B$ using the eigenvalues $\lambda_1 \sim \lambda_{ant}$ (Step 102), and obtaining the effective basis vectors $v_1 \sim v_{N_B}$ using the number of beams $N_B$ (Step 104).

FIG. 6 shows a block diagram of a preferred embodiment 64A for the MS long-term information determination unit 64 of FIG. 4 according to the present invention, which includes an eigen analysis portion 120, a second selection portion 122, a beam number calculation portion 124, and a first mode signal generation portion 126.

The eigen analysis portion 120 of FIG. 6 generates the basis vectors $v_1 \sim v_{ant}$ and the eigenvalues $\lambda_1 \sim \lambda_{ant}$, where ant corresponds to the number of antennas constituting the antenna array of the base station 10 (FIG. 1), based on the channel downlink characteristic $H_{DL}$ input from the MS channel characteristic determination unit 62 by a conventional eigen analysis technique, and outputs the generated basis vectors $v_1 \sim v_{ant}$ to the second selection portion 122 and the generated eigenvalues $\lambda_1 \sim \lambda_{ant}$ to the beam number calculation portion 124 (Step 100 of FIG. 5).

After Step 100, the beam number calculation portion 124 counts the number of eigenvalues which are greater than a first threshold value $V_{th1}$, and outputs the result of the counting as the number of beams $N_B$ to the second selection portion 122, the MS signal conversion unit 68 of FIG. 4, and the first coefficient storage unit 70 of FIG. 4 (Step 102 of FIG. 5). To this end, the beam number calculation portion 124 may be implemented with a counter (not shown). Here, the first threshold value $V_{th1}$ is set to a value of approximately zero.

After Step 102, the second selection portion 122 selects as many effective basis vectors $v_1 \sim v_{N_B}$ as the number of beams $N_B$ among the basis vectors $v_1 \sim v_{ant}$ input from the eigen analysis portion 120, and outputs the selected effective basis vectors $v_1 \sim v_{N_B}$ to the first short-term information determination unit 66 and the MS signal conversion unit 68 of FIG. 4 (Step 104 of FIG. 5).

The first mode signal generation portion 126 of the MS long-term information determination unit 64A of FIG. 6 generates a mode signal Mode using the channel downlink characteristic $H_{DL}$ input from the MS channel characteristic determination unit 62 and outputs the generated mode signal Mode to the first selection unit 72 and the MS signal conversion unit 68 shown in FIG. 4. That is, the first mode signal generation portion 126 determines whether a selection combination mode or an equal-gain combination mode provides the maximum reception power for the mobile station of FIG. 4 and generates a mode signal Mode representing the determined combination mode.

FIG. 7 shows a flowchart illustrating a preferred embodiment for Step 42 of FIG. 3 according to the present invention for generating a mode signal Mode. The preferred embodiment of FIG. 7 involves calculating expectation values (Step 140) and generating the mode signal Mode by comparing the expectation values (Steps 142 through 150).

FIG. 8 shows a block diagram of a preferred embodiment 126A of the first mode signal generation portion 126 of FIG. 6 according to the present invention. The preferred embodiment 126A of the first mode signal generation portion 126 includes a downlink short-term time-space covariance matrix ($R_{DL}^{ST}$) calculation portion 160, an expectation value calculation portion 162, and a first comparison portion 164.

After Step 104 of FIG. 5, the first mode signal generation portion 126A of FIG. 8 calculates expectation values for the respective combination modes using the channel downlink characteristic $H_{DL}$ input from the MS channel characteristic determination unit 62 of FIG. 4, the coefficients stored in tables selected for the respective combination modes corresponding to the number of beams $N_B$ from among tables predetermined with the number of beams $N_B$ and input through an input port IN1, and the effective basis vectors $v_1 \sim v_{N_B}$ input from the second selection portion 122 of FIG. 6 (Step 140 of FIG. 7). To this end, the downlink short-term time-space covariance matrix ($R_{DL}^{ST}$) calculation portion 160 of FIG. 8 calculates a downlink short-term time-space covariance matrix $R_{DL}^{ST}$ using the channel downlink characteristic $H_{DL}$ input from the MS channel characteristic determination unit 62 using formula (1) below and outputs the calculated downlink short-term time-space covariance matrix $R_{DL}^{ST}$ to the expectation value calculation portion 162:

$$R_{DL}^{ST} = E[H_{DL} H_{DL}^H] \tag{1}$$

where E[A] denotes an expectation value and $H_{DL}^H$ denotes the conjugate-transpose matrix of $H_{DL}$. The expectation value calculation portion 162 calculates an expectation value $E^{SL}$ for the selection combination mode and an expectation value $E^{EG}$ for the equal-gain combination mode based on the downlink short-term time-space covariance matrix $R_{DL}^{ST}$ input from the downlink short-term time-space covariance matrix ($R_{DL}^{ST}$) calculation portion 160, the coefficients of the tables for the respective combination modes with the number of beams $N_B$ used, which are input through the input port IN1 from the first coefficient storage unit 70, and the effective basis vectors $v_1 \sim v_{N_B}$ input from the second selection portion 122, using formula (2) below:

$$E^{SL} = E[w_s^H R_{DL}^{ST} w_s], \quad E^{EG} = E[w_e^H R_{DL}^{ST} w_e] \tag{2}$$

where $w_s^H R_{DL}^{ST} w_s = \max[w_s^H(b) R_{DL}^{ST} w_s(b)]$ (here, $0 \leq b \leq N_B - 1$), $w_e^H R_{DL}^{ST} w_e = \max[w_e^H(b) R_{DL}^{ST} w_e(b)]$ (here, $0 \leq b \leq 4^{N_B-1} - 1$), $w_s$ is a weight value calculated using formula (3) below and the coefficients of a table for the selection combination mode, $w_e$ is a weight value calculated using formula (4) below and the coefficients of a table for the equal-gain combination mode, $w_s^H$ is a conjugate-transpose matrix of $w_s$, and $w_e^H$ is a conjugate-transpose matrix of $w_e$:

$$w_s = \sum_{i=0}^{N_B-1} a_i^s(b) v_i \tag{3}$$

$$w_e = \sum_{i=0}^{N_B-1} a_i^e(b) v_i \tag{4}$$

where i is an integer from 0 to $N_B - 1$, $v_i$ is an effective basis vector, b is the index, $a_i^s(b)$ is a coefficient of a table determined by the selection combination mode among the coefficients, which is input from the first coefficient storage unit 70 of FIG. 4, and $a_i^e(b)$ is a coefficient determined by the equal-gain combination mode among coefficients, which is input from the first coefficient storage unit 70.

The first coefficient storage unit 70 of FIG. 4 described above previously stores the tables by the number of beams $N_B$ and combination modes, each of which has coefficients of the effective basis vectors $v_1 \sim v_{N_B}$ with indices b, and outputs the coefficients stored in tables corresponding to the number of beams $N_B$ input from the MS long-term information determination unit 64 to the MS long-term information determination unit 64 and the first selection unit 72, both of FIG. 4. Here, the coefficients output from the first coefficient storage unit 70 are included in the tables related to the number of beams $N_B$ regardless of the combination modes.

According to the present invention, the coefficients of the tables according to the combination modes for different number of beams $N_B$ stored in the first coefficient storage unit 70 are determined as follows.

First, coefficients $a_i(b)$ of tables for the selection combination mode are determined according to formula (5) below:

$$a_i(b) = \begin{cases} 1, & i = b \\ 0, & i \neq b \end{cases} \tag{5}$$

where $0 \leq b \leq N_B - 1$.

For example, a table for the selection combination mode with $N_B = 1$ includes no coefficient. A table for the selection combination mode with $N_B = 2$ includes coefficients $a_0(b)$ and $a_1(b)$ as in the following Table 1. A table for the selection combination mode with $N_B = 3$ includes coefficients $a_0(b)$, $a_1(b)$, and $a_2(b)$ as in the following Table 2. A table for the selection combination mode with $N_B = 4$ includes coefficients $a_0(b)$, $a_1(b)$, $a_2(b)$, and $a_3(b)$ as in the following Table 3.

TABLE 1

| b | $a_0(b)$ | $a_1(b)$ |
|---|---|---|
| 0 | 1 | 0 |
| 1 | 0 | 1 |

TABLE 2

| b | $a_0(b)$ | $a_1(b)$ | $a_2(b)$ |
|---|---|---|---|
| 0 | 1 | 0 | 0 |
| 1 | 0 | 1 | 0 |
| 2 | 0 | 0 | 1 |

TABLE 3

| b | $a_0(b)$ | $a_1(b)$ | $a_2(b)$ | $a_3(b)$ |
|---|---|---|---|---|
| 0 | 1 | 0 | 0 | 0 |
| 1 | 0 | 1 | 0 | 0 |
| 2 | 0 | 0 | 1 | 0 |
| 3 | 0 | 0 | 0 | 1 |

Next, coefficients $a_1(b)$ of tables for the equal-gain combination mode are determined according to formula (6) below:

$$a_i(b) = \begin{cases} 1, & i = 1 \\ \exp(j\frac{\pi}{4} + j\frac{\pi}{4}d(c(b), i)), & i \neq 1 \end{cases} \quad (6)$$

where $c(b) = \text{gray\_encoder}(b, B^{EG})$, $0 \leq b \leq B^{EG} - 1$, and $B^{EG} = 4^{N_B - 1}$. Here, gray_encoder is a gray encoding function for changing the order of vectors, for example, from [0 1 2 3] to [0 1 3 2], which is known in the art.

In formula (6) above, $d(c(b), i)$ is expressed as the following formula (7):

$$d(c(b), i) = \text{mod}\left(\left\lfloor \frac{c(b)}{4^{N_B - 1 - i}} \right\rfloor, 4\right) \quad (7)$$

where $$\left\lfloor \frac{l}{m} \right\rfloor$$

means the largest integer quotient when l is divided by m and mod(l', m') means the remainder when l' is divided by m'.

For example, a table for the equal-gain combination mode with $N_B = 1$ includes no coefficient. A table for the equal-gain combination mode $N_B = 2$ includes coefficients $a_0(b)$ and $a_1(b)$ as in the following Table 4. A table for the equal-gain combination mode with $N_B = 3$ includes coefficients $a_0(b)$, $a_1(b)$, and $a_2(b)$ as in the following Table 5.

TABLE 4

| b | $a_0(b)$ | $a_1(b)$ |
|---|---|---|
| 0 | 1 | $\exp(j\frac{\pi}{4})$ |
| 1 | 1 | $\exp(j\frac{3\pi}{4})$ |
| 2 | 1 | $\exp(-j\frac{\pi}{4})$ |
| 3 | 1 | $\exp(-j\frac{3\pi}{4})$ |

TABLE 5

| b | $a_0(b)$ | $a_1(b)$ | $a_2(b)$ |
|---|---|---|---|
| 0 | 1 | $\exp(j\frac{\pi}{4})$ | $\exp(j\frac{\pi}{4})$ |
| 1 | 1 | $\exp(j\frac{\pi}{4})$ | $\exp(j\frac{3\pi}{4})$ |
| 2 | 1 | $\exp(j\frac{\pi}{4})$ | $\exp(-j\frac{\pi}{4})$ |
| 3 | 1 | $\exp(j\frac{\pi}{4})$ | $\exp(-j\frac{3\pi}{4})$ |
| 4 | 1 | $\exp(j\frac{3\pi}{4})$ | $\exp(j\frac{\pi}{4})$ |
| 5 | 1 | $\exp(j\frac{3\pi}{4})$ | $\exp(j\frac{3\pi}{4})$ |
| 6 | 1 | $\exp(j\frac{3\pi}{4})$ | $\exp(-j\frac{\pi}{4})$ |
| 7 | 1 | $\exp(j\frac{3\pi}{4})$ | $\exp(-j\frac{3\pi}{4})$ |
| 8 | 1 | $\exp(-j\frac{\pi}{4})$ | $\exp(j\frac{\pi}{4})$ |
| 9 | 1 | $\exp(-j\frac{\pi}{4})$ | $\exp(j\frac{3\pi}{4})$ |
| 10 | 1 | $\exp(-j\frac{\pi}{4})$ | $\exp(-j\frac{\pi}{4})$ |
| 11 | 1 | $\exp(-j\frac{\pi}{4})$ | $\exp(-j\frac{3\pi}{4})$ |
| 12 | 1 | $\exp(-j\frac{3\pi}{4})$ | $\exp(j\frac{\pi}{4})$ |
| 13 | 1 | $\exp(-j\frac{3\pi}{4})$ | $\exp(j\frac{3\pi}{4})$ |
| 14 | 1 | $\exp(-j\frac{3\pi}{4})$ | $\exp(-j\frac{\pi}{4})$ |
| 15 | 1 | $\exp(-j\frac{3\pi}{4})$ | $\exp(-j\frac{3\pi}{4})$ |

After Step 140 of FIG. 7, the first comparison portion 164 compares the expectation values $E^{SL}$ and $E^{EG}$ input from the expectation value calculation portion 162, generates a mode signal Mode in response to the result of the comparison, and outputs the generated mode signal Mode to the first selection portion 72 and the MS signal conversion unit 68, both of FIG. 4, (Steps 142 through 150 of FIG. 7).

The operation of the first comparison portion 164 will be described in greater detail. The first comparison portion 164 first determines whether the expectation value $E^{SL}$ for the selection combination mode is larger than the expectation value $E^{EG}$ for the equal-gain combination mode (Step 142 of FIG. 7). If the expectation value $E^{SL}$ for the selection combination mode is determined to be larger than the expectation value $E^{EG}$ for the equal-gain combination mode, the first comparison portion 164 generates and outputs a mode signal Mode representing the selection combination mode (Step 144 of FIG. 7). In contrast, if the expectation value $E^{SL}$ for the selection combination mode is determined to be smaller than the expectation value $E^{EG}$ for the equal-gain combination mode, the first comparison portion 164 generates and outputs a mode signal Mode representing the equal-gain combination mode (Step 148 of FIG. 7). If the expectation value $E^{SL}$ for the selection combination mode is determined to be equal to the expectation value $E^{EG}$ for the equal-gain combination mode, the first comparison portion 164 generates and outputs a mode signal Mode representing either the combination mode or the equal-gain combination mode (Step 150 of FIG. 7).

Alternatively, the MS long-term information determination unit 64 of FIG. 4 may generate a mode signal Mode without using the coefficients output from the first coefficient storage unit 70 of FIG. 4 and the effective basis vectors $v_1 \sim v_{N_B}$ output from the second selection portion 122 of FIG. 6. Embodiments 126B of FIGS. 10 and 126C of FIG. 12, both of the first mode signal generation portion 126 according to the present invention, which operates in this manner to generate a mode signal Mode, will be described for structure and operation. Also, embodiments for Step 42 of FIG. 3 according to the present invention in each of the embodiments 126B and 126C will be described.

FIG. 9 shows a flowchart illustrating another embodiment for Step 42 of FIG. 3 according to the present invention for generating a mode signal Mode (Steps 180 through 186) using the direction of arrival (DOA) at a mobile station.

Figure 10:
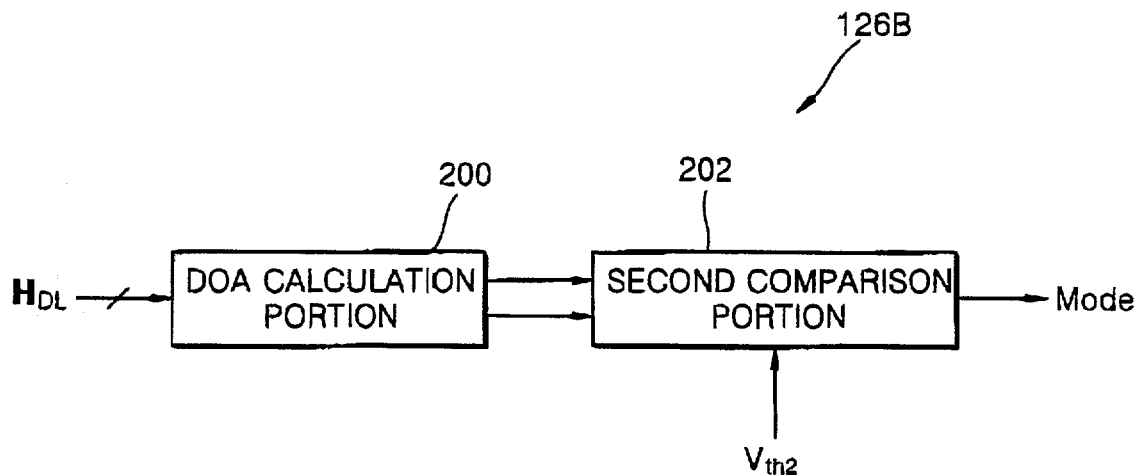
FIG. 10 shows a block diagram of another embodiment of the first mode signal generation portion of FIG. 6 according to the present invention.

FIG. 10 shows a block diagram of another embodiment 126B of the first mode signal generation portion 126 of FIG. 6 according to the present invention, which includes a DOA calculation portion 200 and a second comparison portion 202. The DOA calculation portion 200 of the first mode signal generation portion 126B shown in FIG. 10 calculates DOA's at the mobile station 20, 22, or 24 of FIG. 1 using the channel downlink characteristic $H_{DL}$ input from the MS channel characteristic determination unit 62 of FIG. 4, and calculates a difference between adjacent calculated DOA's (Step 180 of FIG. 9).

After Step 180, the second comparison portion 202 compares the difference between adjacent DOA's input from the DOA calculation portion 200 with a second threshold value $V_{th2}$, generates a mode signal Mode according to the result of the comparison, and outputs the generated mode signal Mode to the first selection unit 72 and the MS signal conversion unit 68 of FIG. 4 (Steps 182 through 186 of FIG. 9). The operation of the second comparison portion 202 will be described below in greater detail.

The second comparison portion 262 determines whether the difference between adjacent DOA's input from the DOA calculation portion 200 is larger than the second threshold value $V_{th2}$ (Step 182 of FIG. 9). If the difference between adjacent DOA's is determined to be larger than the second threshold value $V_{th2}$, the second comparison portion 202 generates and outputs a mode signal Mode representing the equal-gain combination mode (Step 184 of FIG. 9). In contrast, if the difference between adjacent DOA's is determined to be less than or equal to the second threshold value $V_{th2}$, the second comparison portion 202 generates and outputs a mode signal Mode representing the selection combination mode (Step 186 of FIG. 9). Here, Steps 180 through 186 may be performed at the same time as, before, or after Steps 100 through 104 of FIG. 5.

Figure 11:
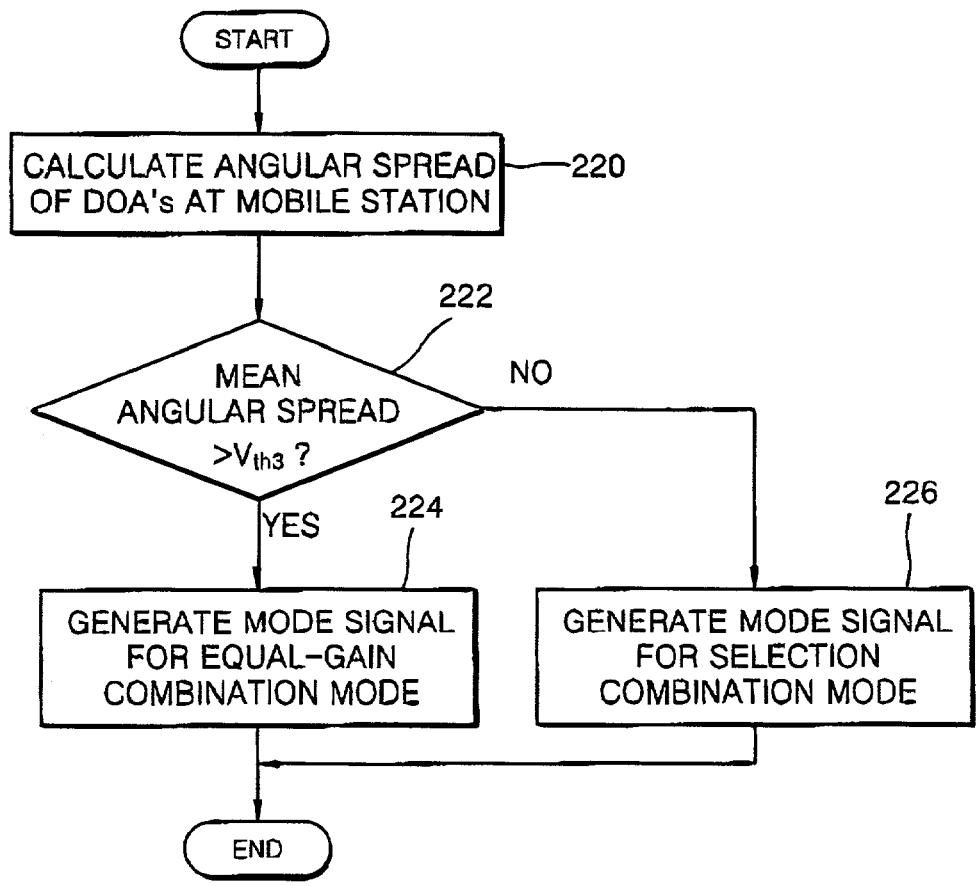
FIG. 11 shows a flowchart illustrating still another embodiment for Step 42 of FIG. 3 for generating a mode signal according to the present invention.

FIG. 11 shows a flowchart illustrating still another embodiment for Step 42 of FIG. 3 according to the present invention for generating a mode signal Mode using the angular spread of arrivals at a mobile station (Steps 220 through 226).

FIG. 12 shows a block diagram of still another embodiment 126C of the first mode signal generation portion 126 of FIG. 6 according to the present invention, which includes an angular spread calculation portion 240 and a third comparison portion 242. The angular spread calculation portion 240 of the first mode signal generation portion 126C of FIG. 12 calculates the angular spread of arrivals at the mobile station 20, 22, or 24 of FIG. 1 using the channel downlink characteristic $H_{DL}$ input from the MS channel characteristic determination unit 62 of FIG. 4, calculates the mean angular spread, and outputs the mean angular spread to the third comparison portion 242 (Step 220 of FIG. 11).

After Step 220, the third comparison portion 242 compares the mean angular spread input from the angular spread calculation portion 240 with a third threshold value $V_{th3}$, generates a mode signal Mode according to the result of the comparison, and outputs the generated mode signal Mode to the first selection unit 72 and the MS signal conversion unit 68 of FIG. 4 (Steps 222 through 226 of FIG. 11). The operation of the third comparison portion 242 will be described below in greater detail.

The third comparison portion 242 first determines whether the mean angular spread input from the angular spread calculation portion 240 is larger than the third threshold value $V_{th3}$ (Step 222 of FIG. 11). If the mean angular spread is determined to be larger than the third threshold value $V_{th3}$, the third comparison portion 242 generates and outputs a mode signal Mode representing the equal-gain combination mode (Step 224 of FIG. 11). In contrast, if the mean angular spread is determined to be less than or equal to the third threshold value $V_{th3}$, the third comparison portion 242 generates and outputs a mode signal Mode representing the selection combination mode (Step 226 of FIG. 11). Here, Steps 220 through 226 may be performed at the same time as, before, or after Steps 100 through 104 of FIG. 5.

The process of calculating the DOA's from the channel downlink characteristic $H_{DL}$ by the DOA calculation portion 200 shown in FIG. 10 and the process of calculating the angular spread of arrivals from the channel downlink characteristic $H_{DL}$ by the angular spread calculation portion 240 shown in FIG. 12 are known in the art.

After Step 42 of FIG. 3, the first short-term information determination unit 66 of FIG. 4 calculates weight vectors by combining the coefficients of a table for the corresponding number of beams $N_B$ and the combination mode according to the mode signal Mode output from the MS long-term information determination unit 64 of FIG. 4, which is one of the tables stored in the first coefficient storage unit 70 of FIG. 4, with the effective basis vectors $v_1 \sim v_{N_B}$ input from the MS long-term information determination unit 64, finds an index b resulting in the maximum reception power based on the calculated weight vectors and the channel downlink characteristic $H_{DL}$, determines the found index b as short-term information, and outputs the determined short-term information b to the MS signal conversion unit 68 of FIG. 4 (Step 44 of FIG. 3). To assist the first short-term information determination unit 66 in performing Step 44, the first selection unit 72 of FIG. 4 is provided.

Referring to FIG. 4, the first selection unit 72 selects the coefficients of the table corresponding to the combination mode according to the mode signal Mode input from the MS long-term information determination unit 64, among the coefficients of the tables for both combination modes with the corresponding number of beams $N_B$, and outputs the selected coefficients to the first short-term information determination unit 66. The coefficients output from the first selection unit 72 are included in the table related to the number of beams $N_B$ and the combination mode according to the mode signal Mode.

When the number of beams $N_B$ is equal to 1, the first short-term information determination unit 66 outputs no short-term information b to the MS signal conversion unit 68. This is because the table for $N_B$=1 includes no coefficient and thus, no coefficient can be output from the first coefficient storage unit 70. Unlike the configuration of FIG. 4, the MS long-term information determination unit 64 may output the number of beams $N_B$ to the first short-term information determination unit 66, and the first short-term information determination unit 66 may output no short-term information b to the MS signal conversion unit 68 when it receives the number of beams $N_B$ equal to 1 from the MS long-term information determination unit 64.

Embodiments for Step 44 of FIG. 3 and the first short-term information determination unit 66 of FIG. 4 according to the present invention will be described with reference to the appended drawings.

FIG. 13 shows a flowchart illustrating an embodiment 44A for Step 44 of FIG. 3 according to the present invention. The embodiment 44A involves obtaining weight vectors (Step 260) and finding an index b resulting in the maximum reception power value among reception power values calculated using the weight vectors (Steps 262 and 264).

Figure 14:
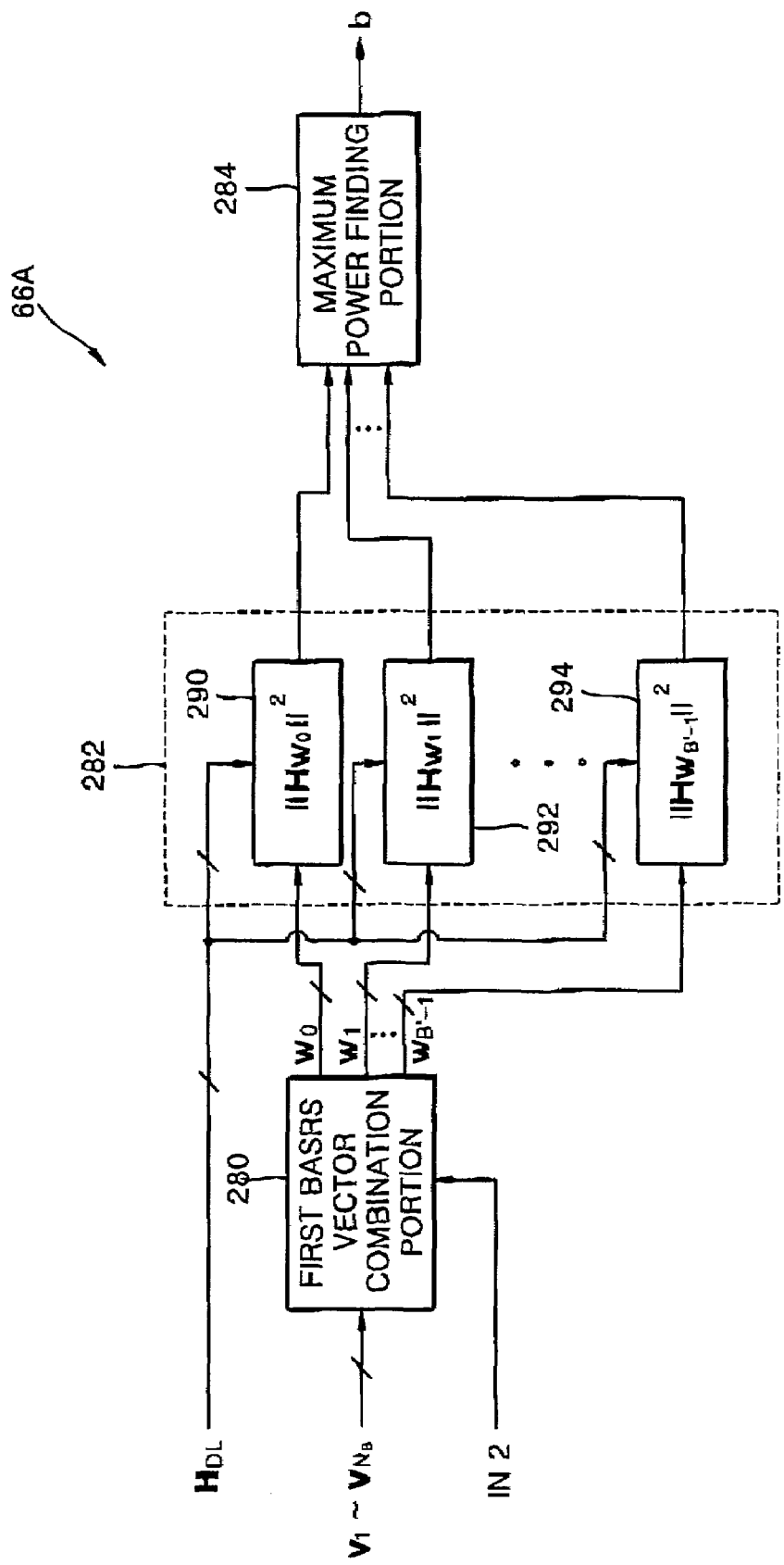
FIG. 14 shows a block diagram of a preferred embodiment of a first short-term information determination unit of FIG. 4.

FIG. 14 shows a block diagram of a preferred embodiment 66A of the first short-term information determination unit 66 of FIG. 4, which includes a first basis vector combination portion 280, a reception power calculation portion 282, and a maximum power finding portion 284.

After Step 42 of FIG. 3, referring to FIGS. 13 and 14, the first basis vector combination portion 280 receives the coefficients of the table corresponding to the number of beams $N_B$ and the combination mode according to the mode signal Mode, $a_0 \sim a_{N_B-1}$, through an input port IN2 from the first selection unit 72 of FIG. 4, combines the effective basis vectors $v_1 \sim v_{N_B}$ input from the MS long-term information determination unit 64 with the received coefficients $a_0 \sim a_{N_B-1}$ using formula (8) below, and outputs the resulting combinations as weight vectors $w_0 \sim w_{B'-1}$ to the reception power calculation portion 282 (Step 260).

$$w_b = \sum_{i=0}^{N_B-1} a_i(b)v_{i+1} \quad (8)$$

where $0 \leq b \leq B'-1$, and B' is equal to $N_B$ in the selection combination mode and is equal to $4^{N_B-1}$ in the equal-gain combination mode.

After Step 260, the reception power calculation portion 282 multiplies the respective weight vectors $w_0 \sim w_{B'-1}$ input from the first basis combination portion 280 by the channel downlink characteristic $H_{DL}$ input from the MS channel characteristic determination unit 62 of FIG. 4, calculates the norm square of the respective products using formula (9) below to obtain the reception power values, and outputs the resultant reception power values to the maximum power finding portion 284 (Step 262).

$$\|H_{DL}w_b\|^2 \quad (9)$$

where the operator $\|\ \|$ denotes the norm operation. To perform Step 262, the reception power calculation portion 282 may include B' reception power calculators 290, 292, ..., and 294. Each reception power calculator 290, 292, ..., and 294 receives the respective weight vectors from the first basis vector combination portion 280, multiplies the respective weight vectors by the channel downlink characteristic $H_{DL}$, calculates the norm square of the respective products as B' reception power values using formula (9) above, and outputs the calculated reception power values to the maximum power finding portion 284.

After Step 262, the maximum power finding portion 284 finds as the maximum reception power value the largest power reception value among the B' reception power values input from the reception power calculation portion 282 and outputs an index b for the coefficients $a_0(b) \sim a_{N_B-1}(b)$ used to calculate the weight vector $w_b$ resulting in the maximum reception power value to the MS signal conversion unit 68 of FIG. 4 as short-term information (Step 264).

Referring to FIG. 4, after Step 44 of FIG. 3, the MS signal conversion unit 68 receives the long-term information determined in the MS long-term information determination unit 64 and the short-term information b determined in the first short-term information determination unit 66, converts the received long-term information and short-term information to a feedback signal, and transmits the converted feedback signal through the antenna 60 to the base station 10 (Step 46 of FIG. 3). To this end, the MS signal conversion unit 68 may be implemented with a MS long-term information formatting portion 80, a MS short-term information formatting portion 82, and a time division multiplexing (TDM) portion 84. In particular, the MS long-term information formatting portion 80 formats the long-term information input from the MS long-term information determination unit 64 and outputs the formatted result to the TDM portion 84. The MS short-term information formatting portion 82 formats the short-term information b input from the first short-term information determination unit 66 and outputs the formatted result to the TDM portion 84. The TDM portion 84 time-division-multiplexes the formatted result output from the MS long-term information formatting portion 80 and the formatted result output from the MS short-term information formatting portion 82 and transmits the result of the TDM as a feedback signal to the base station 10 of FIG. 1 through the antenna 60. As an example, the feedback signal output from the TDM portion 84 may have a repeating pattern of four short-term information followed by one long-term information or may be a single bundle of many short-term information and followed by a single bundle of many long-term information. According to the present invention, the TDM portion 84 may be replaced by a code division multiplexing portion (not shown) or a frequency division multiplexing portion (not shown).

The long-term information output from the MS long-term information determination unit 64 is affected by the location of the mobile station and reflects channel variations for a long term. The long-term information changes very slowly and the quantity of the long-term information which is processed at one time is relatively large. In contrast, the short-term information output from the first short-term information determination unit 66 is affected by the movement of the mobile station and reflects channel variations for a short term. Although the quantity of the short-term information which is processed at one time is relatively small, the short-term information requires a wide bandwidth when fed back to the base station due to its rapid variation rate. Therefore, the MS signal conversion unit 68 of FIG. 4 separates the long-term information and the short-term information, converts two pieces of information to have a term adapted to its characteristic, and transmits the result of the conversion to the base station 10 of FIG. 1.

In an alternative embodiment according to the present invention, the MS long-term information determination unit 64 of FIG. 4 may generate no mode signal Mode. In this case, the same structures and operations of the mobile station of FIG. 4 and its embodiments as those described above are applied with the following exception.

First of all, there is no reason for the first mode signal generation portion 126 to remain in the MS long-term information determination unit 64A shown in FIG. 6. Referring to FIG. 4, the first short-term information determination unit 66 combines the coefficients of a table for the corresponding number of beams $N_B$, which is selected from the tables stored in the first coefficient storage unit 70, with the effective basis vectors $v_1 \sim v_{N_B}$ input from the MS long-term information determination unit 64 to obtain the weight vectors $w_0 \sim w_{B'-1}$. In this case, the first coefficient storage unit 70 may store only the tables for either the selection combination mode or the equal-gain combination mode, not both the modes. Unlike the configuration of FIG. 4, each mobile station 20, 22, ..., and 24 of FIG. 1 may not include the first selection unit 72. That is, the coefficients of the table corresponding to the number of beams $N_B$ and output from the first coefficient storage unit 70 are directly output to the first short-term information determination unit 66. This is because the coefficients of the table related to the number of beams $N_B$ irrespective of the combination modes are combined with the effective basis vectors $v_1 \sim v_{N_B}$ to obtain the weight vectors $w_0 \sim w_{B'-1}$, in the first short-term information determination unit 66.

The first basis vector combination portion 280 shown in FIG. 14 receives the coefficients of the table corresponding to the number of beams $N_B$, $a_0 \sim a_{N_B-1}$, through the input port IN2 from the first coefficient storage unit 70, combines the effective basis vectors $v_1 \sim v_{N_B}$ input from the MS long-term information determination unit 64 with the received coefficients $a_0 \sim a_{N_B-1}$ using formula (8) above, and outputs the resulting combinations as the weight vectors $w_0 \sim w_{B'-1}$ to the reception power calculation portion 282 of FIG. 14 (Step 260 of FIG. 13). In formula (8) above, B' is set to $N_B$ or $4^{N_B-1}$ according to whether the tables stored in the first coefficient storage unit 70 are for the selection combination mode or the equal-gain combination mode, respectively.

After Step 30 of FIG. 2, the base station 10 shown in FIG. 1 receives the feedback signal transmitted from the first mobile station 20, the second mobile station 22, ..., or the $X^{th}$ mobile station 24 of FIG. 1, extracts a plurality of weights from the long-term information and short-term information restored from the received feedback signal, multiplies a multiplexed dedicated physical channel (DPCH) signal by the respective weights, adds pilot channel (PICH) signals $P_1(k), P_2(k), P_3(k), \ldots$, and $P_{ant}(k)$ to the respective products, and transmits the results of the additions through the antenna array to the first mobile station 20, the second mobile station 22, ..., or the $X^{th}$ mobile station 24 (Step 32 of FIG. 2).

Hereinafter, embodiments of the base station 10 of FIG. 1 and Step 32 of FIG. 2 of the present invention will be described with reference to the appended drawings.

Figure 15:
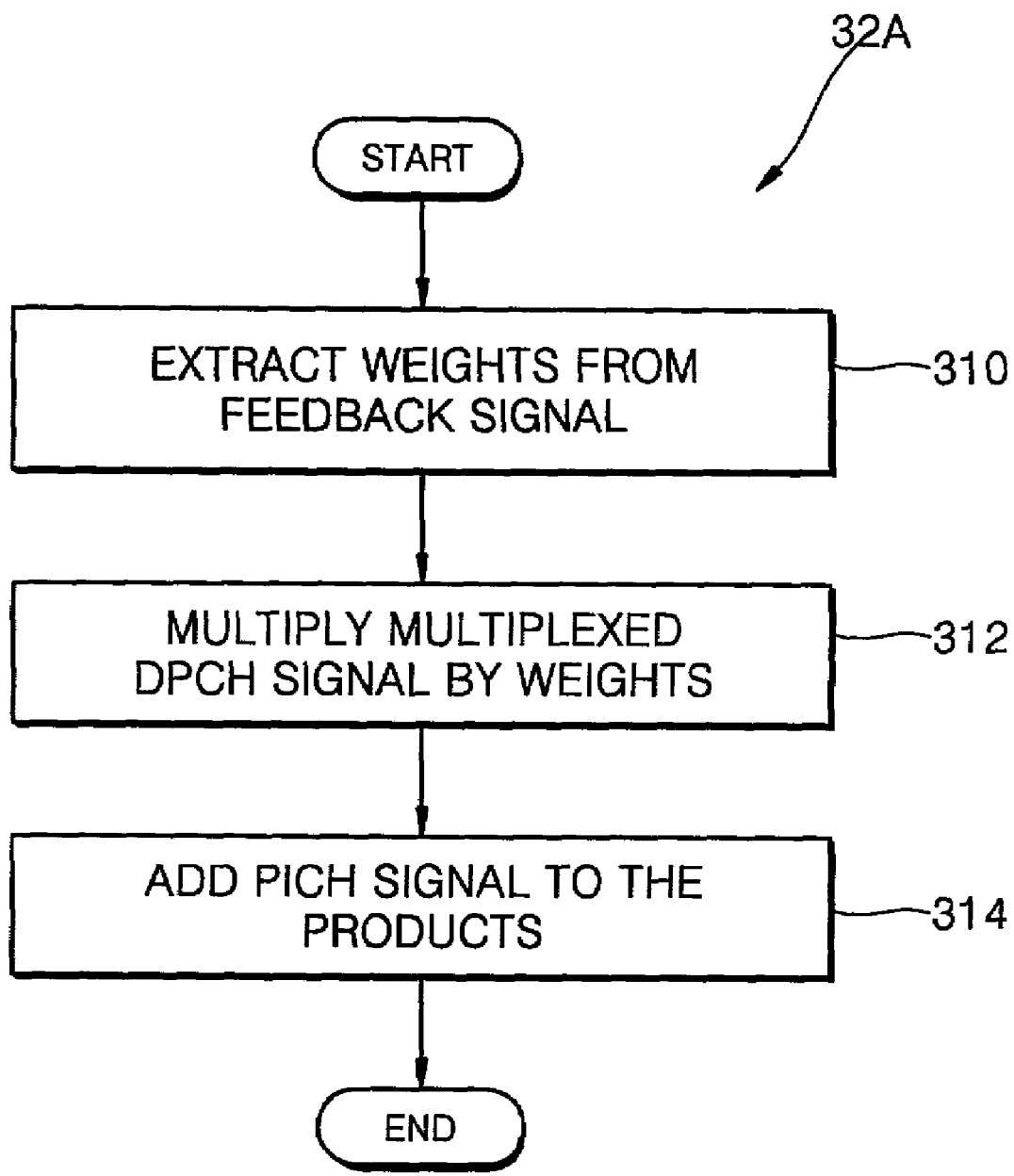
FIG. 15 shows a flowchart illustrating an embodiment for Step 32 of FIG. 2 according to the present invention.

FIG. 15 shows a flowchart illustrating an embodiment 32A for Step 32 of FIG. 2 according to the present invention. The embodiment 32A involves extracting weights (Step 310), multiplies a multiplexed DPCH signal by the respective weights, and adds the respective PICH signals to the products (Steps 312 and 314).

Figure 16:
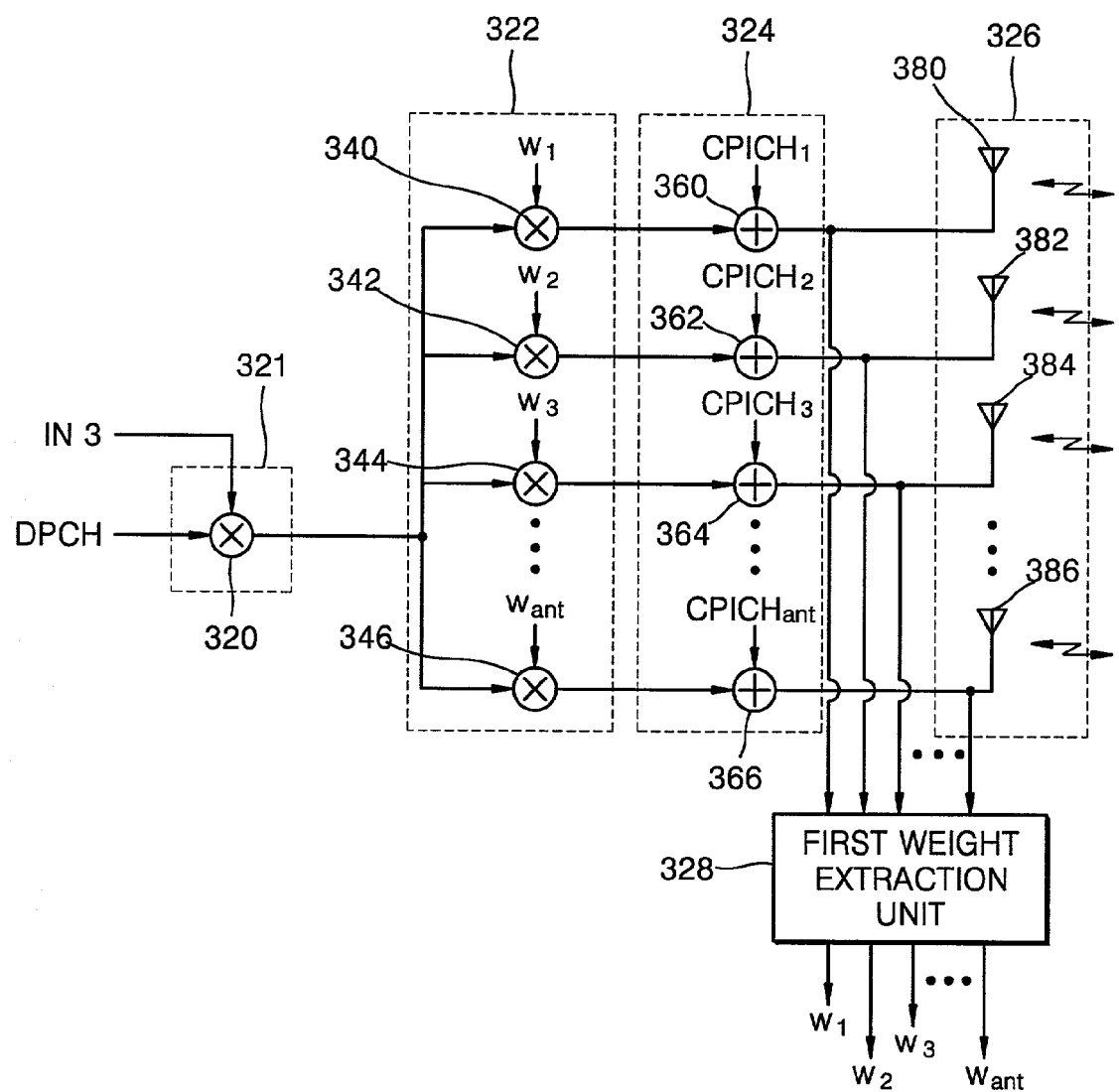
FIG. 16 shows a block diagram of an embodiment of a base station shown in FIG. 10 according to the present invention.

FIG. 16 shows a block diagram of an embodiment of the base station 10 shown in FIG. 1 according to the present invention, which includes a multiplexing unit 321, a multiplication unit 322, an addition unit 324, an antenna array 326, and a first weight extraction unit 328.

To perform Step 32 of FIG. 2, with reference to FIGS. 15 and 16, the first weight extraction unit 328 restores the long-term information and short-term information from the feedback signal received through an uplink dedicated physical control channel (DPCCH) from the antenna array 326, extracts a plurality of weights $w_1 \sim w_{ant}$ from the restored long-term information and short-term information, and outputs the extracted weights $w_1 \sim w_{ant}$ to the multiplication unit 322 (Step 310).

After Step 310, the multiplication unit 322 multiplies the DPCH signal multiplexed by and input from the multiplexing unit 321 by the respective weights $w_1 \sim w_{ant}$ extracted by the first weight extraction unit 328 and outputs the products to the addition unit 324 (Step 312). If the mobile communication apparatus and method according to the present invention employ a CDMA scheme, the multiplexing unit 321 may be implemented with a multiplier 320 that multiplies the DPCH signal by a SPREAD/SCRAMBLE signal input through an input port IN3 and outputs the product as the result of the multiplexing to the multiplication unit 322. If the mobile communication apparatus and method according to the present invention employ a TDMA scheme, the multiplexing unit 321 may be implemented with a TDM unit (not shown) that time-division-multiplexes a DPCH signal, which are different by users, and outputs the result of the TDM to the multiplication unit 322. The base station of FIG. 16 may further include a DPCH signal generator (not shown) that receives a DPCCH signal and a dedicated physical data channel (DPDCH) signal and multiplexes the received DPCCH signal and DPDCH signal according to the format of the DPCH signal.

To perform Step 312, the multiplication unit 322 may include ant multipliers 340, 342, 344, ..., and 346. Each multiplier 340, 342, 344, ..., and 346 multiplies the result of the multiplexing from the multiplexing unit 321 by the respective weights $w_1 \sim w_{ant}$ output from the first weight extraction unit 328 and outputs the resultant products to the addition unit 324.

After Step 312, the addition unit 324 adds the PICH signals $P_1(k), P_2(k), P_3(k), \ldots$, and $P_{ant}(k)$ to the respective products input from the multiplication unit 322 and outputs the results of the additions to the antenna array 326 (Step 314). Here, the PICH signal $P_i(k)$, where $1 \leq i \leq ant$, may be a common pilot channel (CPICH) signal, a dedicated common pilot channel (DCPICH) signal, or a secondary common pilot channel (SCPICH) signal. To perform Step 314, the addition unit 324 may include ant adders 360, 362, 364, ..., and 366. The adders 360, 362, 364, ..., and 366 add the products output from the multipliers 340, 342, 344, ..., and 346 of the multiplication unit 322 to the respective PICH signals $P_1(k), P_2(k), P_3(k), \ldots$, and $P_{ant}(k)$ and output the results of the additions to the antenna array 326.

The antenna array 326 acts to transmit the results of the additions output from the addition unit 324 to the first mobile station 20, the second mobile station 22, ..., or the $X^{th}$ mobile station 24 of FIG. 1. To this end, the antenna array 326 comprises ant antennas 380, 382, 384, and 386. Each antenna 380, 382, 384, ..., and 386 transmits the results of the additions from the respective adders 360, 362, 364, ..., and 366 to the respective mobile stations 20, 22, ..., and 24.

Hereinafter, an embodiment 328A of FIG. 18 according to the present invention for the first weight extraction unit 328 shown in FIG. 16 will be described for its structure and operation with reference to the appended drawings. Also, an embodiment 310A of FIG. 17 for the step of extracting weights by the first weight extraction unit 328A according to the present invention will be described.

Figure 17:
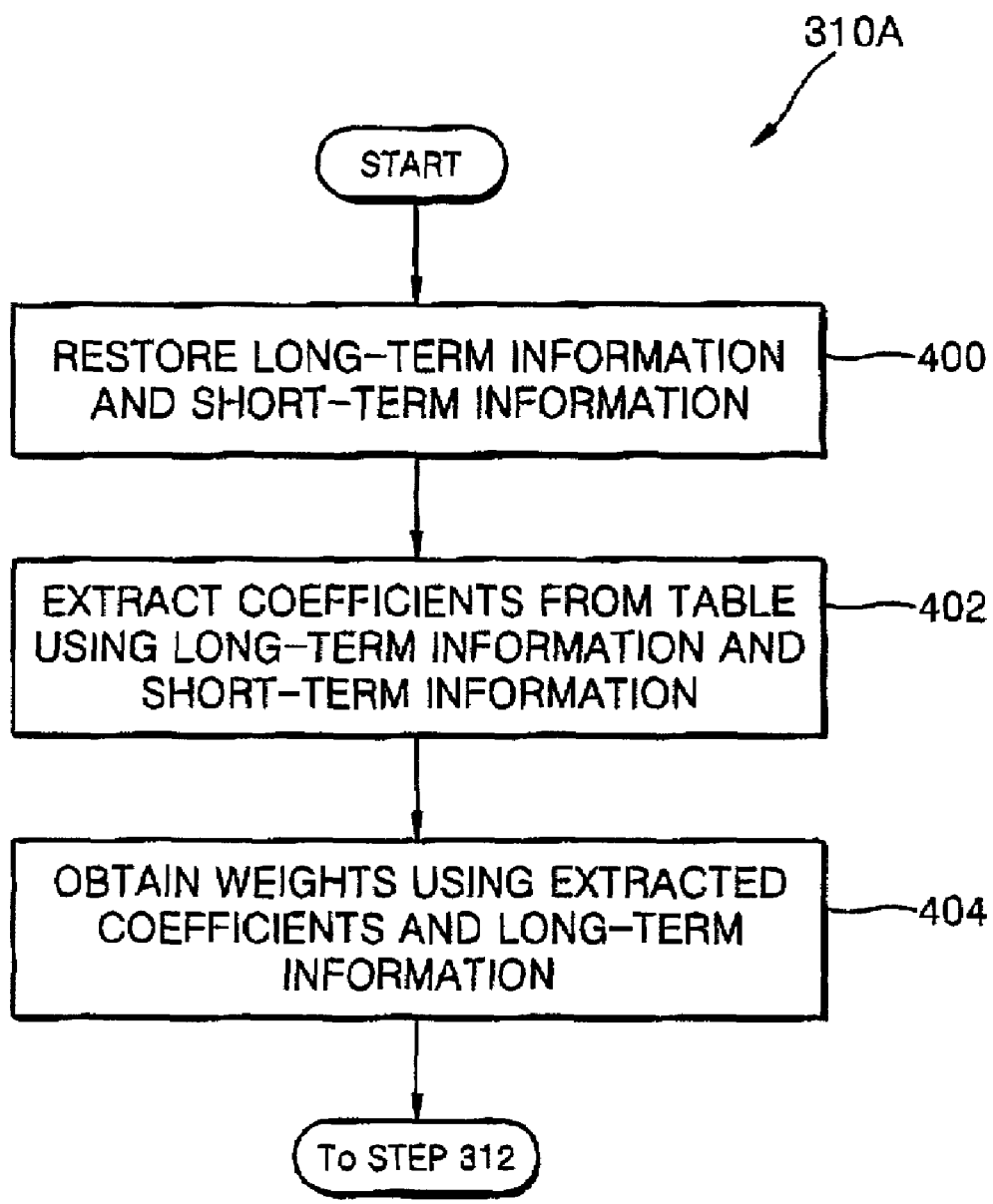
FIG. 17 shows a flowchart illustrating an embodiment for Step 310 of FIG. 15 according to the present invention.

FIG. 17 shows a flowchart illustrating the embodiment 310A for Step 310 of FIG. 15 according to the present invention. The embodiment 310A involves restoring the long-term information and short-term information (Step 400) and obtaining a plurality of weights using the restored long-term information and short-term information (Steps 402 and 404).

Figure 18:
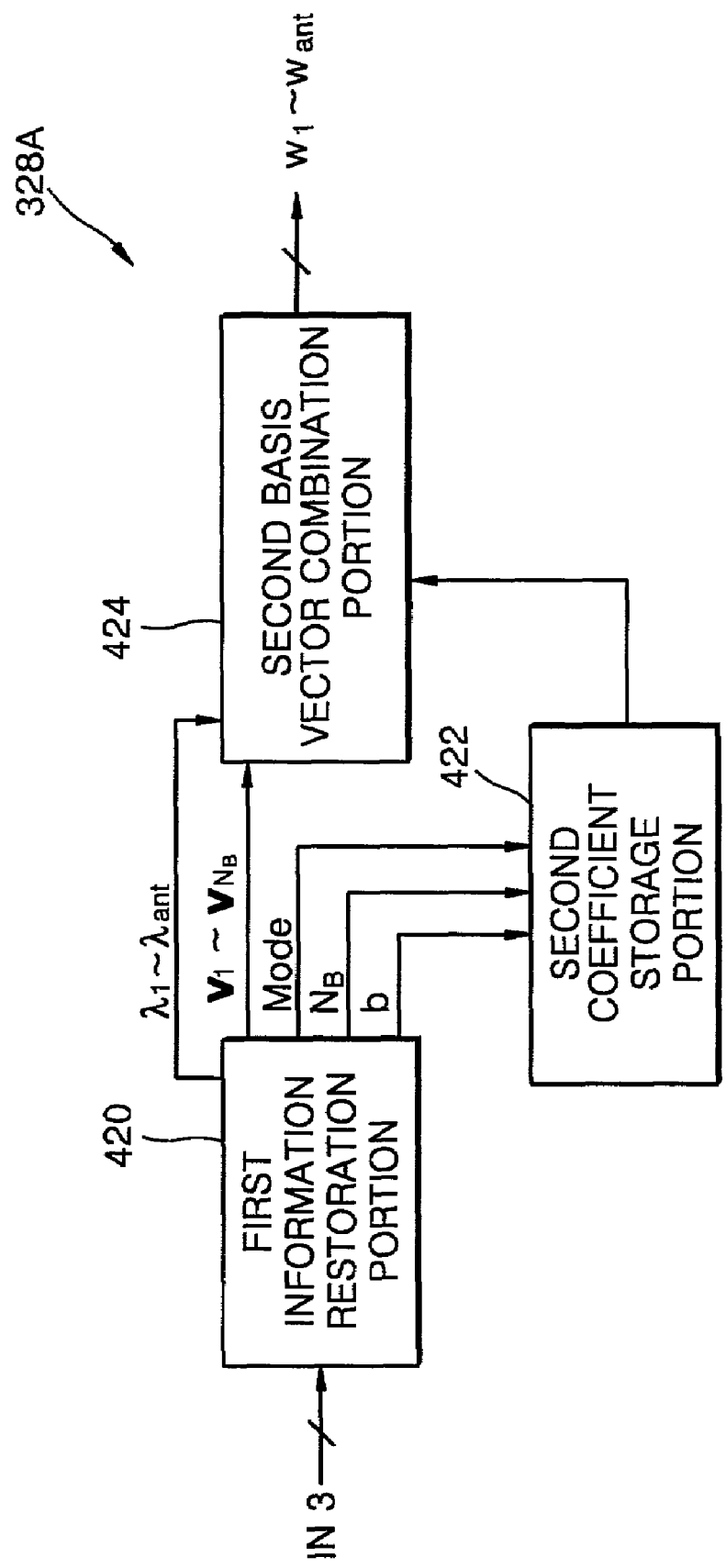
FIG. 18 shows a block diagram of an embodiment of a first weight extraction unit of FIG. 16 according to the present invention.

FIG. 18 shows a block diagram of the embodiment 328A of the first weight extraction unit 328 of FIG. 16 according to the present invention, which includes a first information restoration portion 420, a second coefficient storage portion 422, and a second basis vector combination portion 424.

The first information restoration portion 420 shown in FIG. 18 restores the long-term information and short-term information from the feedback signal input through the input port IN3 from the antenna array 326 and outputs the restored long-term information including the effective basis vectors $v_1 \sim v_{N_B}$ and the number of beams $N_B$, the effective basis vectors $v_1 \sim v_{N_B}$, the mode signal Mode and the number of beams $N_B$, or the effective basis vectors $v_1 \sim v_{N_B}$, the mode signal Mode, the eigenvalues $\lambda_1 \sim \lambda_{ant}$ and the number of beams $N_B$, and the restored short-term information b (Step 400). To this end, as an example, the first information restoration portion 420 may include a time division demultiplexing portion (not shown), a base station (BS) long-term information deformatting portion (not shown), and a BS short-term information deformatting portion (not shown), which perform inverse operations of the MS signal conversion unit 68 shown in FIG. 4. In particular, the time division demultiplexing portion demultiplexes the input feedback signal and outputs the result of the demultiplexing to the BS long-term information deformatting portion and the BS short-term information deformatting portion. The BS long-term information deformatting portion deformats the result of the time-division-demultiplexing and outputs the deformatted result as the restored long-term information. The BS short-term information deformatting portion deformats the result of the time-division-demultiplexing and outputs the deformatted result as the restored short-term information.

After Step 400, the second coefficient storage portion 422 selects a corresponding table according to the number of beams $N_B$ and the mode signal Mode incorporated into the long-term information, extracts coefficients from the selected table according to the short-term information b, and transmits the extracted coefficients to the second basis vector combination portion 424 (Step 402).

If the long-term information includes also a mode signal Mode, the second coefficient storage portion 422 may select among the stored tables a group of tables corresponding to the combination mode according to the mode signal Mode and then select in the selected group of tables a table corresponding to the number of beams $N_B$, extract the corresponding coefficients from the selected table according to the short-term information b, and output the extracted coefficients to the second basis vector combination portion 424. Here, the second coefficient storage portion 422 previously stores the tables, each of which has different coefficients of the effective basis vectors $v_1 \sim v_{N_B}$ with indices, according to the combination modes and the number of number of beams $N_B$.

However, if the long-term information does not include a mode signal Mode, the second coefficient storage portion 422 may select a corresponding table according to the number of beams $N_B$ included in the long-term information, extract the corresponding coefficients from the selected table according to the short-term information b, and output the extracted coefficients to the second basis vector combination portion 424. Here, the second coefficient storage portion 422 previously stores the tables, each of which has different coefficients of the effective basis vectors $v_1 \sim v_{N_B}$ with indices, according to the number of number of beams $N_B$.

Actually, the second coefficient storage portion 422 stores the same tables as stored in the first coefficient storage unit 70 shown in FIG. 4.

In an alternative embodiment according to the present invention, after Step 402, the second basis vector combination portion 424 combines the effective basis vectors $v_1 \sim v_{N_B}$ incorporated into the long-term information using the coefficients input from the second coefficient storage portion 422 and outputs the resulting combinations as a plurality of weights $w_1, w_2, w_3, \ldots$, and $w_{ant}$ to the multiplication unit 322 (Step 404). Here, denoting one of the weights $w_1, w_2, w_3, \ldots$, and $w_{ant}$ as $w_j$ ($1 \leq j \leq ant$), the weight $w_j$ is expressed as formula (10) below:

$$w_j = \sum_{i=0}^{N_B-1} a_i(b) v_{ij}. \quad (10)$$

In another embodiment according to the present invention, after Step 402, the second basis vector combination portion 424 combines the effective basis vectors $v_1 \sim v_{N_B}$ incorporated into the long-term information using the coefficients input from the second coefficient storage portion 422 and the eigenvalues $\lambda_1 \sim \lambda_{ant}$ input from the first information restoration portion 420 and outputs the resulting combinations as a plurality of weights $w_1, w_2, w_3, \ldots$, and $w_{ant}$ to the multiplication unit 322 (Step 404). Here, denoting one of the weights $w_1, w_2, w_3, \ldots$, and $w_{ant}$ as $w_0$ ($1 \leq o \leq ant$), the weight $w_0$ is expressed as formula (11) below:

$$w_o = \sum_{i=0}^{N_B-1} a_i^e(b) \beta_i v_{io} \quad (11)$$

where $\beta_i$ is a value proportional to the eigenvalue $\lambda_i$ of the $i^{th}$ effective basis vector. For example, $\beta_i$ may be expressed as formula (12) below:

$$\beta_i = \sqrt{\lambda_i} \quad (12)$$

To obtain the weights expressed as formula (11) above, in Step 42 of FIG. 3 to determine the long-term information, the MS long-term information determination unit 64 of FIG. 4 incorporates the eigenvalues $\lambda_1 \sim \lambda_{ant}$ generated from the channel downlink characteristic $H_{DL}$ of the time-space channel, which is input from the MS channel characteristic determination unit 62, into the long-term information and outputs the long-term information including the generated eigenvalues $\lambda_1 \sim \lambda_{ant}$ to the MS signal conversion unit 68. To this end, the eigen analysis portion 120 shown in FIG. 6 outputs the eigenvalues $\lambda_1 \sim \lambda_{ant}$ generated from the channel downlink characteristic $H_{DL}$ input from the MS channel characteristic determination unit 62 by an eigen analysis technique to the MS signal conversion unit 68 as well as the beam number calculation portion 124 (FIG. 6) in Step 100 of FIG. 5. Accordingly, the long-term information restored by the first information restoration portion 420 of FIG. 18 includes the eigenvalues $\lambda_1 \sim \lambda_{ant}$.

A conventional mobile communication system does not utilize basis vectors adapted to time-space channel characteristics. In contrast, the mobile communication apparatus and method using an antenna array according to the present invention generate weights using the selection combination mode in a macro-channel environment significantly influenced by fading with a small angular spread, and using the equal-gain combination mode in a micro- or pico-channel environment where considerable interference and noise exist with a large angular spread. Alternatively, the present invention may generate weights using a particular combination mode regardless of the channel environment, the macro- or micro channel environment. To extract the weights generated in a mobile station at the base station, the long-term information and short-term information are transmitted to the base station. Accordingly, channel characteristic variations due to fading, interference, and noise are observed in the mobile station, and the observed result is converted to the long-term information and short-term information in a minimal quantity, and the converted result is transmitted to the base station. This ensures an optimal communication environment.

According to the present invention, the base station 10 instead of each mobile station 20, 22, and 24 of FIG. 1 may be provided with the MS long-term information determination unit 64 shown in FIG. 4. Hereinafter, embodiments of the mobile communication apparatus with the antenna array according to the present invention where the base station instead of a mobile station determines the long-term information will be described for its structure and operation with reference to the appended drawings. Also, the mobile communication method according to the present invention performed in these embodiments will be described.

Figure 19:
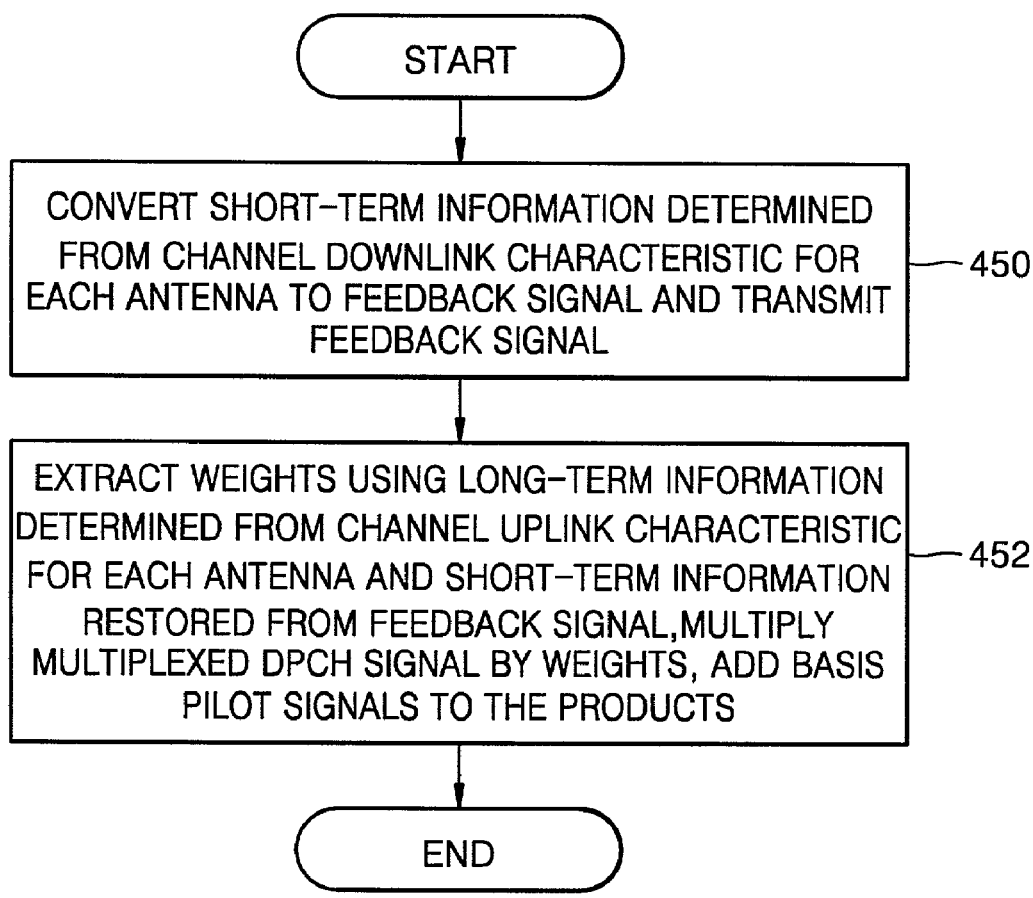
FIG. 19 shows a flowchart illustrating another embodiment of the mobile communication method according to the present invention for the mobile communication apparatus shown in FIG. 1.

FIG. 19 shows a flowchart illustrating another embodiment of the mobile communication method according to the present invention performed in the mobile communication apparatus shown in FIG. 1. The embodiment of FIG. 19 involves each first, second, . . . , and $X^{th}$ mobile stations 20, 22, . . . , and 24 obtaining a feedback signal including only the short-term information from the channel downlink characteristic $H_{DL}$ for each antenna (Step 450), and the base station 10 extracting weights from the long-term information determined using a channel uplink characteristic $H_{UL}$ for each antenna and the short-term information restored from the feedback signal (Step 452).

In the mobile communication method using the antenna array according to an embodiment of the present invention, each first, second, and $X^{th}$ mobile station 20, 22, . . . , and 24 first determines the channel downlink characteristic $H_{DL}$ for each antenna from a signal transmitted from the base station 10, determines the short-term information based on the correlation characteristics of channels using the determined channel downlink characteristic $H_{DL}$ for each antenna, converts the determined short-term information to a feedback signal, and transmits the converted feedback signal to the base station 10 (Step 450). Hereinafter, an embodiment for Step 450 according to the present invention and the structure and operation of a mobile station performing this embodiment of the present invention will be described.

Figure 20:
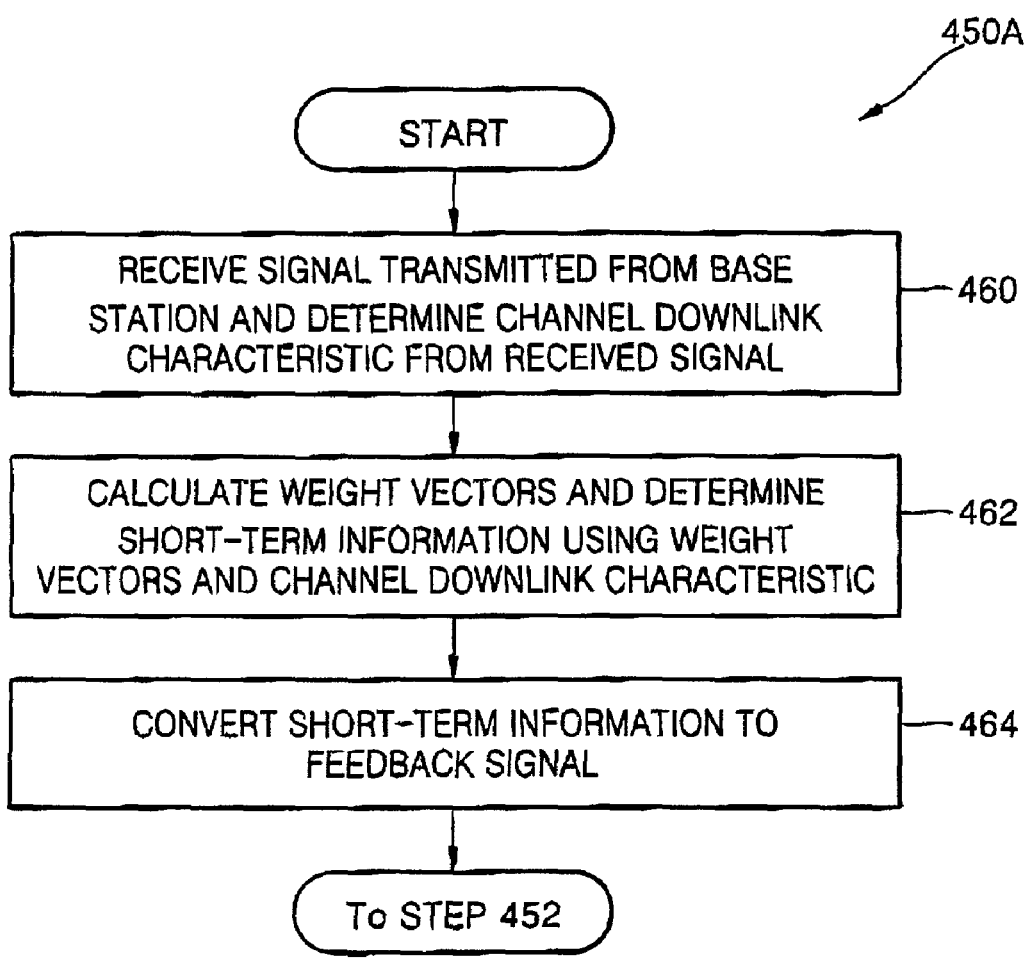
FIG. 20 shows a flowchart illustrating an embodiment for Step 450 of FIG. 19 according to the present invention.

FIG. 20 shows a flowchart illustrating an embodiment 450A for Step 450 of FIG. 19 according to the present invention. The embodiment 450A involves determining the channel downlink characteristic (Step 460), determining the short-term information (Step 462), and converting the short-term information to a feedback signal (Step 464).

Figure 21:
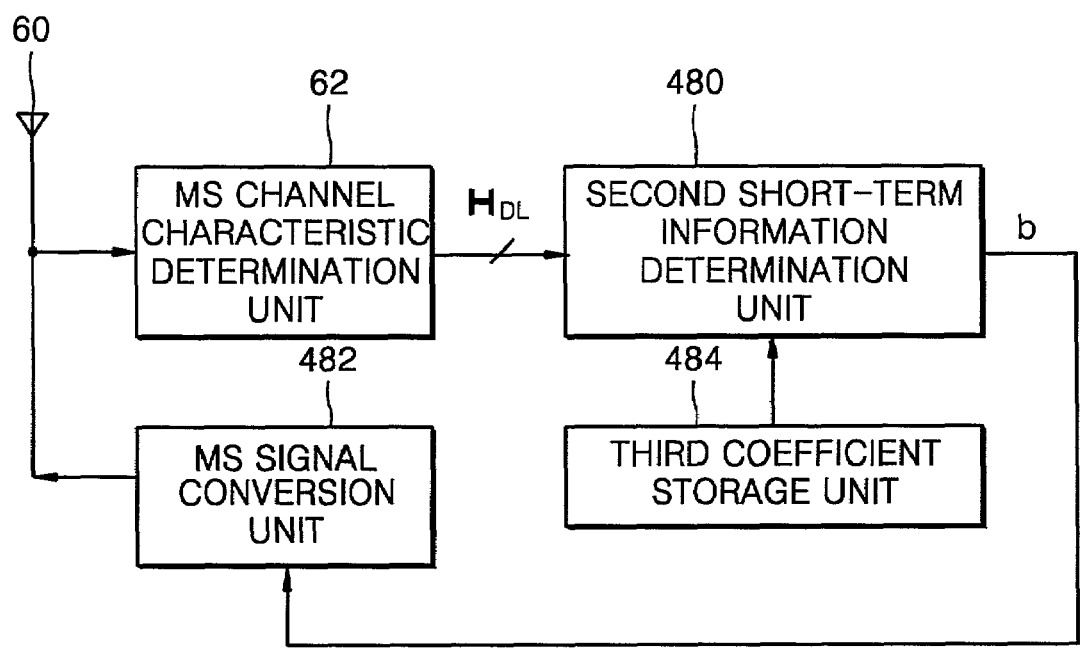
FIG. 21 shows a block diagram of an embodiment of a mobile station according to the present invention for the embodiment illustrated in FIG. 20.

FIG. 21 shows a block diagram of an embodiment of the first, second, . . . , or $X^{th}$ mobile station 20, 22, . . . , or 24 of FIG. 1 according to the present invention performing the embodiment 450A shown in FIG. 20. The mobile station of FIG. 21 includes an antenna 60, an MS channel characteristic determination unit 62, a second short-term information determination unit 480, an MS signal conversion unit 482, and a third coefficient storage unit 484.

The antenna 60 and the MS channel characteristic determination unit 62 shown in FIG. 21 perform the same functions as those shown in FIG. 4.

To perform Step 450 of FIG. 19, the MS channel characteristic determination unit 62 first receives a signal transmitted from the base station 10 through the antenna 60, determines the channel downlink characteristic $H_{DL}$ for each antenna in a spatial-temporal manner from the received signal, and outputs the determined downlink channel characteristic $H_{DL}$ to the second short-term information determination unit 480 (Step 460 of FIG. 20).

After Step 460 of FIG. 20, weight vectors $w_0 \sim w_{B'-1}$ are calculated by combining identity basis vectors with the corresponding coefficients of the effective basis vectors $v_1 \sim v_{N_B}$. The effective basis vectors $v_1 \sim v_{N_B}$ were stored in a predetermined table, which has the coefficients of the effective basis vectors $v_1 \sim v_{N_B}$ with indices. An index b resulting in the maximum reception power is determined as the short-term information using the weight vectors $w_0 \sim w_{B'-1}$ and the channel downlink characteristic $H_{DL}$ (Step 462 of FIG. 20). Here, an $N_B \times N_B$ identity matrix $I_{N_B \times N_B}$ consisting of the identity basis vectors is expressed as formula (13) below:

$$I_{N_B \times N_B} = \begin{bmatrix} 1 & 0 & \cdots & 0 & 0 \\ 0 & 1 & \cdots & 0 & 0 \\ \vdots & \vdots & \cdots & \vdots & \vdots \\ 0 & 0 & \cdots & 1 & 0 \\ 0 & 0 & \cdots & 0 & 1 \end{bmatrix} \quad (13)$$

To perform Step 462 of FIG. 20, the mobile station shown in FIG. 21 includes a second short-information determination unit 480 and a third coefficient storage unit 484. The third coefficient storage unit 484 predetermines and stores the tables, each of which has the coefficients of the effective basis vectors $v_1 \sim v_{N_B}$ with indices, and outputs the coefficients of the stored table to the second short-term information determination unit 480. The second short-term information determination unit 480 calculates the weight vectors $w_0 \sim w_{B'-1}$ by combining the given identity basis vectors with the coefficients input from the third coefficient storage unit 484, finds an index b resulting in the maximum reception power using the weight vectors $w_0 \sim w_{B'-1}$ and the channel downlink characteristic $H_{DL}$, and outputs the found index b as the short-term information to the MS signal conversion unit 482.

After Step 462, the MS signal conversion unit 482 converts the determined short-term information b input from the second short-term information determination unit 480 to a feedback signal and transmits the converted feedback signal through the antenna 60 to the base station 10 (Step 464 of FIG. 20). To this end, the MS signal conversion unit 482 may be implemented with, for example, the MS short-term information formatting portion 80 shown in FIG. 4. An MS short-term information formatting portion (not shown) of the MS signal conversion unit 482 formats the short-term information b input from the second short-term information determination unit 480 and outputs the formatted result to the antenna 60.

After Step 450 of FIG. 19, the base station 10 of FIG. 1 determines the channel uplink characteristic $H_{UL}$ for each antenna using the feedback signal transmitted from the mobile station 20, 23, . . . , or 24 shown in FIG. 1 and extracts a plurality of weights using the long-term information, which is determined based on the channel uplink characteristic $H_{UL}$, and the short-term information b restored from the received feedback signal. Then, the base station 10 also multiplies a multiplexed DPCH signal by the respective weights, adds basis pilot signals $u_1(k), u_2(k), \ldots$, and $u_{ant}(k)$, which are obtained using $N_B$ pilot channel signals $P_i(k)$, where $1 \leq i \leq N_B$, and the long-term information, to the respective products, and transmits the results of the additions through the antenna array to the mobile station 20, 22, . . . , or 24 of FIG. 1 (Step 452 of FIG. 19). Here, the plurality of weights equals a weight vector $w_b$ corresponding to the index b determined by the second short-term information determination unit 480.

An embodiment for Step 452 of FIG. 19 according to the present invention and the structure and operation of a base station according to the present invention performing the embodiment will be described.

Figure 22:
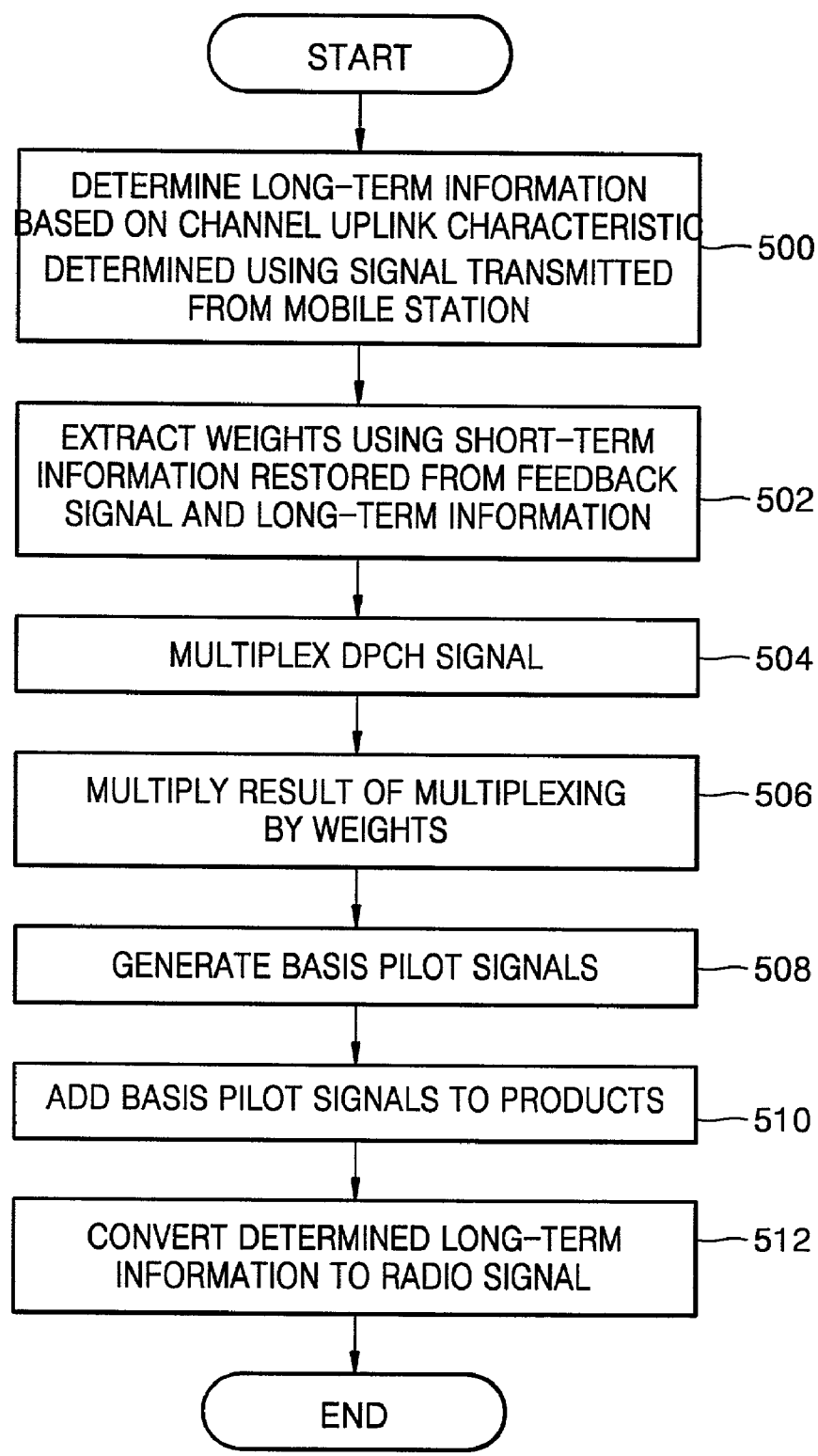
FIG. 22 shows a flowchart illustrating an embodiment for Step 452 of FIG. 19 according to the present invention.

FIG. 22 shows a flowchart illustrating an embodiment for Step 452 of FIG. 19 according to the present invention. The embodiment of FIG. 22 involves extracting a plurality of weights (Steps 500 and 502), and multiplying a multiplexed DPCH signal by the respective weights and adding basis pilot signals $u_1(k), u_2(k), \ldots$, and $u_{ant}(k)$ to the respective products (Steps 504 through 510). Step 512 of FIG. 22, which is not included in the embodiment for Step 452, will be described later.

Figure 23:
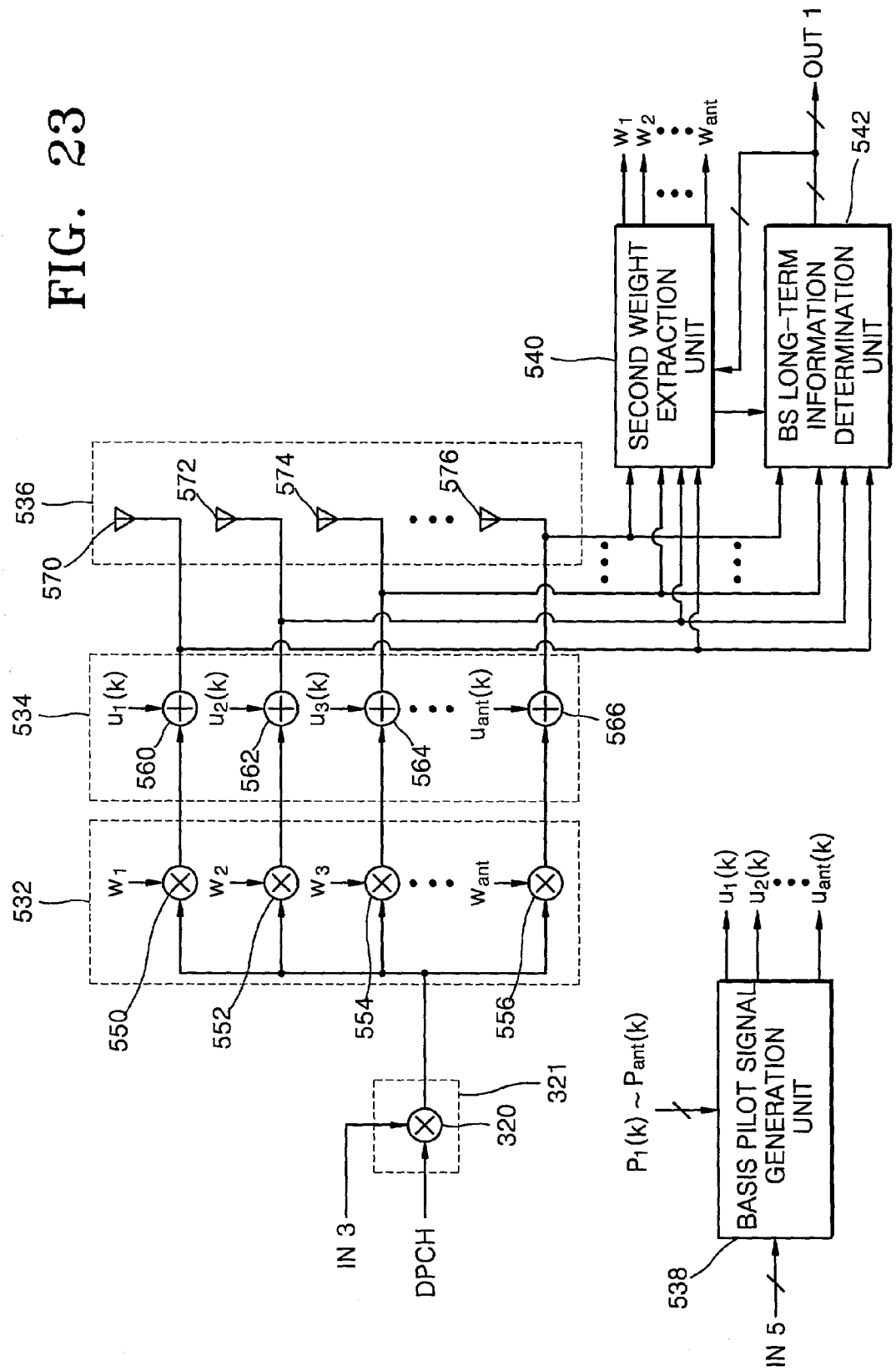
FIG. 23 shows a block diagram of a preferred embodiment of the base station according to the present invention for the embodiment illustrated in FIG. 22.

FIG. 23 shows a block diagram of a preferred embodiment of a base station according to the present invention performing the embodiment (Steps 500 through 510) of FIG. 22 for Step 452 of FIG. 19. The preferred embodiment of the base station shown in FIG. 23 includes a multiplexing unit 321, a multiplication unit 532, an addition unit 534, an antenna array 536, a basis pilot signal generation unit 538, a second weight extraction unit 540, and a BS long-term information determination unit 542.

The BS long-term information determination unit 542 shown in FIG. 23 determines the channel uplink characteristic $H_{UL}$ for each antenna using a signal transmitted from the mobile station shown in FIG. 21, determines the long-term information using the determined channel uplink characteristic $H_{UL}$, and outputs the determined long-term information to the second weight extraction unit 540 and an output port OUT1 (Step 500).

After Step 500, the second weight extraction unit 540 restores the short-term information b from the feedback signal received through the antenna array 536 and extracts a plurality of weights using the restored short-term information b and the long-term information determined by the BS long-term information determination unit 542 (Step 502).

In Step 502, the multiplexing unit 321 shown in FIG. 23 performs the same function as that shown in FIG. 16. That is, the multiplexing unit 321 of FIG. 23 multiplexes a DPCH signal and outputs the result of the multiplexing to the multiplication unit 532 (Step 504). To this end, the multiplexing unit 321 may be implemented with a multiplier 320 that multiplies the DPCH signal by a SPREAD/ SCRAMBLE signal input through an input port IN3 and outputs the product to the multiplication unit 532. Unlike the illustration in FIG. 22, Step 504 may be performed at the same time as Steps 500 and 502.

After Step 504, the multiplication unit 532 multiplies the result of the multiplexing output from the multiplexing unit 321 by the respective weights $w_1, w_2, \ldots$, and $w_{ant}$ input from the second weight extraction unit 540 and outputs the products to the addition unit 534 (Step 506). To this end, like the multiplication unit 322 shown in FIG. 16, the multiplication unit 532 may include a plurality of multipliers 550, 552, 554, . . . , and 556. In this case, the multipliers 550, 552, 554, . . . , and 556 multiply the result of the multiplexing output from the multiplexing unit 321 by the respective weights $w_1, w_2, \ldots$, and $w_{ant}$ and outputs the products to the addition unit 534.

The basis pilot signal generation unit 538 generates the basis pilot signals $u_1(k), u_2(k), \ldots$, and $u_{ant}(k)$ using the pilot channel signals $P_1(k), P_2(k), \ldots$, and $P_{ant}(k)$ and the long-term information, which is determined by the BS long-term information determination unit 542 and input through an input port IN4, and outputs the generated basis pilot signals $u_1(k), u_2(k), \ldots$, and $u_{ant}(k)$ to the addition unit 534 (Step 508). Unlike the illustration in FIG. 22, Step 508 may be performed during the period for performing Steps 502 through 506.

After Step 508, the addition unit 534 adds the basis pilot signals $u_1(k), u_2(k), \ldots$, and $u_{ant}(k)$ input from the basis pilot signal generation unit 538 to the respective products input from the multiplication unit 532 and outputs the results of the additions to the antenna array 536 (Step 510). To this end, the addition unit 534 may include adders 560, 562, 564, . . . , and 566. The adders 560, 562, 564, . . . , and 566 add the products input from the multipliers 550, 552, 554, . . . , and 556 of the multiplication unit 532 to the respective basis pilot signals $u_1(k), u_2(k), u_3(k), \ldots$, and $u_{ant}(k)$ and output the results of the additions to the antenna array 536. The results of the additions by the addition unit 534 are transmitted through the antenna array 536 to the mobile station shown in FIG. 21. To this end, the antenna array 536 includes ant antennas 570, 572, 574, . . . , and 576. The antennas 570, 572, 574, . . . , and 576 transmit the results of the additions by the adders 560, 562, 564, . . . , and 566 of the addition unit 534, respectively, to the mobile station shown in FIG. 21. The antenna array 536 also receives the signal transmitted from the mobile station of FIG. 21 and outputs the received signal to the second weight extraction unit 540 and the BS long-term information determination unit 542.

Although the embodiments of the mobile communication method and apparatus according to the present invention illustrated in FIGS. 19 through 23 do not transmit the long-term information determined at the base station to the mobile station, the long-term information determined at the base station, for example, the mode signal Mode and the number of beams $N_B$, may be transmitted to the mobile station according to the present invention. Embodiments of the mobile communication method according to the present invention where the long-term information determined at the base station is transmitted to the mobile station and the structure and operation of the mobile communication apparatus according to the present invention performing these embodiments will be described with reference to the appended drawings.

Figure 24:
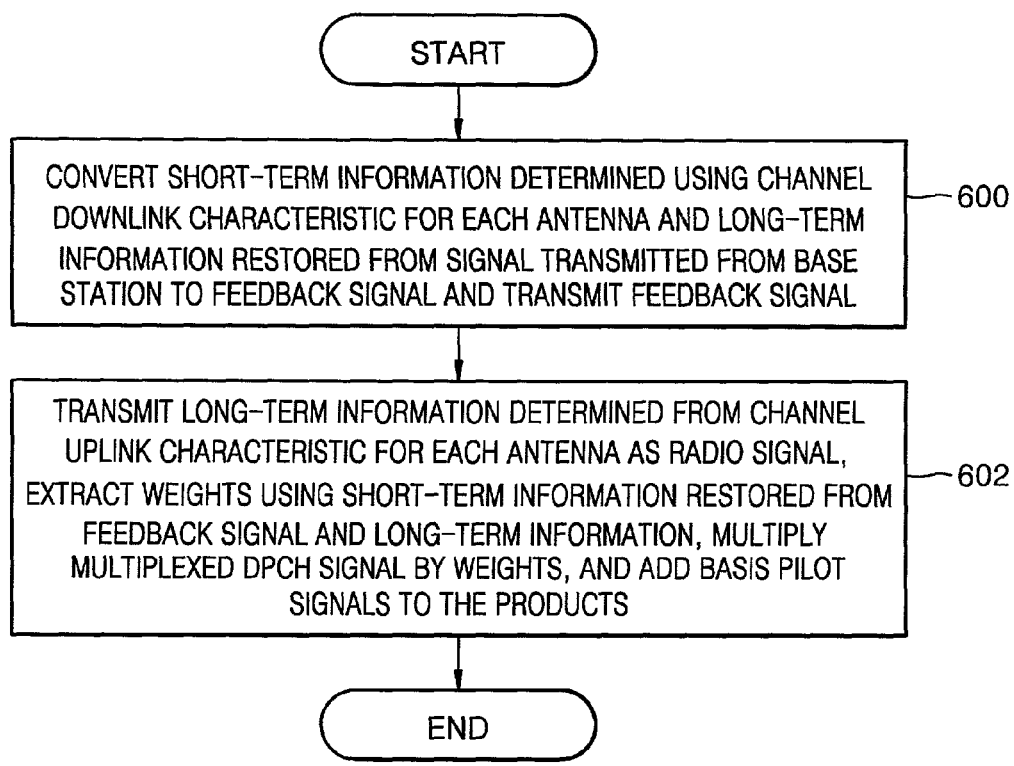
FIG. 24 shows a flowchart illustrating still another embodiment of the mobile communication method according to the present invention for the mobile communication apparatus shown in FIG. 1.

FIG. 24 shows a flowchart illustrating still another embodiment of the mobile communication method according to the present invention performed in the mobile communication apparatus shown in FIG. 1. The embodiment of FIG. 24 involves obtaining a feedback signal including the short-term information, which is determined using the restored long-term information and the channel downlink characteristic $H_{DL}$ (Step 600), and extracting a plurality of weights using the long-term information determined from the channel uplink characteristic $H_{UL}$ for each antenna and the short-term information restored from the feedback signal and transmitting the determined long-term information to the mobile station (Step 602).

The mobile communication method according to the present invention illustrated in Step 24 is the same as the mobile communication method illustrated in FIG. 19 except that the long-term information, which is restored from the signal transmitted from the base station 10, as well as the channel downlink characteristic $H_{DL}$ for each antenna, are used to determine the short-term information, and the base station 10 converts the determined long-term information to a radio signal and transmits the radio signal to the first, second, . . . , or $X^{th}$ base station 20, 22, . . . , or 24. For example, the first, second, . . . , or $X^{th}$ base station 20, 22, . . . , or 24 determines the channel downlink characteristic $H_{DL}$ for each antenna using the signal transmitted from the base station 10, restores the long-term information from the signal transmitted from the base station 10, determines the short-term information based on the channel downlink characteristic $H_{DL}$ using the restored long-term information and the channel downlink characteristic $H_{DL}$, converts the determined short-term information to a feedback signal, and transmits the converted feedback signal to the base station 10 (Step 600). An embodiment for Step 600 according to the present invention and the structure and operation of a mobile station performing this embodiment according to the present invention will be described below.

Figure 25:
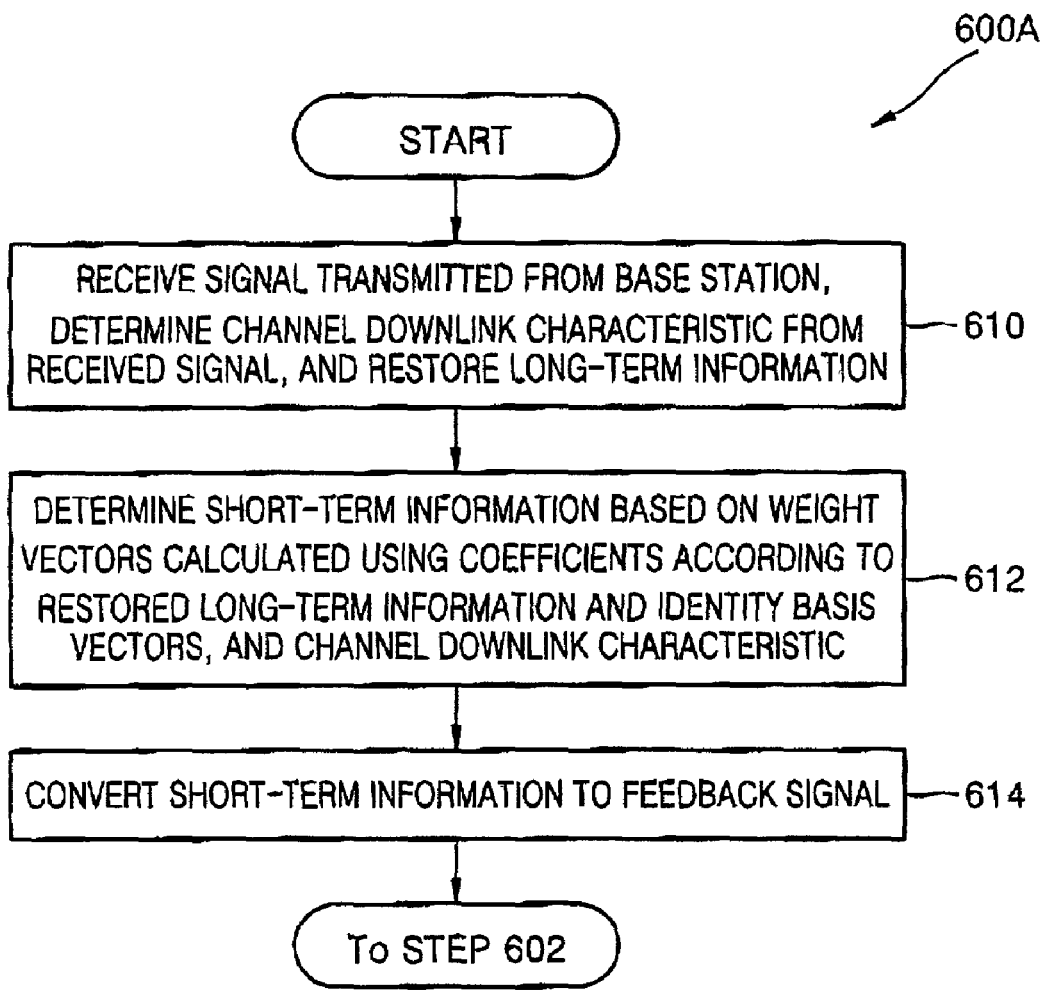
FIG. 25 shows a flowchart illustrating an embodiment for Step 600 of FIG. 24 according to the present invention.

FIG. 25 shows a flowchart illustrating an embodiment 600A for Step 600 of FIG. 24 according to the present invention. The embodiment 600A involves determining the channel downlink characteristic $H_{DL}$ and restoring the long-term information (Step 610), and transmitting the short-term information, which is determined using the restored long-term information and the channel downlink characteristic $H_{DL}$ (Steps 612 and 614).

Figure 26:
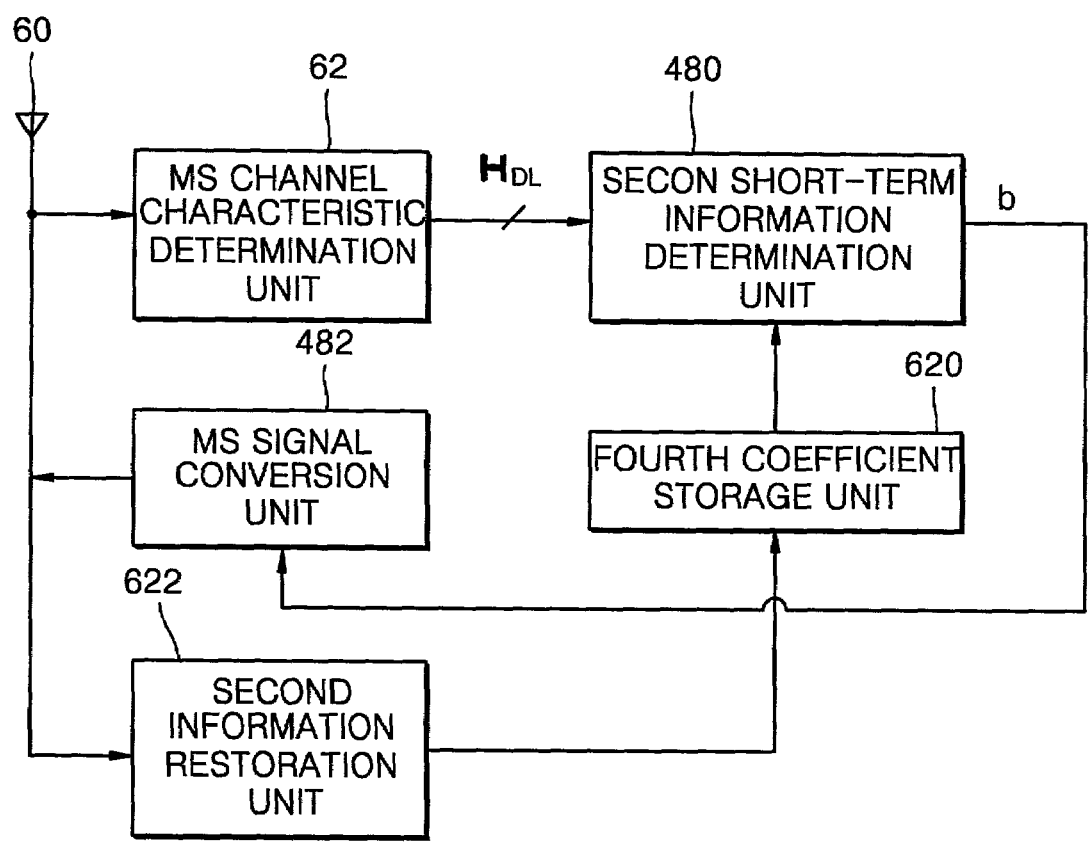
FIG. 26 shows a block diagram of an embodiment of a mobile station according to the present invention for the embodiment illustrated in FIG. 25.

FIG. 26 shows a block diagram of an embodiment of the mobile station according to the present invention performing the embodiment 600A shown in FIG. 25. The mobile station of FIG. 26 includes an antenna 60, an MS channel characteristic determination unit 62, a second short-term information determination unit 480, an MS signal conversion unit 482, a fourth coefficient storage unit 620, and a second information restoration unit 622. The antenna 60, the MS channel characteristic determination unit 62, the second short-term information determination unit 480, and the MS signal conversion unit 482 shown in FIG. 26 perform the same functions as those in FIG. 21.

The antenna 60 shown in FIG. 26 receives a signal transmitted from the base station 10, and the MS channel characteristic determination unit 62 determines the channel downlink characteristic $H_{DL}$ for each antenna in a spatial-temporal manner using the signal received through the antenna 60 and outputs the channel downlink characteristic $H_{DL}$ to the second short-term information determination unit 480. The second information restoration unit 622 restores the long-term information from the signal received through the antenna 60 and outputs the restored long-term information to the fourth coefficient storage unit 620 (Step 610). Here, the restored long-term information may include the number of beams $N_B$ and/or the mode signal Mode.

After Step 610, weight vectors $w_0 \sim w_{B'-1}$ are calculated by combining identity basis vectors with coefficients of a table corresponding to the restored long-term information, among a number of tables, each of which has coefficients of the effective basis vectors $v_1 \sim v_{N_B}$ with indices and which are previously stored by long-term information. Next, an index b resulting in the maximum reception power is determined as the short-term information using the weight vectors $w_0 \sim w_{B'-1}$ and the channel downlink characteristic $H_{DL}$ (Step 612). To this end, the fourth coefficient storage unit 620 predetermines and stores a number of tables, each of which has coefficients of the effective basis vectors $v_1 \sim v_{N_B}$ with indices by long-term information, for example, according to different numbers of beams $N_B$ and/or the combination modes, selects a table for the long-term information input from the second information restoration unit 622 from among the stored tables, and outputs the coefficients of the selected table to the second short-term information determination unit 480. Like the second short-term information determination unit 480 shown in FIG. 21, the second short-term information determination unit 480 of FIG. 26 calculates the weight vectors $w_0 \sim w_{B'-1}$ by combining given identity basis vectors with the coefficients input from the fourth coefficient storage unit 620, determines an index b resulting in the maximum reception power using the weight vectors $w_0 w_{B'-1}$ and the channel downlink characteristic $H_{DL}$, and outputs the determined index b as the short-term information to the MS signal conversion unit 482.

Like the MS signal conversion unit 482 shown in FIG. 21, the MS signal conversion unit 482 of FIG. 26 converts the determined short-term information to a feedback signal and transmits the feedback signal through the antenna 60 (Step 614).

The timing of performing each step in the embodiment illustrated in FIG. 20 or 25 will now be described. If Step 460 or 610 is performed for the $x^{th}$ time slot of an MS downlink frame to determine the channel downlink characteristic $H_{DL}$, Step 462 or 612 is performed for any period within the $(x+1)^{th}$ time slot of the MS downlink frame to generate the short-term information b. The short-term information b within the $(x+1)^{th}$ time slot of an MS downlink frame is generated, followed by Step 464 or 614, such that the converted feedback signal reaches the base station 10 before the $(x+2)^{th}$ time slot of a BS downlink frame starts.

After Step 600 of FIG. 24, the base station 10 of FIG. 1 determines the channel uplink characteristic $H_{UL}$ for each antenna using the signal transmitted from the mobile station 20, 22, . . . , or 24 of FIG. 1 and extracts a plurality of weights using the long-term information, which is determined using the channel uplink characteristic $H_{UL}$, and the short-term information b restored from the received feedback signal. Then, the base station 10 multiplies a multiplexed DPCH signal by the respective weights and adds the basis pilot signals $u_1(k)$, $u_2(k)$, . . . , and $u_{ant}(k)$, which are obtained using $N_B$ pilot channel signals $P_i(k)$ and the long-term information, to the respective products, and transmits the results of the additions through the antenna array to the mobile station 20, 22, . . . , or 24. Here, the base station 10 converts the determined long-term information to a radio signal and transmits the radio signal to the mobile station (Step 602).

An embodiment for Step 602 of FIG. 24 according to the present invention and the structure and operation of a base station performing this embodiment according to the present invention will be described below.

Figure 27:
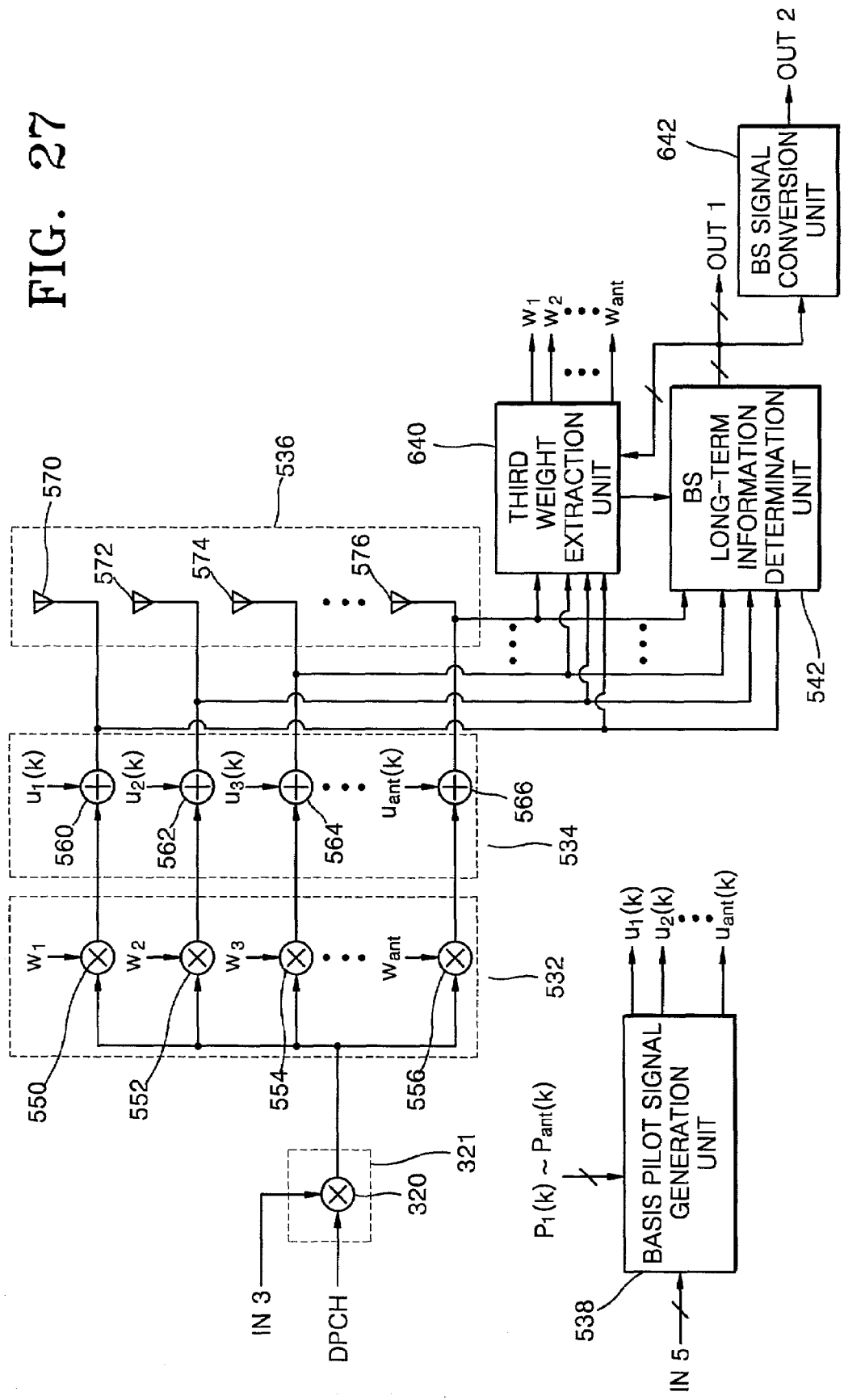
FIG. 27 shows a block diagram of an embodiment of a base station according to the present invention for an embodiment of Step 602 shown in FIG. 24.

FIG. 27 shows a block diagram of an embodiment of the base station according to the present invention performing an embodiment (Steps 500 through 512 of FIG. 22) of Step 602 shown in FIG. 24. The base station of FIG. 27 includes a multiplexing unit 321, a multiplication unit 532, an addition unit 534, an antenna array 536, a basis pilot signal generation unit 538, a third weight extraction unit 640, a BS long-term information determination unit 542, and a BS signal conversion unit 642.

The base station shown in FIG. 27 operates in the same way with the same structure as the base station shown in FIG. 23, except that the base station of FIG. 27 further includes the BS signal conversion unit 642, and the third weight extraction unit 640 operates differently from the second weight extraction unit 540. Therefore, descriptions of the same structures and operations will not be provided here. When the mobile station operates as illustrated in FIG. 25 and is implemented with the structure of FIG. 26, the base station performs Steps 500 through 512 of FIG. 22. Steps 500 through 510 of FIG. 22 form an embodiment of Step 452 of FIG. 19, and Steps 500 through 512 of FIG. 22 form an embodiment of Step 602 of FIG. 24.

After Step 510 of FIG. 22, the BS signal conversion unit 642 of FIG. 27 converts the long-term information determined by the BS long-term information determination unit 542 to a radio signal and transmits the radio signal through the antenna array 536 to the mobile station of FIG. 26 (Step 512). Here, the BS signal conversion unit 642 may be implemented with a BS long-term information formatting portion (not shown). The BS long-term information formatting portion formats the long-term information input from the BS long-term information determination unit 542 and outputs the formatted result through an output port OUT2 to the antenna array 536. The antenna array 536 transmits the formatted result output from the BS long-term information formatting portion to the mobile station shown in FIG. 26.

The second weight extraction unit 540 shown in FIG. 23 receives the effective basis vectors $v_1 \sim v_{N_B}$ and/or the eigenvalues $\lambda_1 \sim \lambda_{ant}$ as the long-term information from the BS long-term information determination unit 542 whereas the third weight extraction unit 640 shown in FIG. 27 receives the number of beams $N_B$ and/or the mode signal Mode as well as the effective basis vectors $v_1 \sim v_{N_B}$ and/or the eigenvalues $\lambda_1 \sim \lambda_{ant}$ as the long-term information. Except for this difference, the third weight extraction unit 640 performs the same function as the second weight extraction unit 540. In particular, the third weight extraction unit 640 restores the short-term information from the feedback signal received through the antenna array 536, extracts a plurality of weights $w_1, w_2, \ldots,$ and $w_{ant}$ using the restored short-term information and the long-term information determined by the BS long-term information determination unit 542, and outputs the extracted weights $w_1, w_2, \ldots,$ and $w_{ant}$ to the multiplication unit 532.

An embodiment of the second short-term information determination unit 480 of FIG. 21 or 26 according to the present invention will be described for its structure and operation with reference to the appended drawings.

Figure 28:
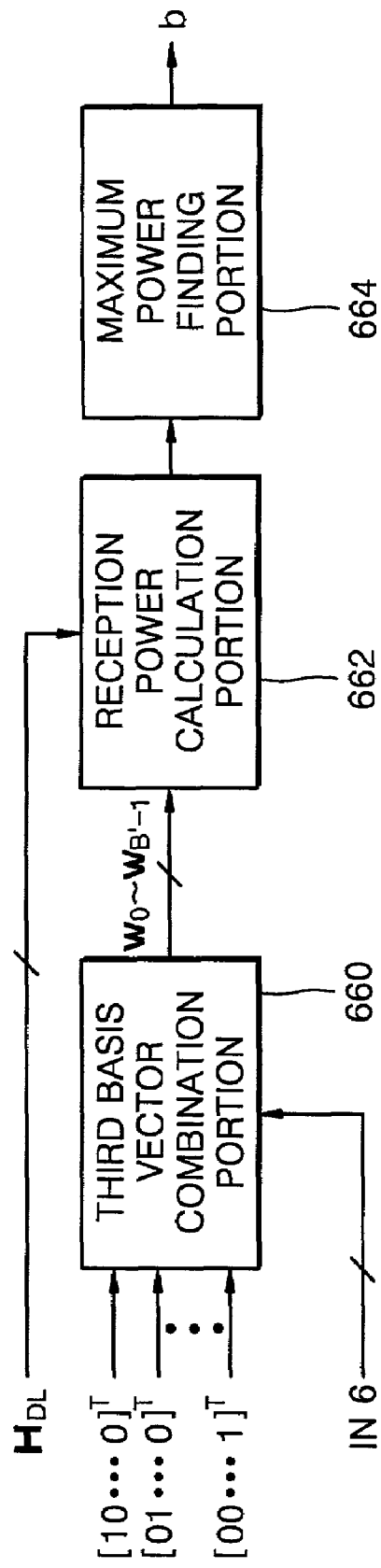
FIG. 28 shows a block diagram of an embodiment of a second short-term information determination unit shown in FIG. 21 or 26 according to the present invention.

FIG. 28 shows a block diagram of an embodiment of the second short-term information determination unit 480 shown in FIG. 21 or 26 according to the present invention. The second short-term information determination unit of FIG. 28 includes a third basis vector combination portion 660, a reception power calculation portion 662, and a maximum power finding portion 664.

The reception power calculation portion 662 and the maximum power finding portion 664 shown in FIG. 28 perform the same functions as the reception power calculation portion 282 and the maximum power finding portion 284 shown in FIG. 14, and thus descriptions thereof will not be provided here. The third basis vector combination portion 660 performs the same function as the first basis vector combination portion 280 of FIG. 14 except that the third basis vector combination portion 660 receives identity basis vectors instead of effective basis vectors $v_1 \sim v_{N_B}$. The second short-term information determination unit of FIG. 28 performs the operation of the embodiment 44A illustrated in FIG. 13.

For example, the third basis vector combination portion 660 shown in FIG. 28 combines $N_B$ identity basis vectors expressed as formula (14) below using the coefficients input through an input portion IN6 from the third coefficient storage unit 484 of FIG. 21 or the fourth coefficient storage unit 620 of FIG. 26, and outputs the resulting combinations as the weight vectors $w_0 \sim w_{B'-1}$ to the reception power calculation portion 662 (Step 260 of FIG. 13).

$$[1 \ 0 \ \cdots \ 0 \ 0]^T \qquad (14)$$
$$[0 \ 1 \ \cdots \ 0 \ 0]^T$$
$$\vdots$$
$$[0 \ 0 \ \cdots \ 1 \ 0]^T$$
$$[0 \ 0 \ \cdots \ 0 \ 1]^T$$

In formula (14) above, each identity basis vector includes $N_B$ components.

After Step 260 of FIG. 13, the reception power calculation portion 662 multiplies the respective weight vectors $w_0 \sim w_{B'-1}$ input from the third basis vector combination portion 660 by the channel downlink characteristic $H_{DL}$ input from the MS channel characteristic determination unit 62 of FIG. 21 or 26, calculates the norm square of the respective products to obtain the reception power values, and outputs the resulting reception power values to the maximum power finding portion 664 (Step 262 of FIG. 13). The reception power finding portion 662 of FIG. 28 may be implemented with B' reception power calculators 290, 292, ..., and 294, as shown in FIG. 14. Alternatively, the reception power finding portion 662 may be implemented using formula (15) below:

$$\|H_{DL} w_b\|^2 = w_b^H H^H H w_b = w_b^H R w_b. \qquad (15)$$

An embodiment of the reception power calculation portion 662, according to the present invention, implemented using formula (15) above will be described for its structure and operation with reference to the appended drawings.

Figure 29:
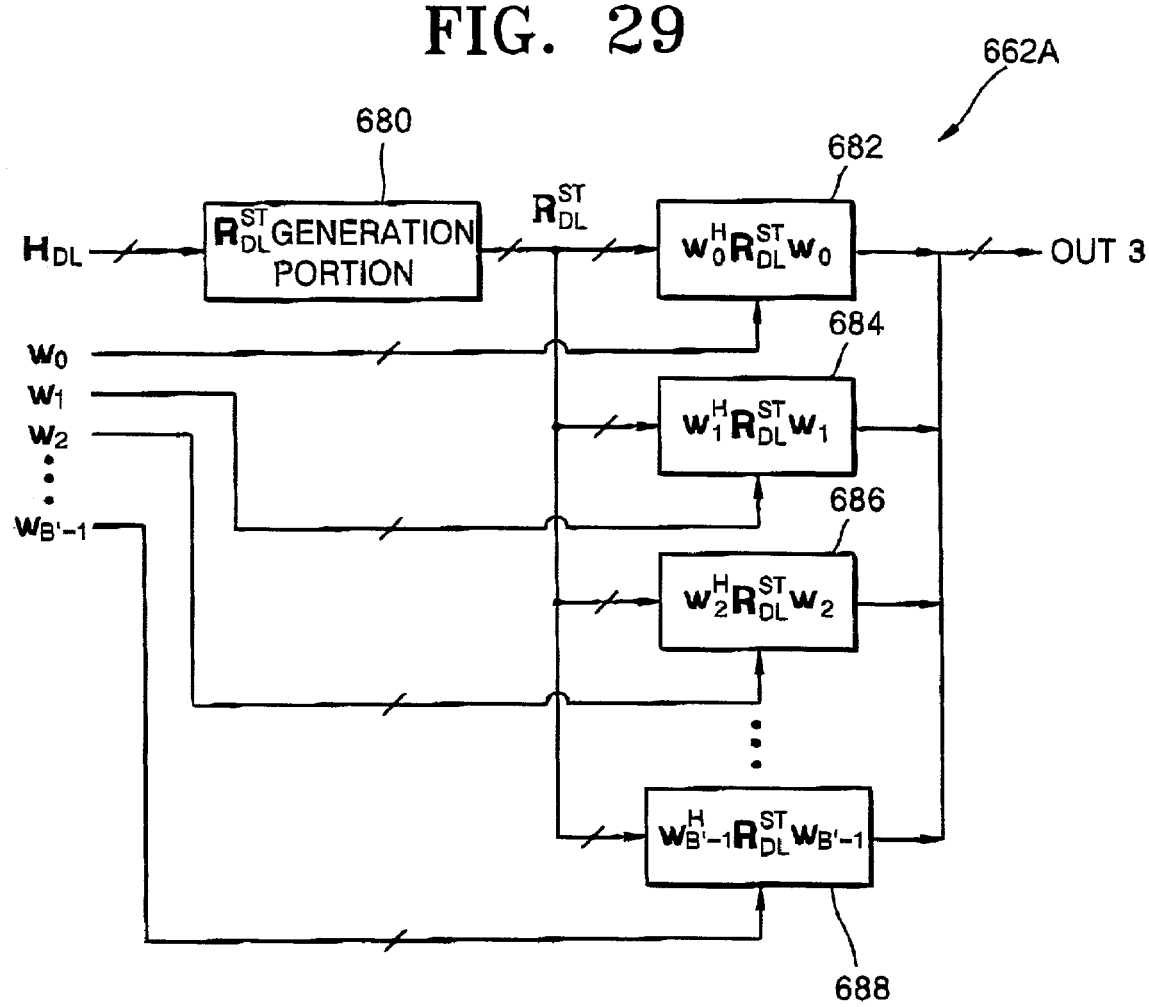
FIG. 29 shows a block diagram of an embodiment of a reception power calculation unit of FIG. 28.

FIG. 29 illustrates a block diagram of an embodiment 662A of the reception power calculation unit 662 of FIG. 28. The embodiment 662A of FIG. 29 includes a downlink short-term time-space covariance matrix ($R_{DL}^{ST}$) calculation portion 680, and sub power calculators 682, 684, 686, ..., and 688.

To perform Step 262 of FIG. 13, the downlink short-term time-space covariance matrix ($R_{DL}^{ST}$) calculation portion 680 of the reception power calculation portion 662A generates a downlink short-term time-space covariance matrix $R_{DL}^{ST}$ from the channel downlink characteristic $H_{DL}$ input from the MS channel characteristic determination unit 62 shown in FIG. 21 or 26 and outputs the generated downlink short-term time-space covariance matrix $R_{DL}^{ST}$ to the sub power calculators 682, 684, 686, ..., and 688. The sub power calculators 682, 684, 686, ..., and 688 multiply the downlink short-term time-space covariance matrix $R_{DL}^{ST}$ by the respective weight vectors $w_0 \sim w_{B'-1}$ and conjugate-transpose vectors $w_0^H \sim w_{B-1}^H$ of the weight vectors and outputs the products through an output port OUT3 to the maximum power finding portion 664.

After Step 262, the maximum power finding portion 664 finds an index b resulting in the maximum reception power, like the maximum power finding portion 284 shown in FIG. 14 (Step 264 of FIG. 13).

An embodiment 502A according to the present invention for Step 502 of FIG. 22 showing an embodiment for Step 452 of FIG. 19 will be described with reference to the appended drawings.

Figure 30:
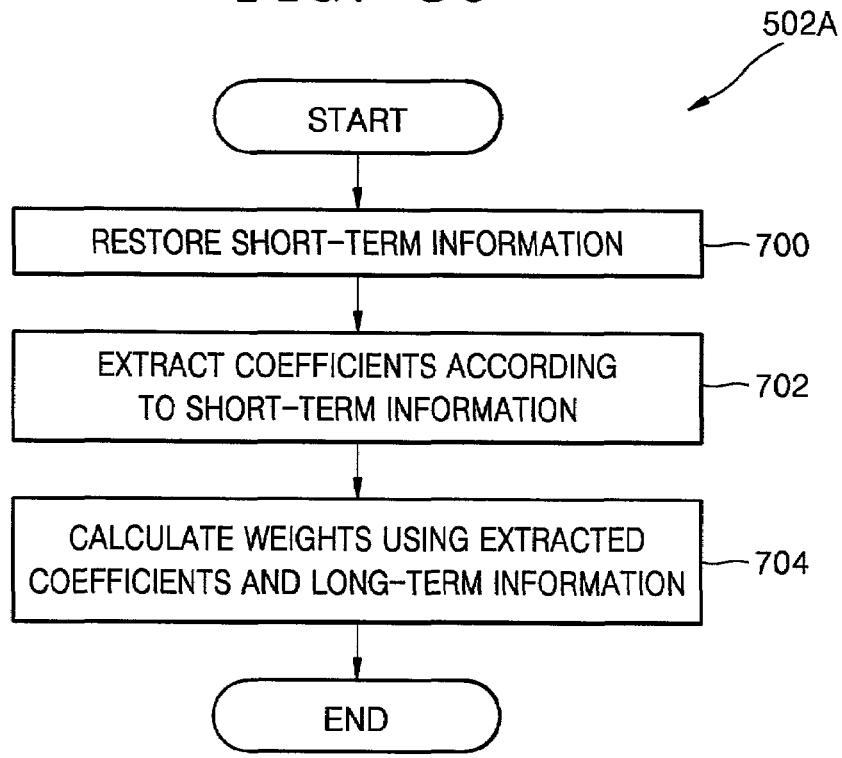
FIG. 30 shows a flowchart illustrating an embodiment for Step 502 of FIG. 22 according to the present invention.

FIG. 30 shows a flowchart illustrating the embodiment 502A according to the present invention for Step 502 of FIG. 22 showing an embodiment for Step 452 of FIG. 19. The embodiment 502A of FIG. 30 involves calculating weights using the coefficients, which is extracted based on only the restored short-term information, and the long-term information including only the effective basis vectors $v_1 \sim v_{N_B}$ or both the effective basis vectors $v_1 \sim v_{N_B}$ and the eigenvalues $\lambda_1 \sim \lambda_{N_B}$ (Steps 700 through 704).

In particular, to accomplish Step 502 of FIG. 22, the second weight extraction unit 540 of FIG. 23 first restores the short-term information from the feedback signal input through the antenna array 536 of FIG. 23 (Step 700). After Step 700, from tables, each of which has coefficients of the effective basis vectors $v_1 \sim v_{N_B}$ with indices and which are predetermined corresponding to the restored short-term information b, are extracted (Step 702). After Step 702, a plurality of weights $w_1 \sim w_{ant}$ are calculated using the extracted coefficients and the long-term information, which is determined in Step 500 of FIG. 2 and includes only the effective basis vectors $v_1 \sim v_{N_B}$ or both the effective basis vectors $v_1 \sim v_{N_B}$ and the eigenvalues $\lambda_1 \sim \lambda_{N_B}$ (Step 704). When the long-term information includes only the effective basis vectors $v_1 \sim v_{N_B}$, the weights $w_1 \sim w_{ant}$ are calculated using formula (10) above. When the long-term information includes both the effective basis vectors $v_1 \sim v_{N_B}$ and the eigenvalues $\lambda_1 \sim \lambda_{N_B}$ the weights $w_1 \sim w_{ant}$ are calculated using formula (11) above. Another embodiment 502B according to the present invention for Step 502 of FIG. 22 showing an embodiment of Step 602 of FIG. 24 will be described with reference to the appended drawings.

Figure 31:
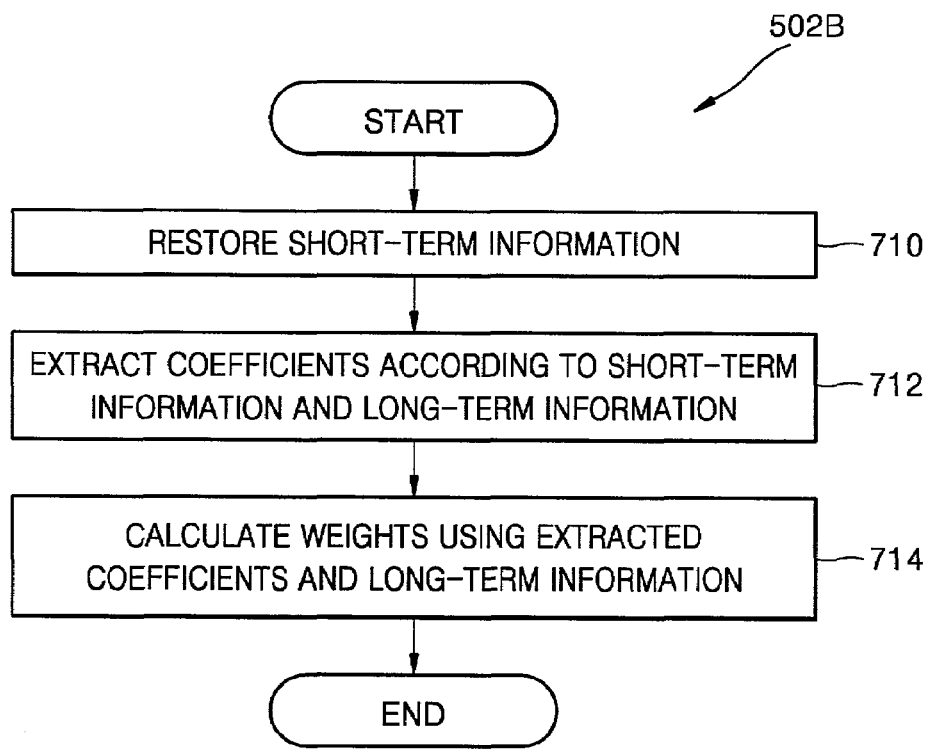
FIG. 31 shows a flowchart illustrating another embodiment for Step 502 of FIG. 22 according to the present invention.

FIG. 31 shows a flowchart illustrating another embodiment 502B according to the present invention for Step 502 of FIG. 22, which is associated with Step 602 of FIG. 24. The embodiment 502B involves calculating weights using the long-term information and the coefficients extracted based on the restored short-term information and the determined long-term information (Steps 710 through 714).

In particular, to perform Step 502 of FIG. 22, the third weight extraction unit 640 of FIG. 27 first restores the short-term information from the feedback signal received through the antenna array 536 (Step 710). After Step 710, from the tables, each of which has coefficients of the effective basis vectors $v_1 \sim v_{N_B}$ with indices and which are previously determined by long-term information (the number of beams $N_B$ and/or the mode signal Mode), coefficients corresponding to the short-term information and the long-term information (the number of beams $N_B$ and/or the mode signal Mode), which is determined in Step 500 of FIG. 22, are extracted (Step 712). After Step 712, a plurality of weights is calculated using the extracted coefficients and the long-term information determined in Step 500 (Step 714). Here, the long-term information may include the effective basis vectors $v_1 \sim v_{N_B}$ and the number of beams $N_B$, the effective basis vectors $v_1 \sim v_{N_B}$ the number of beams $N_B$ and the mode signal Mode, or the effective basis vectors $v_1 \sim v_{N_B}$, the number of beams $N_B$ and the eigenvalues $\lambda_1 \sim \lambda_{N_B}$ Alternatively, the long-term information may include the effective basis vectors $v_1 \sim v_{N_B}$, the number of beams $N_B$, the mode signal Mode, and the eigenvalues $\lambda_1 \sim \lambda_{N_B}$.

Hereinafter, an embodiment of the second or the third weight extraction unit 540 or 640 of FIG. 23 or 27, respectively, performing the embodiment 502A or 502B of FIG. 30 or 31 according to the present invention will be described for its structure and operation with reference to the appended drawings.

Figure 32:
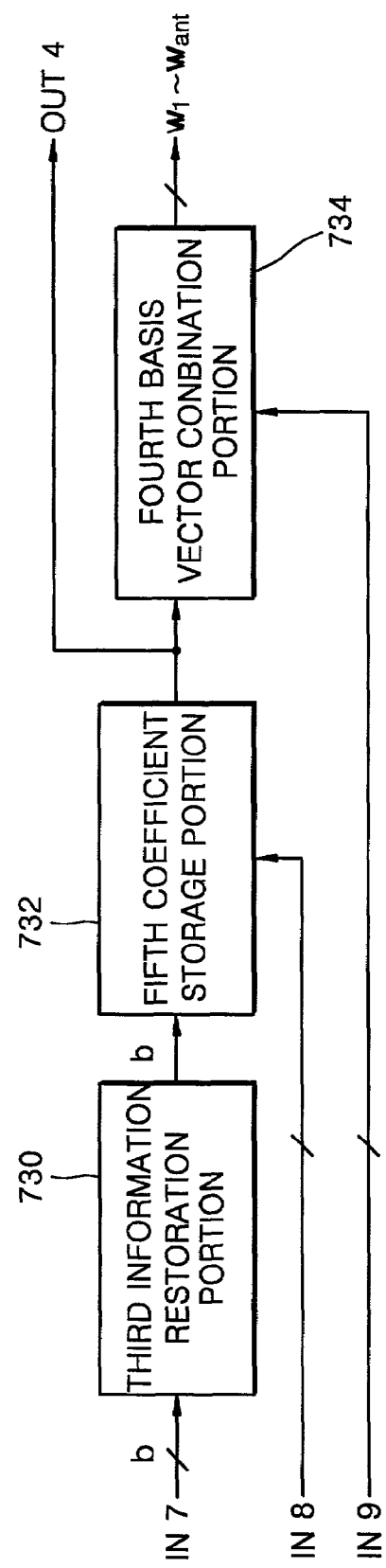
FIG. 32 shows a block diagram of an embodiment of a second weight extraction unit for the embodiment of FIG. 30 or a third weight extraction unit for the embodiment FIG. 31 according to the present invention.

FIG. 32 illustrates a block diagram of an embodiment of the second or the third weight extraction unit 504 or 640, respectively, performing the embodiment 502A or 502B of FIG. 30 or 31 according to the present invention. The embodiment of FIG. 32 includes a third information restoration portion 730, a fifth coefficient storage portion 732, and a fourth basis vector combination portion 734.

The third information restoration portion 730 of the second or third weight extraction unit 540 or 640 shown in FIG. 32 restores the short-term information b from the feedback signal received through the antenna array 536 of FIG. 23 or FIG. 27 and then an input port IN7 and outputs the restored short-term information b to the fifth coefficient storage portion 732 (Step 700 of FIG. 30 or Step 710 of FIG. 31).

After Step 700, the fifth coefficient storage unit 732 stores the predetermined tables, each of which has the coefficients of the effective basis vectors $v_1 \sim v_{N_B}$ with indices, and extracts coefficients corresponding to the short-term information b input from the third information restoration portion 730 and outputs the extracted coefficients to the fourth basis vector combination portion 734 (Step 702 of FIG. 30).

Meanwhile, after Step 710, the fifth coefficient storage portion 732 stores a number of tables, each of which has the coefficients of the effective basis vectors $v_1 \sim v_{N_B}$ with indices and which are predetermined by long-term information, for example, the numbers of beams $N_B$ and/or combination modes, selects a table according to the short-term information input from the third information restoration portion 730 and the number of beams $N_B$ and/or a mode signal Mode included in the long-term information input through an input port IN8, and extracts the coefficients from the selected table and outputs the extracted coefficients to the fourth basis vector combination portion 734 (Step 712 of FIG. 31).

After Step 702 or 712, the fourth basis vector combination portion 734 combines the coefficients input from the fifth coefficient storage portion 732 with the long-term information input through an input port IN9 from the BS long-term information determination unit 542 of FIG. 23 or FIG. 27 and outputs the resulting combinations as a plurality of weights $w_1 \sim w_{ant}$ to the multiplication unit 532 of FIG. 23 or FIG. 27 (Step 704 or 714). When the long-term information input through the input port IN9 includes the effective basis vectors $v_1 \sim v_{N_B}$, the weights $w_1 \sim w_{ant}$ are calculated using formula (10) above. When the long-term information input through the input port IN9 includes the effective basis vectors $v_1 \sim v_{N_B}$ and the eigenvalues $\lambda_1 \sim \lambda_{N_B}$, the weights $w_1 \sim w_{ant}$ are calculated using formula (11) above.

An embodiment 500A for Step 500 of FIG. 22 according to the present invention and the structure and operation of an embodiment according to the present invention for the BS long-term information determination unit 542 of FIG. 23 or FIG. 27 performing the embodiment 500A will be described with reference to the appended drawings.

Figure 33:
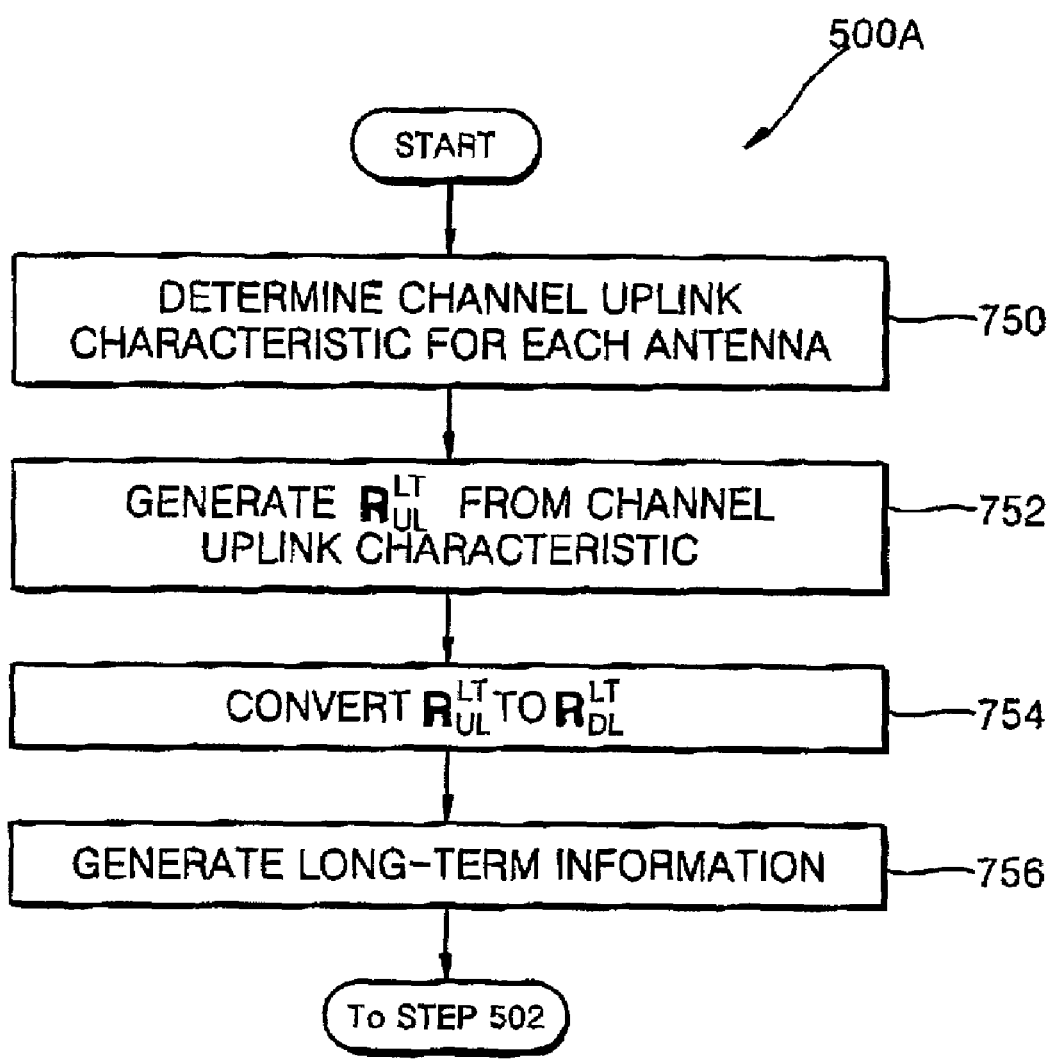
FIG. 33 shows a flowchart illustrating an embodiment for Step 500 of FIG. 22 according to the present invention.

FIG. 33 shows a flowchart illustrating the embodiment 500A for Step 500 of FIG. 22 according to the present invention. The embodiment 500A of FIG. 33 involves converting an uplink long-term time-space covariance matrix $R_{UL}^{LT}$ generated from the determined channel uplink characteristic $H_{UL}$ to a downlink long-term time-space covariance matrix $R_{DL}^{LT}$ (Steps 750 through 754) and generating the long-term information from the converted downlink long-term time-space covariance matrix $R_{DL}^{LT}$ (Step 756).

Figure 34:
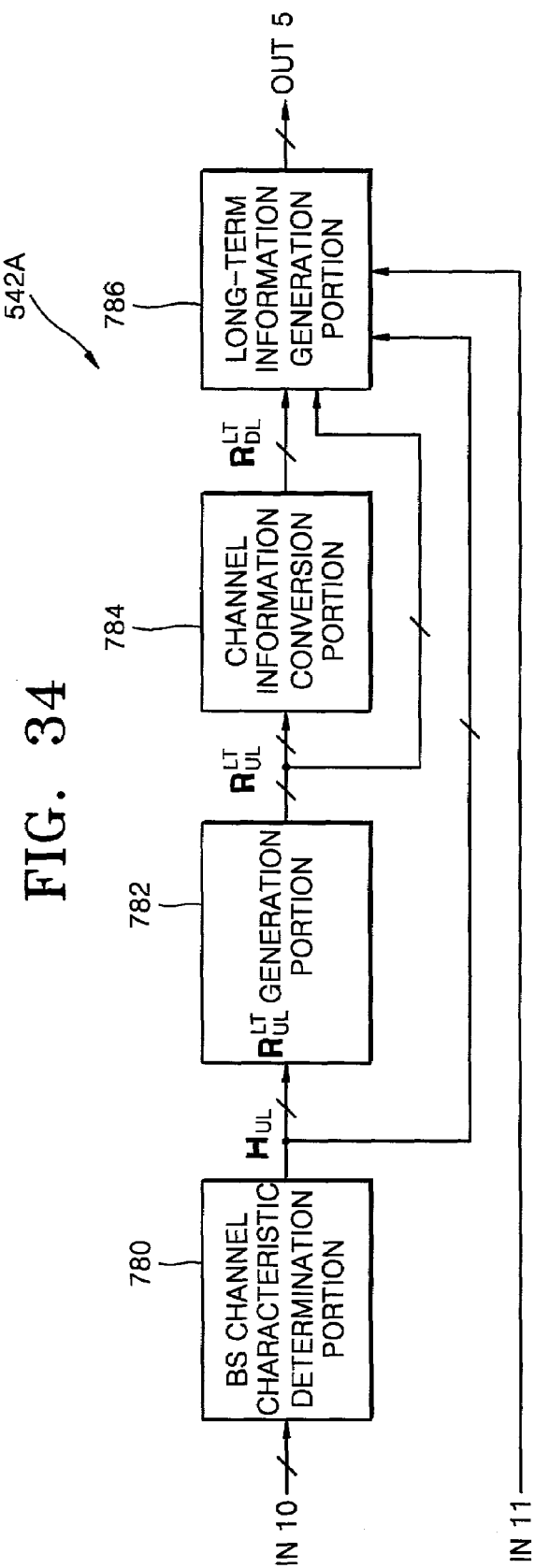
FIG. 34 shows a block diagram of an embodiment of a long-term information determination unit according to the present invention for the embodiment illustrated in FIG. 33.

FIG. 34 illustrates a block diagram of an embodiment 542A of the BS long-term information determination unit 542 of FIG. 23, according to the present invention, performing the embodiment 500A illustrated in FIG. 33. The embodiment 542A of FIG. 34 includes a BS channel characteristic determination portion 780, an uplink long-term time-space covariance matrix $(R_{UL}^{LT})$ generation portion 782, a channel information conversion portion 784, and a long-term information generation portion 786.

The BS channel characteristic determination portion 780 shown in FIG. 34 receives the signal transmitted from the mobile station shown in FIG. 21 or 26 through the antenna array 536 of FIG. 23 or FIG. 27 and then an input port IN10, determines the channel uplink characteristic $H_{UL}$ for each antenna from the received signal, and outputs the determined channel uplink characteristic $H_{UL}$ to the uplink long-term time-space covariance matrix $(R_{UL}^{LT})$ generation portion 782 (Step 750). Here, the principle of operation of the BS channel characteristic determination portion 780 is the same as that of the MS channel characteristic determination unit 62 shown in FIG. 4.

After Step 750, the uplink long-term time-space covariance matrix $(R_{UL}^{LT})$ generation portion 782 generates the uplink long-term time-space covariance matrix $R_{UL}^{LT}$ from the channel uplink characteristic $H_{UL}$, which is determined by the BS channel characteristic determination portion 780, and outputs the generated uplink long-term time-space covariance matrix $R_{UL}^{LT}$ to the channel information conversion portion 784 (Step 752). The channel uplink characteristic $H_{UL}$ and the uplink long-term time-space covariance matrix $R^{ULT}$ have the relationship of formula (16) below:

$$R_{UL}^{LT} = \Sigma R_{UL}^{ST} = \Sigma H_{UL} H_{UL}^{H}. \quad (16)$$

After Step 752, the channel information conversion portion 784 converts the uplink long-term time-space covariance matrix $R_{UL}^{LT}$ generated by the uplink long-term time-space covariance matrix $(R_{UL}^{LT})$ generation portion 782 to a downlink long-term time-space covariance matrix $R_{DL}^{LT}$ and outputs the converted downlink long-term time-space covariance matrix $R_{DL}^{LT}$ to the long-term information generation portion 786 (Step 754). This conversion process from the uplink long-term time-space covariance matrix $R^{ULT}$ to the downlink long-term time-space covariance matrix $R_{DL}^{LT}$ is known in the prior art.

After Step 754, the long-term information generation portion 786 generates the long-term information, for example, the effective basis vectors $v_1 \sim v_{N_B}$ and at least one among the eigenvalues $\lambda_1 \sim \lambda_{N_B}$, the number of beams $N_B$, or the mode signal Mode, based on the downlink long-term time-space covariance matrix $R_{DL}^{LT}$ input from the channel information conversion portion 784 by the eigen analysis technique described above, and outputs the generated long-term information through an output port OUT5 (Step 756).

Alternatively, the long-term information generation portion 786 shown in FIG. 34 may include a second mode signal generation portion (not shown) that generates a mode signal Mode using the long-term information, which is generated in the long-term information generation portion 786 by an eigen analysis technique, and/or the channel uplink characteristic $H_{UL}$ input from the BS channel characteristic determination portion 780.

Embodiments for the second mode signal generation portion according to the present invention, which may be provided in the long-term information generation portion 786, will now be described.

In one embodiment of the present invention, the second mode signal generation portion may be implemented like the first mode signal generation portion 126A shown in FIG. 8. In this case, the downlink short-term time-space covariance matrix $(R_{DL}^{ST})$ calculation portion 160 of FIG. 8 is replaced by an uplink short-term time-space covariance matrix $R_{UL}^{ST}$ calculation portion (not shown) which calculates an uplink short-term time-space covariance matrix $R_{UL}^{ST}$ from the uplink long-term time-space covariance matrix $R_{UL}^{ST}$ and outputs the calculated uplink short-term time-space covariance matrix $R_{UL}^{ST}$ to the expectation value calculation portion 162 of FIG. 8. Here, $R_{UL}^{ST}$ is obtained using the relationship between the uplink long-term time-space covariance matrix $R_{UL}^{ST}$ and the uplink short-term time-space covariance matrix $R_{UL}^{ST}$, which is expressed as formula (16) above.

The expectation value calculation portion 162 of FIG. 8 of the second mode signal generation portion calculates expectation values $E^{SL}$ and $E^{EG}$, as in Step 140 described with reference to FIG. 7, using the effective basis vectors $v_1 \sim v_{N_B}$ included in the long-term information and the coefficients input through an input port IN11 from the fifth coefficient storage portion 732 of FIG. 32. To this end, the fifth coefficient storage portion 732 of FIG. 32 outputs the extracted coefficients through an output port OUT4 of FIG. 32 to the expectation value calculation portion 162 of FIG. 8 of the second mode signal generation portion provided in the long-term information generation portion 786. Here, the first comparison portion 164 of FIG. 8 of the second mode signal generation portion generates a mode signal Mode using the calculated expectation values $E^{SL}$ and $E^{EG}$, as illustrated in FIG. 7.

In another embodiment of the present invention, the second mode signal generation portion may be implemented like the first mode signal generation portion 126B shown in FIG. 10 to generate a mode signal Mode, as illustrated in FIG. 9. In this case, the DOA calculation portion 200 of FIG. 10 calculates DOA's at the mobile station shown in FIG. 26 using the channel uplink characteristic $H_{UL}$ input from the BS channel characteristic determination portion 780, calculates a difference between adjacent calculated DOA's, and outputs the calculated difference to the second comparison portion 202 of FIG. 10. The second comparison portion 202 compares the difference between adjacent DOA's input from the DOA calculation portion 200 with a second threshold value $V_{th2}$ and generates a mode signal Mode according to the result of the comparison.

In still another embodiment of the present invention, the second mode signal generation portion may be implemented like the first mode signal generation portion 126C shown in FIG. 12 to generate a mode signal Mode, as illustrated in FIG. 11. In this case, the angular spread calculation portion 240 of FIG. 12 of the second mode signal generation portion calculates the angular spread of arrivals at the mobile station using the channel uplink characteristic $H_{UL}$ input from the BS channel characteristic determination portion 780, calculates the mean angular spread, and outputs the calculated the mean angular spread of arrivals to the third comparison portion 242 of FIG. 12. The third comparison portion 242 of FIG. 12 compares the mean angular spread with a third threshold value Vth3 and generates a mode signal Mode according to the result of the comparison.

In yet another embodiment of the present invention, the second mode signal generation portion may generate a mode signal Mode using the eigenvalues $\lambda_1 \sim v_{N_B}$. The structure and operation of the second mode signal generation portion in this embodiment of the present invention where the mode signal Mode is generated using the eigenvalues $\lambda_1 \sim \lambda_{N_B}$ and the process of generating the mode signal Mode thereof will be described with reference to the appended drawings.

Figure 35:
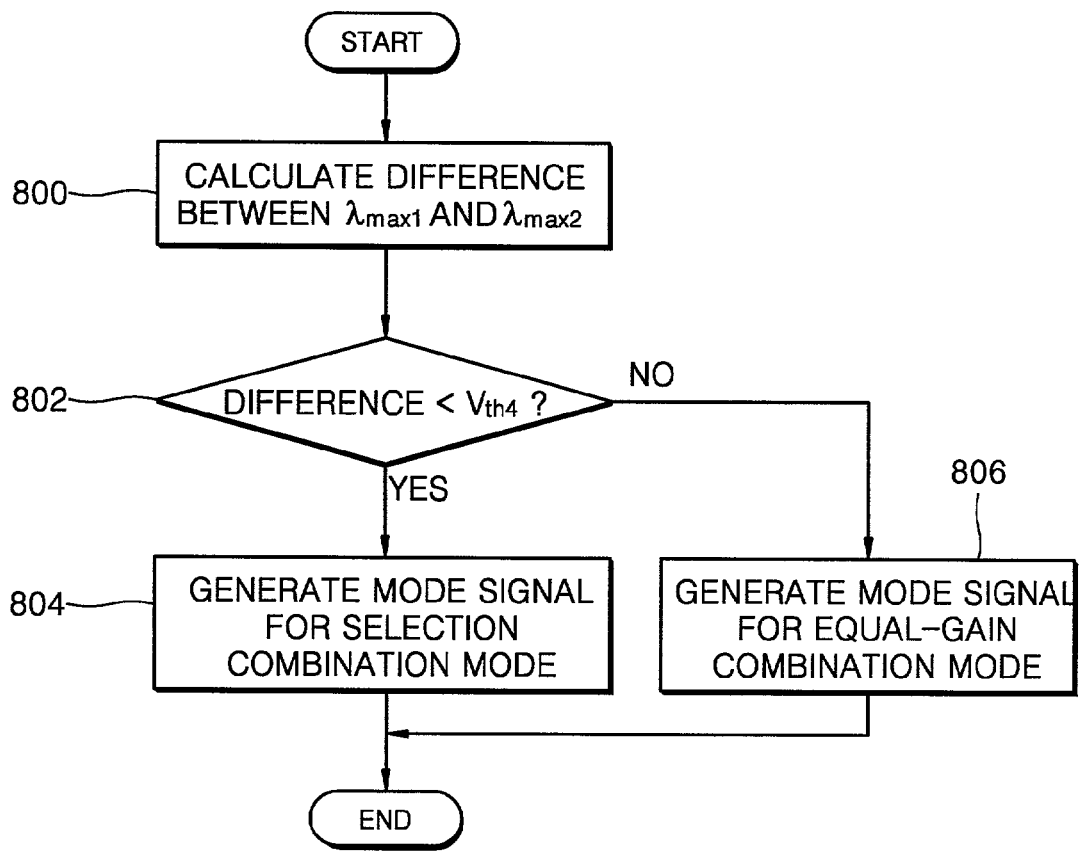
FIG. 35 shows a flowchart illustrating the process of generating a mode signal Mode as the long-term information by a second mode signal generation portion provided in a long-term information generation portion shown in FIG. 34.

FIG. 35 shows a flowchart, according to an embodiment of the present invention, illustrating the process of generating a mode signal Mode incorporated into the long-term information by a second mode signal generation portion provided in the long-term information generation portion 786 shown in FIG. 34. The process of FIG. 35 involves generating a mode signal Mode using a difference between the eigenvalues $\lambda_1 \sim \lambda_{N_B}$ (Steps 800 through 806).

Figure 36:
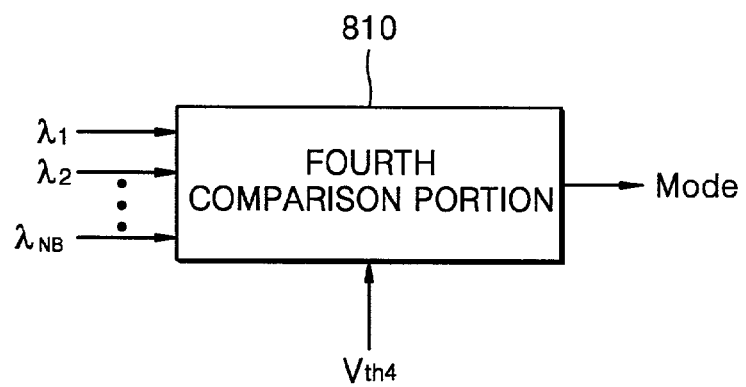
FIG. 36 shows a block diagram of an embodiment for the second mode signal generation portion which generates a mode signal Mode through the process illustrated in FIG. 35.

FIG. 36 illustrates a block diagram of an embodiment for the second mode signal generation portion which generates a mode signal Mode through the process illustrated in FIG. 35. The second mode signal generation portion shown in FIG. 36 includes a fourth comparison portion 810.

The long-term information generation portion 786 shown in FIG. 34 first generates the eigenvalues $\lambda_1 \sim \lambda_{N_B}$ from the long-term time-space covariance matrix $R_{DL}^{LT}$ by an eigen analysis technique and incorporates the generated eigenvalues $\lambda_1 \sim \lambda_{N_B}$ into the long-term information. The fourth comparison portion 810 shown in FIG. 36 compares a difference between the first largest eigenvalue $\lambda_{max1}$ and the second largest eigenvalue $\lambda_{max2}$ among the eigenvalues $\lambda_1 \sim \lambda_{N_B}$ incorporated into the long-term information with a fourth threshold value $V_{th4}$ and outputs the result of the comparison as a mode signal Mode. Here, the fourth comparison portion 810 calculates the difference between the first largest eigenvalue $\lambda_{max1}$ and the second largest eigenvalue $\lambda_{max2}$ among the eigenvalues $\lambda_1 \sim \lambda_{N_B}$ (Step 800 of FIG. 35). After Step 800, it is determined whether the difference between the first largest eigenvalue $\lambda_{max1}$ and the second largest eigenvalue $\lambda_{max2}$ is smaller than the fourth threshold value $V_{th4}$ (Step 802 of FIG. 35).

If the difference between the first largest eigenvalue $\lambda_{max1}$ and the second largest eigenvalue $\lambda_{max2}$ is determined to be smaller than the fourth threshold value $V_{th4}$, a mode signal Mode representing the selection combination mode is generated (Step 804 of FIG. 35). In contrast, if the difference between the first largest eigenvalue $\lambda_{max1}$ and the second largest eigenvalue $\lambda_{max2}$ is determined to be greater than or equal to the fourth threshold value $V_{th4}$, a mode signal Mode representing the equal-gain combination mode is generated (Step 806 of FIG. 35). The second, third, and fourth threshold values $V_{th2}$, $V_{th3}$, and $V_{th4}$ described above are experimentally determined.

Embodiments of the basis pilot signal generation unit 538 shown in FIG. 23 or FIG. 27 according to the present invention will be described for structure and operation with reference to the appended drawings.

Figure 37:
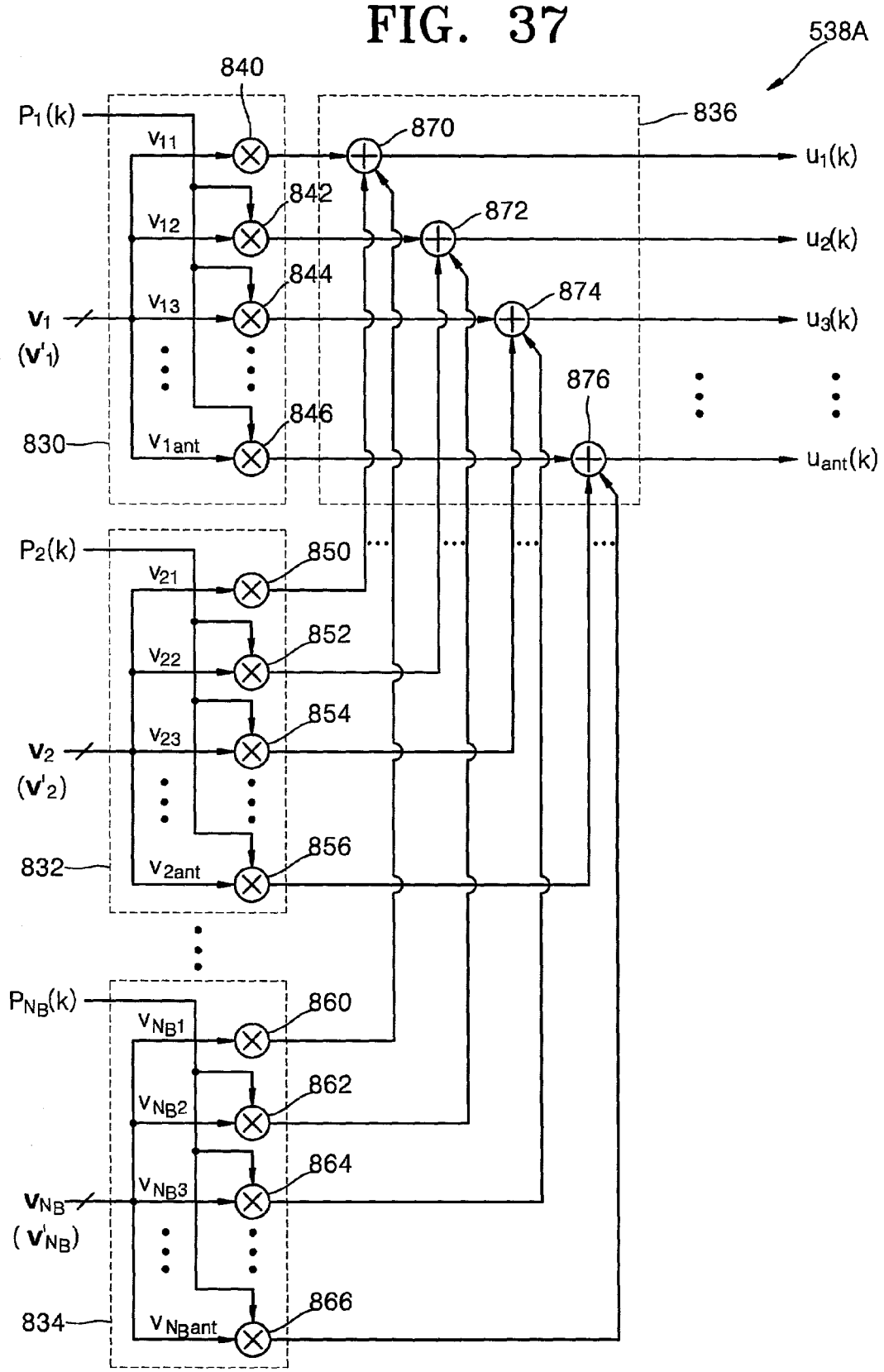
FIG. 37 shows a block diagram of an embodiment for a basis pilot signal generation unit 538 of FIG. 23 or 27 according to the present invention.

FIG. 37 illustrates a block diagram of an embodiment 538A for the basis pilot signal generation unit 538 of FIG. 23 or FIG. 27 according to the present invention. The embodiment 538A includes multiplication portions 830, 832, . . . , and 834 in a quantity equal to the number of beams $N_B$ and an addition portion 836.

In this embodiment of the present invention, the basis pilot signal generation unit 538A shown in FIG. 37 multiplies $N_B$ pilot channel signals $P_1(k) \sim P_{N_B}(k)$ by the respective effective basis vectors $v_1, v_2, \ldots,$ and $v_{N_B}$ input from the BS long-term information determination unit 542 of FIG. 23 or FIG. 27, adds the products, and outputs the results of the additions as basis pilot signals $u_1(k) \sim u_{ant}(k)$ to the addition unit 534 of FIG. 23 or FIG. 27. To this end, the multiplication portions 830, 832, . . . , and 834 of the basis pilot signal generation unit 538A multiply the $N_B$ pilot channel signals $P_1(k) \sim P_{N_B}(k)$ by the respective effective basis vectors $v_1, v_2, \ldots,$ and $v_{N_B}$ input through the input port IN4 from the BS long-term information determination unit 542 and output the products to the addition portion 836. Here, each multiplication portions 830, 832, . . . , and 834 includes ant multipliers. For example, the multiplication portion 830 includes ant multipliers 840, 842, 844, . . . , and 846 which multiply the first pilot channel signal $P_1(k)$ by the respective components $v_{11}, v_{12}, v_{13}, \ldots,$ and $v_{1ant}$ of the first effective basis vector $v_1$ and output the products to the addition portion 836. The multiplication portion 832 includes ant multipliers 850, 852, 854, . . . , and 856 which multiply the second pilot channel signal $P_2(k)$ by the respective components $v_{21}, v_{22}, v_{23}, \ldots,$ and $v_{2ant}$ of the second effective basis vector $v_2$ and output the products to the addition portion 836. Similarly, the multiplication portion 834 includes ant multipliers 860, 862, 864, . . . , and 866 which multiply the $N_B^{th}$ pilot channel signal $P_{N_B}(k)$ by the respective components $v_{N_B1}, v_{N_B2}, v_{N_B3}, \ldots,$ and $v_{N_Bant}$ of the $N_B^{th}$ effective basis vector $v_{N_B}$ and output the products to the addition portion 836.

The addition portion 836 adds the products output from the multiplication portions 830, 832, . . . , and 834 for each antenna and outputs as the results of the additions the basis pilot signals $u_1(k) \sim u_{ant}(k)$ for each antenna to the addition unit 534 of FIG. 23 or 27. To this end, the addition portion 836 includes ant adders 870, 872, 874, . . . , and 876. At this time, the adder 870 adds the products from the first multipliers 840, 850, . . . , and 860 of the respective multiplication portions 830, 832, . . . , and 834 and outputs the result of the addition as the first basis pilot signal $u_1(k)$ to the adder 560 shown in FIG. 23 or 27. The adder 872 adds the products from the second multipliers 842, 852, . . . , and 862 of the respective multiplication portions 830, 832, . . . , and 834 and outputs the result of the addition as the second basis pilot signal $u_2(k)$ to the adder 562 shown in FIG. 23 or 27. Similarly, the adder 876 adds the products from the $ant^{th}$ multipliers 846, 856, . . . , and 866 of the respective multiplication portions 830, 832, . . . , and 834 and outputs the result of the addition as the $ant^{th}$ basis pilot signal $u_{ant}(k)$ to the adder 566 shown in FIG. 23 or 27.

Figure 38:
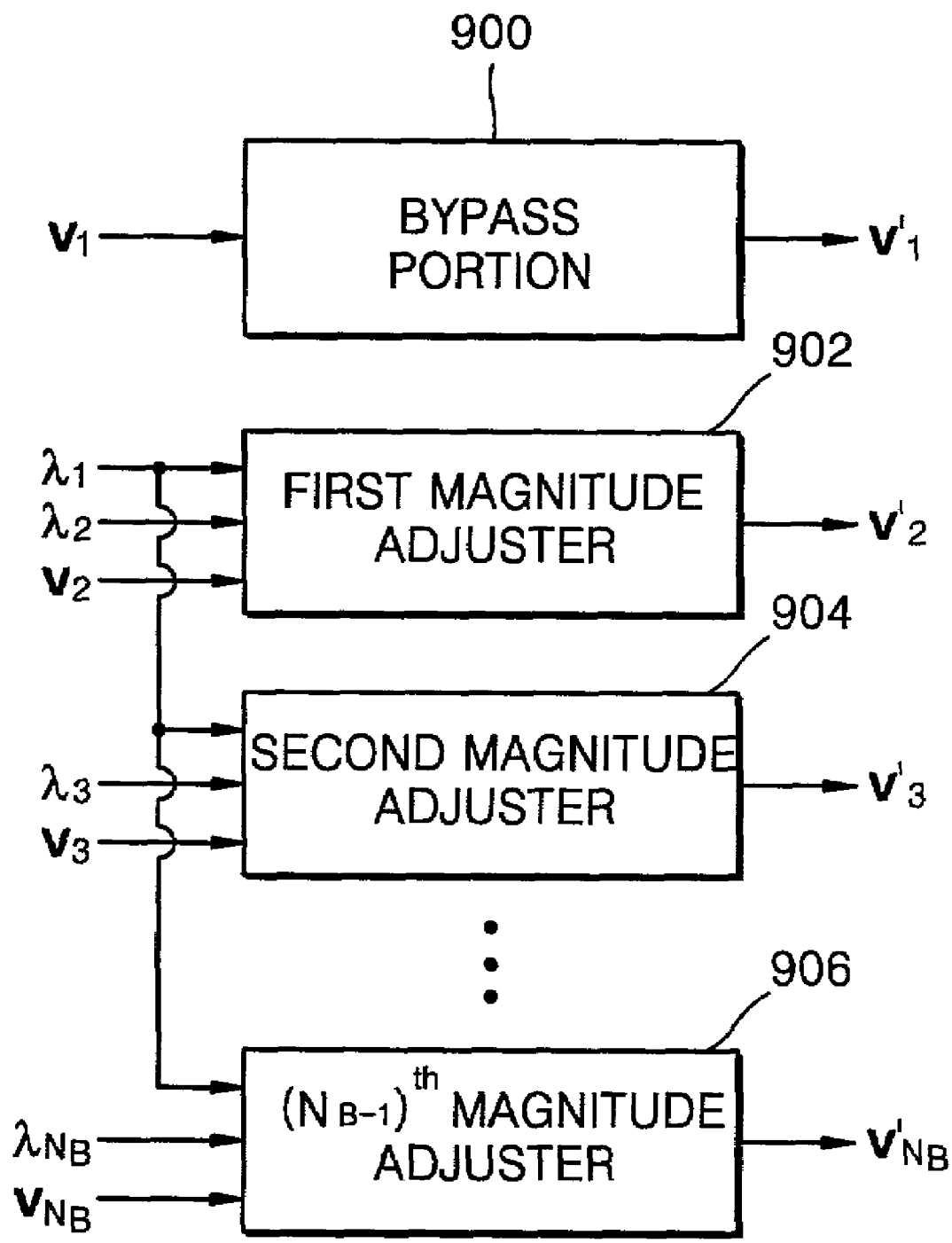
FIG. 38 shows a block diagram of another embodiment for the basis pilot signal generation unit of FIG. 23 or 27 according to the present invention.

FIG. 38 illustrates a block diagram for explaining another embodiment for the basis pilot signal generation unit 538 of FIG. 23 or 27 according to the present invention. The basis pilot signal generation unit shown in FIG. 38 includes a bypass portion 900, and first, second, . . . , and $(N_B-1)^{th}$ magnitude adjusters 902, 904, . . . , and 906.

In this embodiment according to the present invention, the basis pilot signal generation unit 538 of FIG. 23 or 27 adjusts the magnitudes of the effective basis vectors $v_1, v_2, \ldots,$ and $v_{N_B}$ input through the input port IN4 from the BS long-term information determination unit 542 shown in FIG. 23 or 27, multiplies $N_B$ pilot channel signals $P_1(k) \sim P_{N_B}(k)$ by the respective magnitude-adjusted effective basis vectors $v'_1, v'_2, \ldots,$ and $v'_{N_B}$, adds the products, and outputs the results of the additions as basis pilot signals $u_1(k) \sim u_{ant}(k)$ to the addition unit 534 of FIG. 23 or 27.

To this end, the basis pilot signal generation unit 538A of FIG. 37 may further include the bypass portion 900, and the first, second, . . . , and $(N_B-1)^{th}$ magnitude adjusters 902, 904, . . . , and 906, as shown in FIG. 38.

The bypass portion 900 shown in FIG. 38 passes the first effective basis vector $v_1$ to the multiplication portion 830 of FIG. 37, without adjusting its magnitude, as the first magnitude-adjusted effective basis vector $v'_1$. At this time, the first magnitude adjuster 902 divides the second eigen value $\lambda_2$ by the first eigen value $\lambda_1$, multiplies the result of the division $(\lambda_2/\lambda_1)$ by the second effective basis vector $v_2$, and outputs the product $(\lambda_2 v_2/\lambda_1)$ as the second magnitude-adjusted effective basis vector $v_2'$, instead of the second effective basis vector $v_2$, to the multiplication portion 832. Similarly, the $(N_B-1)^{th}$ magnitude adjuster 906 divides the $N^{Bth}$ eigenvalue $\lambda_{N_B}$ by the first eigenvalue $\lambda_1$, multiplies the result of the division $(\lambda_{N_B}/\lambda_1)$ by the $N_B^{th}$ effective basis vector $v_{N_B}$, and outputs the product $(\lambda_{N_B} v_{N_B}/\lambda_1)$ as the $N_B^{th}$ magnitude-adjusted effective basis vector $v_{N_B}'$, instead of the $N_B^{th}$ effective basis vector $v_{N_B}$, to the multiplication portion 834.

Examples of operation for the mobile communication apparatuses and methods illustrated in FIGS. 19 through 38 where the long-term information is determined at the base station 10, instead of at the mobile station 20, 22, or 24, of FIG. 1 will now be described.

First, it is assumed that the number of beams $N_B$ is fixed and the mode signal Mode is not determined as the long-term information, i.e., that the long-term information, which is determined at the base station, is not transmitted to the mobile station. In this case, the mobile station shown in FIG. 21 and the base station shown in FIG. 23 are available.

The third coefficient storage unit 484 shown in FIG. 21 and the fifth coefficient storage portion 732 shown in FIG. 32 store one table corresponding to a fixed combination mode and the fixed number of beams $N_B$, for example, one of Tables 1 through 5 illustrated above. The long-term information generation portion 786 of the BS long-term information determination unit 542A shown in FIG. 34 determines the effective basis vectors $v_1 \sim v_{N_B}$ alone or along with the eigenvalues $\lambda_1 \sim \lambda_{N_B}$ as the long-term information and outputs the determined long-term information through the output port OUT5 to the fourth basis vector combination portion 734 (see FIG. 32) of the second weight extraction unit 540 of FIG. 23.

For example, when the number of beams $N_B$ is equal to 2, the determined long-term information includes no mode signal Mode, and the third coefficient storage unit 484 of FIG. 21 and the fifth coefficient storage portion 732 of FIG. 32 store one table corresponding to the equal-gain combination mode with $N_B=2$, the third basis vector combination portion 660 of the second short-term information determination unit shown in FIG. 28 receives two identity basis vectors $[1\ 0]^T$ and $[0\ 1]^T$ and outputs four weight vectors $w_0 \sim w_3$. Also, the basis pilot signal generation unit 538A shown in FIG. 37 receives two effective basis vectors $v_1$ and $v_2$ and two pilot channel signals $P_1(k)$ and $P_2(k)$ and outputs ant basis pilot signals $u_1(k)$ through $u_{ant}(k)$.

Second, it is assumed that the long-term information is determined at the base station and then transmitted to the mobile station. That is, three possible cases are assumed: (1) a mode signal Mode is generated with a fixed number of beams $N_B$, (2) a mode signal Mode is generated with unfixed numbers of beams $N_B$, and (3) no mode signal Mode is generated with unfixed numbers of beams $N_B$. In these cases, the mobile station shown in FIG. 26 and the base station shown in FIG. 27 are available.

For example, when the number of beams $N_B$ is not fixed or when a mode signal Mode is generated, the second information restoration unit 622 of the mobile station shown in FIG. 26 restores either the number of beams $N_B$ or the mode signal Mode as the long-term information. The fourth coefficient storage unit 620 of FIG. 26 selects the corresponding table according to either the number of beams $N_B$ or the mode signal Mode output from the second information restoration unit 622, among a number of tables which were previously determined and stored by the combination modes or numbers of beams $N_B$, and outputs the coefficients of the selected table to the second short-term information determination unit 480 of FIG. 26. Meanwhile, the long-term information generation portion 786 (see FIG. 34) of the BS long-term information determination unit 542 shown in FIG. 27 determines either the number of beams $N_B$ or the mode signal Mode as the long-term information. The determined long-term information is transmitted to the BS signal conversion unit 642 of FIG. 27 and the mobile station of FIG. 26 through the array antenna 536 of FIG. 23 or 27. Also, either the number of beams $N_B$ or the mode signal Mode along with the effective basis vectors $v_1 \sim v_{N_B}$ are output as the long-term information from the long-term information generation portion 786 of FIG. 34 of the BS signal conversion unit 542 to the third weight extraction unit 640 of FIG. 27. The fifth coefficient storage portion 732 of the third weight extraction unit 640 shown in FIG. 32 selects the corresponding table according to either the number of beams $N_B$ or the mode signal Mode input through the input port IN8 from the BS long-term information determination unit 542, among a number of tables which were previously determined and stored by the combination modes or numbers of beams $N_B$. The fifth coefficient storage portion 732 outputs the corresponding coefficients from the selected table to the fourth basis vector combination portion 734 of FIG. 32.

For another example, when a mode signal Mode is generated with unfixed numbers of beams $N_B$, the second information restoration unit 622 of the mobile station shown in FIG. 26 restores the long-term information including the number of beams $N_B$ and the mode signal Mode using a signal received through the antenna array 536 and transmitted from the base station of FIG. 27. The fourth coefficient storage unit 620 selects a table corresponding to the number of beams $N_B$ and the mode signal Mode included in the restored long-term information input from the second information restoration unit 622 from a number of tables which were previously determined and stored by the combination modes and numbers of beams $N_B$, and outputs the coefficients of the selected table to the second short-term information determination unit 480 of FIG. 26. Meanwhile, the long-term information generation portion 786 (see FIG. 34) of the BS long-term information determination unit 542 shown in FIG. 27 determines the number of beams $N_B$ and the mode signal Mode as the long-term information, and transmits the determined long-term information to the BS signal conversion unit 642 of FIG. 27 and the mobile station of FIG. 26 through the array antenna 536. Also, the effective basis vectors $v_1 \sim v_{N_B}$, the number of beams $N_B$, and the mode signal Mode are output as the long-term information from the BS signal conversion unit 642 of FIG. 27 to the third weight extraction unit 640 of FIG. 27. The fifth coefficient storage portion 732 of the third weight extraction unit 640 shown in FIG. 32 selects a table corresponding to the number of beams $N_B$ and the mode signal Mode input through the input port IN8 from the BS long-term information determination unit 542 of FIG. 27 from among a number of tables which were previously determined and stored by the combination modes and numbers of beams $N_B$. The fifth coefficient storage portion 732 outputs the coefficients of the selected table to the fourth basis vector combination portion 734 of FIG. 32.

Third, when formula (10) or (11) above is used to extract a plurality of weights $w_1 \sim w_{ant}$ at the base station, the mobile station shown in FIG. 21 and the base station shown in FIG. 23 or the mobile station shown in FIG. 26 and the base station shown in FIG. 27 are available.

For example, when the weights $w_1 \sim w_{ant}$ are extracted using formula (10) above at the base station, the basis pilot signal generation unit 538 shown in FIG. 23 or 27 may be implemented as the basis pilot signal generation unit 538A shown in FIG. 37. The long-term information generation portion 786 (see FIG. 34) of the BS long-term information determination unit 542 FIG. 23 or 27 outputs the effective basis vectors $v_1 \sim v_{N_B}$ as the long-term information to the second weight extraction unit 540 of FIG. 23 or the third weight extraction unit 640 of FIG. 27. Then, the fourth basis vector combination portion 734 of the second weight extraction unit 540 or the third weight extraction unit 640 shown in FIG. 32 extracts the weights $w_1 \sim w_{ant}$ using formula (10) above from the effective basis vectors $v_1 \sim v_{N_B}$ input through the input port IN9 from the BS long-term information determination unit 542 of FIG. 23 or 27.

For another example, when the weights $w_1 \sim w_{ant}$ are extracted using formula (11) above at the base station, the basis pilot signal generation unit 538 shown in FIG. 23 or 27 may be implemented as the basis pilot signal generation unit 538A shown in FIG. 37 with the circuit shown in FIG. 38. That is, the bypass portion 900 and the first through $(N_B-1)^{th}$ magnitude adjusters 902 through 906 adjust the magnitudes of the effective basis vectors $v_1 \sim v_{N_B}$. The multiplication portions 830, 832, . . . , and 834 of the basis pilot signal generation unit 538A of FIG. 37 receive the respective magnitude-adjusted effective basis vectors $v'_1 \sim v'_{N_B}$, instead of the effective basis vectors $v_1 \sim v_{N_B}$. The long-term information generation portion 786 of the BS long-term information determination unit 542 outputs the effective basis vectors $v_1 \sim v_{N_B}$ and the eigenvalues $\lambda_1 \lambda_{N_B}$ as the long-term information to the second weight extraction unit 540 of FIG. 23 or the third weight extraction unit 640 of FIG. 27. Then, the fourth basis vector combination portion 734 of the second weight extraction unit 540 or the third weight extraction unit 640 shown in FIG. 32 extracts the weights $w_1 \sim w_{ant}$ using formula (11) above from the effective basis vectors $v_1 \sim v_{N_B}$ and the eigenvalues $\lambda_1 \sim \lambda_{NB}$ input through the input port IN9 from the BS long-term information determination unit 542 of FIG. 23 or 27.

As described above, a mobile communication apparatus with an antenna array and a mobile communication method therefor according to the present invention use basis vectors based on the correlation characteristics of time-space channels and thus may minimize the quantity of feedback information based on correlation values existing between multiple antennas constituting an antenna array. Therefore, even with an increasing number of antennas for an antenna array, performance degradation due to an increasing movement rate of a mobile station may be reduced with improved reception signal-to-noise ratio required at the mobile station. The present invention feeds back information of properly combining long-term channel information and short-term channel information, which allows more users to use the same bandwidth through efficient feedback bandwidth utilization and maximizes diversity and beamforming effects according to channel characteristics. When the long-term information is determined at the base station, not at the mobile station, the mobile station may have a smaller size with reduced power consumption. When the long-term information is determined at the mobile station, instead of the base station, communication performance may be enhanced.

While the present invention has been particularly shown and described with reference to preferred embodiments thereof, it will be understood by those of ordinary skill in the art that various changes in form and details may be made therein without departing from the spirit and scope of the present invention as defined by the appended claims.

What is claimed is:

1. A mobile communication apparatus comprising:
a base station with an antenna array; and
a mobile station,
wherein the mobile station determines a channel downlink characteristic for each antenna using a signal transmitted from the base station, determines long-term information and short-term information based on a correlation of characteristics between channels for each antenna using the channel downlink characteristic, converts the determined long-term information and short-term information to a feedback signal, and transmits the feedback signal to the base station; and
wherein the base station receives the feedback signal, extracts a plurality of weights from the long-term information and short-term information restored from the received feedback signal, multiplies a multiplexed dedicated physical channel signal by the respective weights, adds respective pilot channel signals to the products, and transmits the results of the additions through the antenna array to the mobile station.

2. The mobile communication apparatus as claimed in claim 1, wherein the mobile station comprises:
a mobile station channel characteristic determination unit which receives the signal transmitted from the base station, determines the channel downlink characteristic from the received signal, and outputs the determined channel downlink characteristic;
a mobile station long-term information determination unit which generates basis vectors and eigenvalues from the channel downlink characteristic, calculates a number of beams, which is equal to the number of effective basis vectors, from the eigenvalues, and outputs the effective basis vectors and the number of beams as the long-term information;
a first coefficient storage unit which predetermines and stores tables by the number of beams, each table having coefficients of the effective basis vector with indices, and outputs the coefficients of a table selected by the number of beams input from the mobile station long-term information determination unit;
a first short-term information determination unit which obtains weight vectors using the coefficients output from the first coefficient storage unit and the effective basis vectors, determines the index resulting in a maximum reception power using the weight vectors and the channel downlink characteristic, and outputs the determined index as the short-term information, wherein the weight vectors are expressed as combinations of the effective basis vectors and the coefficients, and the weight vector corresponding to the index determined as the short-term information consists of the weights; and
a mobile station signal conversion unit for converting the determined long-term information and short-term information to the feedback signal.

3. The mobile communication apparatus as claimed in claim 2, wherein the mobile station further comprises a first selection unit which selectively outputs the coefficients from the first coefficient storage unit according to a mode signal, the mobile station long-term information determination unit generates the mode signal representing a combination mode of the effective basis vectors using the channel downlink characteristic, incorporates the mode signal into the long-term information, the first coefficient storage unit predetermines and stores tables by the number of beams and the combination modes, and the first short-term information determination unit obtains the weights using the coefficients output from the first selection unit and the effective basis vectors.

4. The mobile communication apparatus as claimed in claim 3, wherein the mobile station long-term information determination unit incorporates the eigenvalues into the long-term information and outputs the long-term information to the mobile station signal conversion unit.

5. The mobile communication apparatus as claimed in claim 4, wherein the mobile station signal conversion unit comprises:
   a mobile station long-term information formatting portion which formats the long-term information input from the mobile station long-term information determination unit and outputs the formatted result;
   a mobile station short-term information formatting portion which formats the short-term information input from the first short-term information determination unit and outputs the formatted result; and
   a time division multiplexing portion which time-division-multiplexes the formatted result input from the mobile station long-term information formatting portion and the formatted result input from the mobile station short-term information formatting portion and outputs the result of the time-division-multiplexing as the feedback signal.

6. The mobile communication apparatus of claim 4, wherein the base station comprises:
   a first weight extraction unit which restores the long-term information and short-term information from the feedback signal received through the antenna array, extracts the weights from the restored long-term information and short-term information, and outputs the extracted weights;
   a multiplexing unit which multiplexes a dedicated physical channel signal and outputs the result of the multiplexing;
   a multiplication unit which multiplies the result of the multiplexing input from the multiplexing unit by the respective weights input from the first weight extraction unit, and outputs the products; and
   an addition unit which adds the respective pilot channel signals to the products input from the multiplication unit and outputs the results of the additions,
   wherein the results of the additions output from the addition unit are transmitted through the antenna array to the mobile station.

7. The mobile communication apparatus as claimed in claim 3, wherein the mobile station long-term information determination unit comprises:
   an eigen analysis portion which generates the basis vectors and the eigenvalues from the channel downlink characteristic by eigen analysis;
   a beam number calculation portion which counts the number of the eigenvalues which are greater than a first threshold value, and outputs the result of the counting as the number of beams;
   a second selection portion which selects basis vectors in a quantity equal to the number of beams from among the basis vectors input from the eigen analysis portion as the effective basis vectors, and outputs the effective basis vectors; and
   a first mode signal generation portion which generates the mode signal using the channel downlink characteristic.

8. The mobile communication apparatus as claimed in claim 7, wherein the first mode signal generation portion comprises:
   a downlink short-term time-space covariance matrix calculation portion which calculates a downlink short-term time-space covariance matrix from the channel downlink characteristic;
   an expectation value calculation portion which calculates expectation values $E^{SL}$ and $E^{EG}$ based on the downlink short-term time-space covariance matrix, the coefficients input from the first coefficient storage unit and the effective basis vectors using the following formulae:

$$E^{SL}=E[w_s^H R_{DL}^{ST} w_s], \text{ and}$$

$$E^{EG}=E[w_e^H R_{DL}^{ST} w_e]$$

where $R_{DL}^{ST}$ denotes the downlink short-term time-space covariance matrix, $$w_s = \sum_{i=0}^{N_B-1} a_i^s(b) v_i, \quad w_e = \sum_{i=0}^{N_B-1} a_i^e(b) v_i,$$

$w_s^H$ is a conjugate-transpose matrix of $w_s$, and $w_e^H$ is a conjugate-transpose matrix of $w_e$, where $v_i$ is the effective basis vector, b is the index, $N_B$ denotes the number of beams, $a_i^s(b)$ are coefficients which are determined for the selection combination mode with the index b from among coefficients input from the first coefficient storage portion, and $a_i^e(b)$ are coefficients which are determined for the equal-gain combination mode with the index b from among coefficients input from the first coefficient storage portion; and
   a first comparison portion which compares the expectation values and generates the mode signal in response to the result of the comparison.

9. The mobile communication apparatus as claimed in claim 7, wherein the first mode signal generation portion comprises:
   a direction-of-arrival (DOA) calculation portion which calculates DOA's at the mobile station from the channel downlink characteristic; and
   a second comparison portion which compares a difference between adjacent DOA's with a second threshold value and generates the mode signal in response to the result of the comparison.

10. The mobile communication apparatus as claimed in claim 7, wherein the first mode signal generation portion comprises:
    an angular spread calculation portion which calculates the angular spread of directions-of-arrival (DOA's) at the mobile station from the channel downlink characteristic; and
    a third comparison portion which compares the mean angular spread with a third threshold value and generates the mode signal corresponding to the result of the comparison.

11. The mobile communication apparatus as claimed in claim 2, wherein the first short-term information determination unit comprises:

a first basis vector combination portion which combines the effective basis vectors with the coefficients output from the first coefficient storage unit and outputs the resulting combinations as the weight vectors;

a reception power calculation portion which multiplies the respective weight vectors input from the first basis vector combination portion by the channel downlink characteristic, calculates the norm square of the respective products, and outputs the results of the calculation as reception power values; and a maximum power finding portion which finds as the maximum reception power the largest power reception value among the reception power values input from the reception power calculation portion and outputs as the short-term information the index in which the coefficients used to calculate the weight vector are positioned.

12. The mobile communication apparatus as claimed in claim 3, wherein the first short-term information determination unit comprises:

a first basis vector combination portion which combines the effective basis vectors with the coefficients input from the first selection unit and outputs the resulting combinations as the weight vectors;

a reception power calculation portion which multiplies the respective weight vectors input from the first basis vector combination portion by the channel downlink characteristic, calculates the norm square of the respective products, and outputs the results of the calculation as reception power values; and a maximum power finding portion which finds as the maximum reception power the largest power reception value from among the reception power values input from the reception power calculation portion and outputs the index in which the coefficients used to calculate the weight vector are positioned, wherein the weight vector corresponding to the index determined as the short-term information consists of the weights.

13. The mobile communication apparatus as claimed in claim 6, wherein the first weight extraction unit comprises:

a first information restoration portion which restores the long-term information and short-term information from the received feedback signal and outputs the restored long-term information and short-term information;

a second coefficient storage portion which predetermines and stores tables by the number of beams, each table having coefficients of the effective basis vectors with indices, and extracts coefficients from a table, which is selected in response to the number of beams incorporated into the long-term information, in response to the short-term information; and a second basis vector combination portion which combines the effective basis vectors incorporated into the long-term information using the coefficients input from the second coefficient storage portion and outputs the resulting combinations as the weights to the multiplication unit.

14. The mobile communication apparatus as claimed in claim 13, wherein the second basis vector combination portion combines the effective basis vectors incorporated into the long-term information using the coefficients input from the second coefficient storage portion and the eigenvalues incorporated into the long-term information and outputs the resulting combinations as the weights to the multiplication unit.

15. The mobile communication apparatus as claimed in claim 13, wherein the second basis vector combination portion combines the effective basis vectors incorporated into the long-term information using the coefficients input from the second coefficient storage portion and the eigenvalues incorporated into the long-term information, and outputs the resulting combinations as the weights to the multiplication unit.

16. A mobile communication method using an antenna array for a mobile communication apparatus including a base station with the antenna array and a mobile station, the method comprising:

(a) determining a channel downlink characteristic for each antenna using a signal transmitted from the base station, determining long-term information and short-term information based on a correlation of characteristics between channels for each antenna using the channel downlink characteristic, converting the determined long-term information and short-term information to a feedback signal, and transmitting the feedback signal to the base station; and (b) receiving the feedback signal, extracting a plurality of weights from the long-term information and short-term information restored from the received feedback signal, multiplying a multiplexed dedicated physical channel signal by the respective weights, adding respective pilot signals to the products, and transmitting the results of the additions through the antenna array to the mobile station.

17. The mobile communication method as claimed in claim 16, wherein (a) comprises:

(a1) receiving the signal transmitted from the base station and determining the channel downlink characteristic from the received signal;

(a2) generating basis vectors and eigenvalues from the channel downlink characteristic, calculating the number of beams which is equal to the number of effective basis vectors, from the eigenvalues, and outputting the effective basis vectors and the number of beams as the long-term information;

(a3) determining as the short-term information an index resulting in a maximum reception power using weight vectors calculated from the effective basis vectors, the channel downlink characteristic, and coefficients of a table corresponding to the number of beams from among tables which are predetermined by the number of beams and each of which has coefficients of the effective basis vectors with indices and is stored in the mobile station.

(a4) converting the determined long-term information and short-term information to the feedback signal, wherein the weight vectors are expressed as combinations of the effective basis vectors and the coefficients, and the weight vector corresponding to the index determined as the short-term information consists of the weights.

18. The mobile communication method as claimed in claim 17, wherein in (a2), a mode signal representing a combination mode of the effective basis vectors is generated from the channel downlink characteristic and the generated mode signal is incorporated into the long-term information, and in (a3), the index resulting in a maximum reception power is determined as the short-term information using the weight vectors calculated from the effective basis vectors, the channel downlink characteristic, and the coefficients of a table corresponding to the number of beams and the mode signal from among tables which are predetermined by the number of beams and the combination modes and each of which has the coefficients of the effective basis vectors with indices and is stored in the mobile station.

19. The mobile communication method as claimed in claim 18, wherein in (a2), the eigenvalues are incorporated into the long-term information.

20. The mobile communication method as claimed in claim 19, wherein (b) comprises:
(b1) restoring the long-term information and short-term information from the feedback signal received through the antenna array and extracting the weights from the restored long-term information and short-term information;
(b2) multiplexing the dedicated physical channel signal and multiplying the result of the multiplexing by the respective weights extracted in (b1); and
(b3) adding the respective pilot channel signals to the products obtained in (b2),
wherein the results of the additions in (b3) are transmitted through the antenna array to the mobile station.

21. The mobile communication method as claimed in claim 18, wherein (a2) comprises:
(a21) generating the basis vectors and the eigenvalues from the channel downlink characteristic by eigen analysis;
(a22) counting the number of the eigenvalues which are greater than a first threshold value to obtain the number of beams, and selecting basis vectors in a quantity equal to the number of beams from among the basis vectors generated in (a21) as the effective basis vectors; and
(a23) generating the mode signal using the channel downlink characteristic.

22. The mobile communication method as claimed in claim 21, wherein (a23) comprises:
(a231) calculating expectation values for the respective combination modes using the channel downlink characteristic, the effective basis vectors, and the coefficients of tables corresponding to the number of beams from among tables which are predetermined by the number of beams and the combination modes;
(a232) determining whether an expectation value for a selection combination mode is larger than an expectation value for an equal-gain combination mode;
(a233) if the expectation value for the selection combination mode is determined to be larger than the expectation value for the equal-gain combination mode, generating the mode signal representing the selection combination mode; and
(a234) if the expectation value for the selection combination mode is determined to be less than or equal to the expectation value for the equal-gain combination mode, generating the mode signal representing the equal-gain combination mode,
wherein (a231), (a232), (a233), and (a234) are performed at the same time as (a21) and (a22).

23. The mobile communication method as claimed in claim 22, wherein (a231) comprises:
calculating a downlink short-term time-space covariance matrix from the channel downlink characteristic; and
calculating the expectation values based on the downlink short-term time-space covariance matrix, the coefficients of the tables corresponding to the number of beams, and the effective basis vectors using the following formulae:

$E^{SL} = E[w_s^H R_{DL}^{ST} w_s]$, and $E^{EG} = E[w_e^H R_{DL}^{ST} w_e]$ where $E^{SL}$ denotes the expectation value for the selection combination mode, $E^{EG}$ denotes the expectation value for the equal-gain combination mode, $R_{DL}^{ST}$ denotes the downlink short-term time-space covariance matrix, $$w_s = \sum_{i=0}^{N_B-1} a_i^s(b) v_i, \quad w_e = \sum_{i=0}^{N_B-1} a_i^e(b) v_i,$$

$w_s^H$ is a conjugate-transpose matrix of $w_s$, and $w_e^H$ is a conjugate-transpose matrix of $w_e$, where $v_i$ is the effective basis vector, b is the index, $N_B$ denotes the number of beams, $a_i^s(b)$ are coefficients determined for the selection combination mode with the index b from among coefficients which are stored in a table corresponding to the number of beams, and $a_i^e(b)$ are coefficients determined for the equal-gain combination mode with the index b among coefficients which are stored in tables corresponding to the number of beams.

24. The mobile communication method as claimed in claim 21, wherein (a23) comprises:
(a241) calculating directions-of-arrival (DOA's) at the mobile station from the channel downlink characteristic;
(a242) determining whether a difference between adjacent DOA's is larger than a second threshold value;
(a243) if the difference between adjacent DOA's is determined to be larger than the second threshold value, generating the mode signal representing the equal-gain combination mode; and
(a244) if the difference between adjacent DOA's is determined to be less than or equal to the second threshold value, generating the mode signal representing the selection combination mode,
wherein (a241), (a242), (a243), and (a244) are performed at the same time as (a21) and (a22).

25. The mobile communication method as claimed in claim 21, wherein (a23) comprises:
(a251) calculating angular spread of directions-of-arrival (DOA's) at the mobile station from the channel downlink characteristic; and
(a252) determining whether the mean angular spread is larger than a third threshold value;
(a253) if the mean angular spread is determined to be larger than the third threshold value, generating the mode signal representing the equal-gain combination mode; and
(a254) if the mean angular spread is determined to be less than or equal to the third threshold value, generating the mode signal representing the selection combination mode,
wherein (a251), (a252), (a253), and (a254) are performed at the same time as (a21) and (a22).

26. The mobile communication method as claimed in claim 17, wherein (a3) comprises:
(a311) calculating the weight vectors by combining the effective basis vectors with the coefficients of the tables corresponding to the number of beams;
(a312) multiplying the respective weight vectors obtained in (a311) by the channel downlink characteristic and calculating the norm square of the respective products to obtain reception power values; and (a313) fining as the maximum reception power the largest power reception value among the reception power values and determining as the short-term information the index in which the coefficients used to calculate the weight vector are positioned.

27. The mobile communication method as claimed in claim 18, wherein (a3) comprises:

(a321) calculating the weight vectors by combining the effective basis vectors with the coefficients of the tables corresponding to the number of beams and the mode signal;

(a322) multiplying the respective weight vectors obtained in (a321) by the channel downlink characteristic and calculating the norm square of the respective products to obtain reception power values; and (a323) fining as the maximum reception power the largest power reception value among the reception power values and determining as the short-term information the index in which the coefficients used to calculate the weight vector are positioned.

28. The mobile communication method as claimed in claim 20, wherein (b1) comprises:

(b11) restoring the long-term information and short-term information from the feedback signal;

(b12) selecting a table corresponding to the number of beams incorporated into the long-term information from among tables which are predetermined by the number of beams and each of which has the coefficients of the effective basis vectors with indices and is stored in the base station, and extracting coefficients corresponding to the short-term information among coefficients of the selected table;

(b13) obtaining the weights by combining the effective basis vectors incorporated into the long-term information using the coefficients extracted in (b12).

29. The mobile communication method as claimed in claim 28, wherein in (b12), a table corresponding to the number of beams and the mode signal incorporated into the long-term information is selected among tables which are predetermined by the number of beams and the combination modes and each of which has the coefficients of the effective basis vectors with indices and is stored in the base station, and coefficients corresponding to the short-term information from among coefficients of the selected table are extracted.

30. The mobile communication method as claimed in claim 28, wherein in (b13), the weights are obtained by combining the effective basis vectors incorporated into the long-term information using the coefficients extracted in (b12) and the eigenvalues incorporated into the long-term information.

31. The mobile communication method as claimed in claim 29, wherein in (b13), the weights are obtained by combining the effective basis vectors incorporated into the long-term information using the coefficients extracted in (b12) and the eigenvalues incorporated into the long-term information.

32. The mobile communication method as claimed in claim 22, wherein the coefficients $a_i(b)$ of the table corresponding to the selection combination mode are previously obtained according to the following formula:

$$a_i(b) = \begin{cases} 1, & i = b \\ 0, & i \neq b \end{cases}$$

where i is an integer from 0 to $N_B-1$, $N_B$ denotes the number of beams, b denotes the index and is an integer from 0 to $N_B-1$.

33. The mobile communication method as claimed in claim 22, wherein the coefficients $a_i(b)$ of the table corresponding to the equal-gain combination mode are previously obtained according to the following formula:

$$a_i(b) = \begin{cases} 1, & i = 1 \\ \exp(j\frac{\pi}{4} + j\frac{\pi}{4}d(c(b), i)), & i \neq 1 \end{cases}$$

where i is an integer from 0 to $N_B-1$, $c(b)=\text{gray\_encoder}(b, B^{EG})$, $$d(c(b), i) = \text{mod}\left(\left\lfloor \frac{c(b)}{4^{N_B-1-i}} \right\rfloor, 4\right),$$

$N_B$ denotes the number of beams, b denotes the index and is an integer from 0 to $B^{EG}-1$, and $B^{EG}=4^{N_B-1}$.

34. The mobile communication method as claimed in claim 17, wherein the table of the coefficients used in (a3) is for the selection combination mode.

35. The mobile communication method as claimed in claim 17, wherein the table of the coefficients used in (a3) is for the equal-gain combination mode.

36. A mobile communication apparatus including a base station with an antenna array and a mobile station, wherein the mobile station determines a channel downlink characteristic for each antenna using a signal transmitted from the base station, determines short-term information based on a correlation of characteristics between channels for each antenna using the channel downlink characteristic, converts the determined short-term information to a feedback signal, and transmits the feedback signal to the base station; and wherein the base station determines a channel uplink characteristic for each antenna from a signal transmitted from the mobile station, extracts a plurality of weights based on long-term information determined using the channel uplink characteristic and the short-term information restored from the received feedback signal, multiplies a multiplexed dedicated physical channel signal by the respective weights, adds respective basis pilot signals, which are obtained using at least one pilot channel signal and the long-term information, to the products, and transmits the results of the additions through the antenna array to the mobile station.

37. The mobile communication apparatus as claimed in claim 36, wherein the mobile station determines the short-term information using the long-term information restored from the signal transmitted from the base station and the channel downlink characteristic, and the base station converts the determined long-term information to a radio signal and transmits the radio signal to the mobile station.

38. The mobile communication apparatus as claimed in claim 36, wherein the mobile station comprises:

a mobile station channel characteristic determination unit which receives the signal transmitted from the base station, determines the channel downlink characteristic for each antenna from the received signal in a spatial-temporal manner, and outputs the determined channel downlink characteristic;

a third coefficient storage unit which predetermines and stores a table which has coefficients of effective basis vectors to be combined with indices;

a second short-term information determination unit which obtains weight vectors by combining given identity basis vectors with the coefficients output from the third coefficient storage unit, determines the index resulting in a maximum reception power using the weight vectors and the channel downlink characteristic, and outputs the determined index as the short-term information; and a mobile station signal conversion unit for converting the determined short-term information to the feedback signal;

wherein the weight vector corresponding to the index determined as the short-term information by the second short-term information determination unit consists of the weights, and the converted feedback signal is transmitted to the base station.

39. The mobile communication apparatus as claimed in claim 37, wherein the mobile station comprises:

a mobile station channel characteristic determination unit which receives the signal transmitted from the base station, determines the channel downlink characteristic for each antenna from the received signal in a spatial-temporal manner, and outputs the determined channel downlink characteristic;

a second information restoration unit which receives the signal transmitted from the base station, restores the long-term information from the received signal, and outputs the restored long-term information;

a fourth coefficient storage unit which predetermines and stores tables for the long-term information, each of which has coefficients of effective basis vectors to be combined with indices, and outputs the coefficients of a table corresponding to the long-term information input from the second information restoration unit, which is selected from the stored tables;

a second short-term information determination unit which obtains weight vectors by combining given identity basis vectors with the coefficients output from the fourth coefficient storage unit, determines the index resulting in a maximum reception power using the weight vectors and the channel downlink characteristic, and outputs the determined index as the short-term information; and a mobile station signal conversion unit for converting the determined short-term information to the feedback signal, wherein the weight vector corresponding to the index determined as the short-term information by the second short-term information determination unit consists of the weights, and the converted feedback signal is transmitted to the base station.

40. The mobile communication apparatus as claimed in claim 38, wherein the second short-term information determination unit comprises:

a third basis vector combination portion which combines the identity basis vectors using the coefficients input from the third coefficient storage unit and outputs the resulting combinations as the weight vectors;

a reception power calculation portion which multiplies the respective weight vectors input from the third basis vector combination portion by the channel downlink characteristic, calculates the norm square of the respective products, and outputs the calculated results as reception power values; and a maximum power finding portion which finds as the maximum reception power the largest power reception value among the reception power values input from the reception power calculation portion and outputs as the short-term information the index in which the coefficients used to calculate the weight vector are positioned.

41. The mobile communication apparatus as claimed in claim 38, wherein the base station comprises:

a base station long-term information determination unit which determines the channel uplink characteristic using the signal transmitted from the mobile station and determines the long-term information using the determined channel uplink characteristic;

a second weight extraction unit which restores the short-term information from the feedback signal received through the antenna array and extracts the weights using the restored short-term information and the long-term information determined by the base station long-term information determination unit;

a multiplexing unit which multiplexes a dedicated physical channel signal and outputs the result of the multiplexing;

a multiplication unit which multiplies the result of the multiplexing input from the multiplexing unit by the respective weights input from the second weight extraction unit, and outputs the products; and a basis pilot signal generation unit which generates the basis pilot signals using the at least one pilot channel signal and the long-term information determined by the base station long-term information determination unit;

an addition unit which adds the respective basis pilot signals to the products input from the multiplication unit and outputs the results of the additions, wherein the results of the additions output from the addition unit are transmitted through the antenna array to the mobile station.

42. The mobile communication apparatus as claimed in claim 39, wherein the base station comprises:

a base station long-term information determination unit which determines the channel uplink characteristic using the signal transmitted from the mobile station and determines the long-term information using the determined channel uplink characteristic;

a third weight extraction unit which restores the short-term information from the feedback signal received through the antenna array and extracts the weights using the restored short-term information and the long-term information determined by the base station long-term information determination unit;

a multiplexing unit which multiplexes a dedicated physical channel signal and outputs the result of the multiplexing;

a multiplication unit which multiplies the result of the multiplexing input from the multiplexing unit by the respective weights input from the third weight extraction unit, and outputs the products;

a basis pilot signal generation unit which generates the basis pilot signals using at least one pilot channel signal and the long-term information determined by the base station long-term information determination unit;

a base station signal conversion unit which converts the long-term information determined by the long-term information determination unit to a radio signal; and an addition unit which adds the respective basis pilot signals to the products input from the multiplication unit and outputs the results of the additions, wherein the radio signals output from the base station signal conversion unit are transmitted through the antenna array to the mobile station.

43. The mobile communication apparatus as claimed in claim 41, wherein the second weight extraction unit comprises:

a third information restoration portion which restores the short-term information from the received feedback signal and outputs the restored short-term information;

a fifth coefficient storage portion which predetermines and stores a table which has coefficients of the effective basis vectors to be combined with indices, and outputs coefficients corresponding to the short-term information input from the third information restoration portion; and a fourth basis vector combination portion which combines the coefficients input from the fifth coefficient storage portion and the effective basis vectors incorporated into the long-term information input from the base station long-term information determination unit, and outputs the resulting combinations as the weights to the multiplication unit.

44. The mobile communication apparatus as claimed in claim 43, wherein the fifth coefficient storage portion predetermines and stores tables for the long-term information, each of which has the coefficients of the effective basis vectors, and outputs to the fourth basis vector combination portion coefficients corresponding to the long-term information determined by the base long-term information determination unit and the short-term information input from the third information restoration portion.

45. The mobile communication apparatus as claimed in claim 43, wherein the base station long-term information determination unit comprises:

a base station channel characteristic determination portion which determines the channel uplink characteristic for each antenna using the signal transmitted from the mobile station;

an uplink long-term time-space covariance matrix generation portion which generates an uplink long-term time-space covariance matrix from the channel uplink characteristic determined by the base station channel characteristic determination portion;

a channel information conversion portion which converts the uplink long-term time-space covariance matrix to a downlink long-term time-space covariance matrix; and a long-term information generation portion which generates the long-term information from the downlink long-term time-space covariance matrix input from the channel information conversion portion by an eigen analysis method.

46. The mobile communication apparatus as claimed in claim 45, wherein the long-term information generation portion comprises a second mode signal generation portion which generates a mode signal from the long-term information generated using the eigen analysis method and the channel uplink characteristic.

47. The mobile communication apparatus as claimed in claim 46, wherein the second mode signal generation portion comprises:

an uplink short-term time-space covariance matrix calculation portion which calculates an uplink short-term time-space covariance matrix from the uplink long-term time-space covariance matrix;

an expectation value calculation portion which calculates expectation values $E^{SL}$ and $E^{EG}$ based on the uplink short-term time-space covariance matrix, the coefficients input from the fifth coefficient storage portion and the effective basis vectors incorporated into the long-term information input from the long-term information determination unit using the following formulae:

$$E^{SL}=E[w_s^H R_{DL}^{ST} w_s], \text{ and}$$

$$E^{EG}=E[w_e^H R_{DL}^{ST} w_e]$$

where $R_{UL}^{ST}$ denotes the uplink short-term time-space covariance matrix, $$w_s = \sum_{i=0}^{N_B-1} a_i^s(b) v_i,$$

$$w_e = \sum_{i=0}^{N_B-1} a_i^e(b) v_i,$$

$w_s^H$ is a conjugate-transpose matrix of $w_s$, and $w_e^H$ is a conjugate-transpose matrix of $w_e$, where $v_i$ is the effective basis vector, b is the index, $N_B$ denotes the number of beams which is equal to the number of the effective basis vectors, $a_i^s(b)$ are coefficients which are determined for the selection combination mode with the index b from among coefficients input from the fifth coefficient storage portion, and $a_i^e(b)$ are coefficients which are determined for the equal-gain combination mode with the index b from among coefficients input from the fifth coefficient storage portion; and a first comparison portion which compares the expectation values and generates the mode signal in response to the result of the comparison.

48. The mobile communication apparatus as claimed in claim 46, wherein the second mode signal generation portion comprises:

a direction-of-arrival (DOA) calculation portion which calculates DOA's at the mobile station from the channel uplink characteristic; and a second comparison portion which compares a difference between adjacent DOA's with a second threshold value and generates the mode signal in response to the result of the comparison.

49. The mobile communication apparatus as claimed in claim 46, wherein the second mode signal generation portion comprises:

an angular spread calculation portion which calculates the angular spread of directions-of-arrival (DOA's) at the mobile station from the channel uplink characteristic; and a third comparison portion which compares the mean angular spread with a third threshold value and generates the mode signal in response to the result of the comparison.

50. The mobile communication apparatus as claimed in claim 46, wherein the second mode signal generation portion comprises a fourth comparison portion which compares a difference between the first largest eigenvalue and the second largest eigenvalue from among eigenvalues with a fourth threshold value and outputs the mode signal in response to the result of the comparison, and the eigenvalues are generated from the downlink long-term time-space covariance matrix using the eigen analysis method in the long-term information generation portion and are incorporated into the long-term information.

51. The mobile communication apparatus as claimed in claim 41, wherein the basis pilot signal generation unit multiplies the pilot channel signals in a quantity equal to the number of beams, which is the same as the number of the effective basis vectors, by the respective effective basis vectors, adds the products, and outputs the results of the additions as the basis pilot signals to the addition unit.

52. The mobile communication apparatus as claimed in claim 41, wherein the basis pilot signal generation unit adjusts amplitudes of the effective basis vectors, multiplies the pilot channel signals in a quantity equal to the number of beams, which is the same as the number of the effective basis vectors, by respective amplitude-adjusted effective basis vectors, adds the products, and outputs the results of the additions as the basis pilot signals to the addition unit.

53. A mobile communication method using an antenna array in a mobile communication apparatus including a base station with the antenna array and a mobile station, the method comprising:
   (a) determining a channel downlink characteristic for each antenna using a signal transmitted from the base station, determining short-term information based on a correlation of characteristics between channels for each antenna, using the channel downlink characteristic, converting the determined short-term information to a feedback signal, and transmitting the feedback signal to the base station; and
   (b) determining a channel uplink characteristic for each antenna from a signal transmitted from the mobile station, extracting a plurality of weights based on long-term information, which is determined using the channel uplink characteristic, and the short-term information restored from the received feedback signal, multiplying a multiplexed dedicated physical channel signal by the respective weights, adding respective basis pilot signals, which are obtained using at least one pilot channel signal and the long-term information, to the products, and transmitting the results of the additions through the antenna array to the mobile station.

54. The mobile communication method as claimed in claim 53, wherein in (a), the short-term information is determined using the long-term information, which is restored from the signal transmitted from the base station, and the channel downlink characteristic, and in (b), the determined long-term information is converted to a radio signal and transmitted to the mobile station.

55. The mobile communication method as claimed in claim 53, wherein (a) comprises:
   (a1) receiving the signal transmitted from the base station and determining the channel downlink characteristic for each antenna from the received signal in a spatial-temporal manner;
   (a2) calculating weight vectors by combining identity basis vectors with corresponding coefficients from among coefficients of a table which is predetermined and stored and has coefficients of the effective basis vectors with indices, and determining as the short-term information the index resulting in a maximum reception power using the weight vectors and the channel downlink characteristic; and
   (a3) converting the determining short-term information to the feedback signal,
   wherein the weight vector corresponding to the index determined in (a2) consists of the weights, and the converted result from (a3) is transmitted to the base station.

56. The mobile communication method as claimed in claim 54, wherein (a) comprises:
   (a1) receiving the signal transmitted from the base station, determining the channel downlink characteristic for each antenna from the received signal in a spatial-temporal manner, and restoring the long-term information from the received signal;
   (a2) calculating weight vectors by combining identity basis vectors with the coefficients of a table which is selected according to the long-term information restored in (a1) from tables which are predetermined and each of which has coefficients of effective basis vectors to be combined with indices, and determining as the short-term information the index resulting in a maximum reception power using the weight vectors and the channel downlink characteristic; and
   (a3) converting the determining short-term information to the feedback signal,
   wherein the weight vector corresponding to the index determined in (a2) consists of the weights, and the converted result from (a3) is transmitted to the base station.

57. The mobile communication method as claimed in claim 55, wherein (a2) comprises:
   (a21) calculating the weight vectors by combining the identity basis vectors using the coefficients of the table;
   (a22) multiplying the respective weight vectors calculated in (a21) by the channel downlink characteristic and calculating the norm square of the respective products as reception power values; and
   (a23) finding as the maximum reception power the largest power reception value among the reception power values and determining as the short-term information the index in which the coefficients used to calculate the weight vector are positioned.

58. The mobile communication method as claimed in claim 55, wherein (b) comprises:
   (b1) determining the channel uplink characteristic using the signal transmitted from the mobile station and determining the long-term information using the determined channel uplink characteristic;
   (b2) restoring the short-term information from the feedback signal received through the antenna array and extracting the weights using the restored short-term information and the long-term information determined in (b1);
   (b3) multiplexing a dedicated physical channel signal;
   (b4) multiplying the result of the multiplexing from (b3) by the respective weights extracted in (b2);
   (b5) generating the basis pilot signals using the at least one pilot channel signal and the long-term information determined in (b1); and
   (b6) adding the respective basis pilot signals to the products from (b4),
   wherein (b2) comprises:
      (b21) restoring the short-term information from the received feedback signal;
      (b22) extracting coefficients corresponding to the short-term information from among coefficients of tables which are predetermined and each of which has the coefficients of the effective basis vectors to be combined with indices; and (b23) obtaining the weights using the extracted coefficients and the long-term information determined in (b1), wherein the results of the additions from (b6) are transmitted through the antenna array to the mobile station.

59. The mobile communication method as claimed in claim 56, wherein (b) comprises:

(b1) determining the channel uplink characteristic using the signal transmitted from the mobile station and determining the long-term information using the determined channel uplink characteristic;

(b2) restoring the short-term information from the feedback signal received through the antenna array and extracting the weights using the restored short-term information and the long-term information determined in (b1);

(b3) multiplexing a dedicated physical channel signal;

(b4) multiplying the result of the multiplexing from (b3) by the respective weights;

(b5) generating the basis pilot signals using the at least one pilot channel signal and the long-term information determined in (b1);

(b6) adding the respective basis pilot signals to the products from (b4); and (b7) converting the long-term information determined in (b1) to a radio signal, wherein (b2) comprises:

(b21) restoring the short-term information from the received feedback signal;

(b22) extracting coefficients corresponding to the short-term information and the long-term information determined in (b1) from among coefficients of the tables which are predetermined by long-term information and each of which has the coefficients of the effective basis vectors to be combined with indices, and (b23) obtaining the weights using the extracted coefficients and the long-term information determined in (b1), wherein the results of the additions from (b6) and the converted result from (b7) are transmitted through the antenna array to the mobile station.

60. The mobile communication method as claimed in claim 58, wherein (b1) comprises:

(b11) determining the channel uplink characteristic for each antenna using the signal transmitted from the mobile station;

(b12) generating an uplink long-term time-space covariance matrix from the channel uplink characteristic determined in (b11);

(b13) converting the uplink long-term time-space covariance matrix to a downlink long-term time-space covariance matrix; and (b14) generating the long-term information by an eigen analysis method from the downlink long-term time-space covariance matrix obtained in (b13).

61. The mobile communication method as claimed in claim 60, wherein (b14) comprises (b141) generating a mode signal from the long-term information generated using the eigen analysis method and the channel uplink characteristic.

62. The mobile communication method as claimed in claim 61, wherein (b141) comprises:

calculating a difference between the first largest eigenvalue and the second largest eigenvalue from among eigenvalues;

determining whether the difference between the first largest eigenvalue and the second largest eigenvalue is smaller than a fourth threshold value;

if the difference between the first largest eigenvalue and the second largest eigenvalue is determined to be smaller than the fourth threshold value, generating the mode signal representing a selection combination mode; and if the difference between the first largest eigenvalue and the second largest eigenvalue is determined to be greater than or equal to the fourth threshold value, generating the mode signal representing an equal-gain combination mode, wherein the eigenvalues are generated from the downlink long-term time-space covariance matrix using the eigen analysis method and incorporated into the long-term information.

63. The mobile communication method as claimed in claim 58, wherein in (b5), the pilot channel signals in a quantity equal to the number of beams, which is the same as the number of the effective basis vectors, are multiplied by the respective effective basis vectors, the products are added, and the results of the additions are determined as the basis pilot signals, and then (b6) is performed.

64. The mobile communication method as claimed in claim 58, wherein in (b5), the amplitudes of the effective basis vectors are adjusted, the pilot channel signals in a quantity equal to the number of beams, which is the same as the number of the effective basis vectors, are multiplied by the respective amplitude-adjusted effective basis vectors, the products are added, and the results of the additions are determined as the basis pilot signals, and then (b6) is performed.

65. The mobile communication apparatus as claimed in claim 6, wherein the multiplexing unit comprises a multiplier which multiplies the dedicated physical channel signal by a spread/scramble signal and outputs the product as the result of the multiplexing.

66. The mobile communication method as claimed in claim 16, wherein the multiplexed dedicated physical channel signal is obtained by multiplying a spread/scramble signal by a dedicated physical channel signal.

67. The mobile communication apparatus as claimed in claim 6, wherein the multiplexing unit comprises a time division multiplexing portion which time-division-multiplexes different dedicated physical channel signals for each user and outputs the result of the time-division-multiplexing as the result of the multiplexing.

68. The mobile communication method as claimed in claim 16, wherein the multiplexed dedicated physical channel signal is obtained by time-division-multiplexing different dedicated physical channel signals for each user.

69. The mobile communication apparatus as claimed in claim 1, wherein the pilot channel signals are common pilot channel (CPICH) signals, dedicated pilot channel (DPICH) signals, or secondary common pilot channel (SCPICH) signals.

70. The mobile communication method as claimed in claim 16, wherein the pilot channel signals are common pilot channel (CPICH) signals, dedicated pilot channel (DPICH) signals, or secondary common pilot channel (SCPICH) signals.

* * * * *